US008381409B2

(12) United States Patent
Knoke et al.

(10) Patent No.: US 8,381,409 B2
(45) Date of Patent: Feb. 26, 2013

(54) LASER MEASUREMENT OF A VEHICLE FRAME

(75) Inventors: Robin L. Knoke, White Salmon, WA (US); Matt J. Brunk, Hood River, OR (US); Mark W. Schulz, Minneapolis, MN (US); Eric J. Krause, Big Lake, MN (US); Lee G. Macklem, New Hope, MN (US); William M. Roth, Minneapolis, MN (US); Daniel Darst, Zimmerman, MN (US)

(73) Assignee: Infinity Laser Measuring LLC, Edina, MN (US)

( * ) Notice: Subject to any disclaimer, the term of this patent is extended or adjusted under 35 U.S.C. 154(b) by 66 days.

(21) Appl. No.: 12/917,829

(22) Filed: Nov. 2, 2010

(65) Prior Publication Data

US 2011/0162221 A1 Jul. 7, 2011

Related U.S. Application Data

(60) Provisional application No. 61/257,262, filed on Nov. 2, 2009.

(51) Int. Cl.
*G01B 11/27* (2006.01)
(52) U.S. Cl. .......................... 33/288; 33/228
(58) Field of Classification Search .................. 33/282, 33/288, 290, DIG. 21, 600, 613, 645
See application file for complete search history.

(56) References Cited

U.S. PATENT DOCUMENTS

| 2,815,695 | A | 12/1957 | Scharf et al. |
| 4,330,945 | A | 5/1982 | Eck |
| 4,441,259 | A | 4/1984 | Leitermann |
| 4,578,870 | A | 4/1986 | Cooke |
| 4,598,481 | A | 7/1986 | Donahue |
| 5,058,286 | A | 10/1991 | Chisum |
| 5,125,164 | A | 6/1992 | Fournier et al. |
| 5,207,002 | A | 5/1993 | Humblet |
| 5,644,854 | A | 7/1997 | Bergeron |
| 5,801,834 | A | 9/1998 | Danielson |
| 6,347,457 | B1 | 2/2002 | Espinoza et al. |
| 6,595,076 | B2 | 7/2003 | Uegaki |
| 6,675,489 | B2 * | 1/2004 | Ohtomo et al. ............. 33/290 |
| 6,775,639 | B1 * | 8/2004 | Mason ....................... 33/288 |
| 6,892,464 | B2 * | 5/2005 | Ohtomo et al. ............. 33/290 |
| 7,075,635 | B2 * | 7/2006 | Groothuis et al. .......... 33/288 |
| 7,181,856 | B1 * | 2/2007 | Hanchett et al. ........... 33/288 |

(Continued)

FOREIGN PATENT DOCUMENTS

GB   2 173 369 A   10/1986

OTHER PUBLICATIONS

Invitation to Pay Additional Fees with Partial International Search mailed Feb. 4, 2011.

(Continued)

*Primary Examiner* — Yaritza Guadalupe-McCall
(74) *Attorney, Agent, or Firm* — Merchant & Gould P.C.

(57) ABSTRACT

A laser measurement system operates to measure portions of a vehicle, such as a vehicle frame. The measurements are used, for example, to determine if the portions of the vehicle are bent or damaged. The measurement system includes a laser scanner and at least one target assembly that can be connected to a point of the vehicle. The laser scanner emits a laser beam that is detected by the target. Time and laser position information detected by the target are used to determine the location of the target, as well as the location of the point of the vehicle. The location of the point is then compared to an original location of the point to determine if damage has occurred.

7 Claims, 40 Drawing Sheets

U.S. PATENT DOCUMENTS

| | | |
|---|---|---|
| 7,289,876 B2 | 10/2007 | Lüssen et al. |
| 7,352,455 B2 | 4/2008 | Groothuis et al. |
| 7,383,636 B2 | 6/2008 | Knopik et al. |
| 7,570,352 B2 | 8/2009 | Flannigan et al. |
| 7,841,094 B2 * | 11/2010 | Schumacher .................. 33/282 |
| 2004/0107589 A1 | 6/2004 | Ohtomo et al. |
| 2005/0131586 A1 | 6/2005 | Srack et al. |
| 2010/0033734 A1 | 2/2010 | Koop |
| 2011/0162221 A1 * | 7/2011 | Knoke et al. .................... 33/228 |

OTHER PUBLICATIONS

International Search Report and Written Opinion mailed Apr. 27, 2011.

* cited by examiner

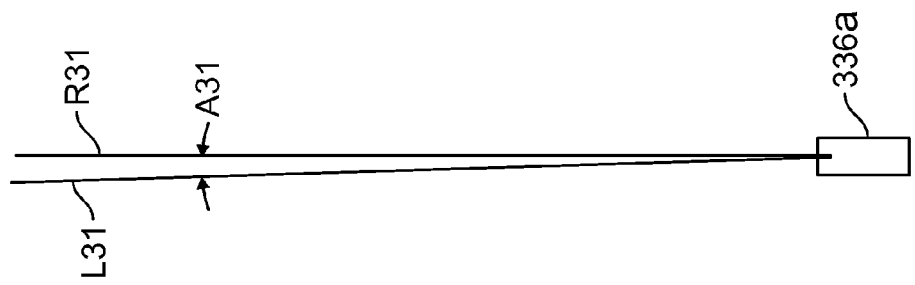
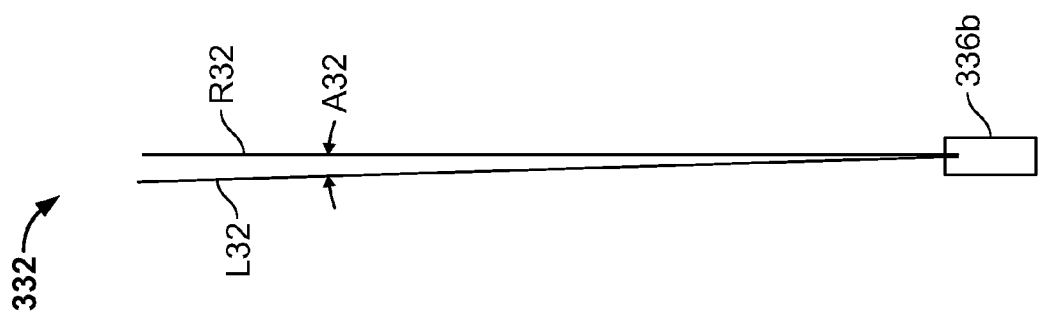
FIG. 7

FIG. 31

LASER MEASUREMENT OF A VEHICLE FRAME

CROSS REFERENCE TO RELATED APPLICATION

This application claims priority to U.S. Provisional Application Ser. No. 61/257,262 filed on Nov. 2, 2009, titled LASER MEASUREMENT OF A VEHICLE FRAME, the disclosure of which is incorporated by reference in its entirety.

TECHNICAL FIELD

This disclosure relates generally to the field of laser measurement, and more particularly to laser measurement of a vehicle, and more particularly still to a laser measurement system for evaluating a frame of a vehicle.

BACKGROUND

The structural foundation of many common vehicle designs is the frame. The frame can be made of multiple frame members, often formed of metals such as steel. Additional vehicle components, such as the engine, body, power train, and interior, are ultimately connected to and supported by the frame. Some vehicles include a unibody design, in which the frame is integrated with the body.

Because the frame forms the structural foundation of a vehicle, it is typically very strong and designed to withstand large amounts of stress. Some frames, however, are also designed with intentional weaknesses. For example, automobile frames are commonly designed to include a crumple zone toward the front or rear of the vehicle. The crumple zone operates to deform during a collision to absorb some of the impact and thereby lessen the impact on passengers.

Due in part to the complex shapes of many vehicle frames, as well as to the wide variety of different vehicle frames, it can be difficult to determine whether a vehicle's frame has been bent from an original configuration. Such deformation, however, can have adverse consequences, such as reducing the structural integrity of the vehicle, or increasing wear on vehicle components.

Once a vehicle frame has been deformed, it can sometimes be repaired by bending the frame back to the proper position. However, due to the wide variety of different vehicle frames, as well as the complex shape of most vehicle frames, it can be difficult to determine how to adjust the frame to return the frame to the proper position.

SUMMARY

In general terms, this disclosure is directed to laser measurement. In one possible configuration and by non-limiting example, a laser measurement system identifies locations of points of a vehicle in a three-dimensional space and determines whether the points of the vehicle are properly positioned.

One aspect is a scanner device of a vehicle laser measurement system. The scanner device includes at least one rotating support; a motor arranged and configured to rotate the at least one rotating support; a laser device coupled to the at least one rotating support; and an optics assembly coupled to the at least one rotating support and positioned to receive a laser beam from the laser device, the optics assembly including at least one rhombic prism arranged and configured to split a laser beam from the laser device into at least two laser beams.

Another aspect is a method of operating a scanner of a laser measurement system. The method includes generating a laser beam with a laser device, and splitting the laser beam into at least two laser beams using a rhombic prism.

A further aspect is a laser measurement system including a scanner device and a target. The scanner device includes a laser device that generates a laser beam. The target device includes a detector that detects when the laser beam is directed at the target, and further includes a three dimensional position indicator system that visually indicates the relative position of a point on a vehicle frame with respect to a desired position in each of the three dimensions.

Yet another aspect is a method of operating a laser measurement system. The method includes: detecting a laser beam emitted from a rotating scanner device with a target device, the target device being associated with a position of a part of a vehicle; and wirelessly transmitting data from the target device to the scanner device after detecting the laser beam.

A further aspect is a method of authorizing a repair. The method includes using a laser measurement system to identify at least one point of a vehicle frame that is not properly positioned; generating a report identifying a repair that is needed to return the point of the vehicle frame to a correct position; electronically sending the report to an authorizer across a network in an authorization request; and receiving from the authorizer a response to the authorization request, the response authorizing the repair.

Another aspect is a method of operating a laser measurement system. The method includes: receiving with a computing device an input from an operator of the laser measurement system indicating that the operator is having a difficulty with the laser measurement system; and receiving information with the computing device from a remote assistant to assist the operator to overcome the difficulty.

BRIEF DESCRIPTION OF THE DRAWINGS

FIG. 7 is a block diagram of another example optics assembly.

FIG. 31 is an screen shot of another example user interface of an application program.

DETAILED DESCRIPTION

Figure 1:
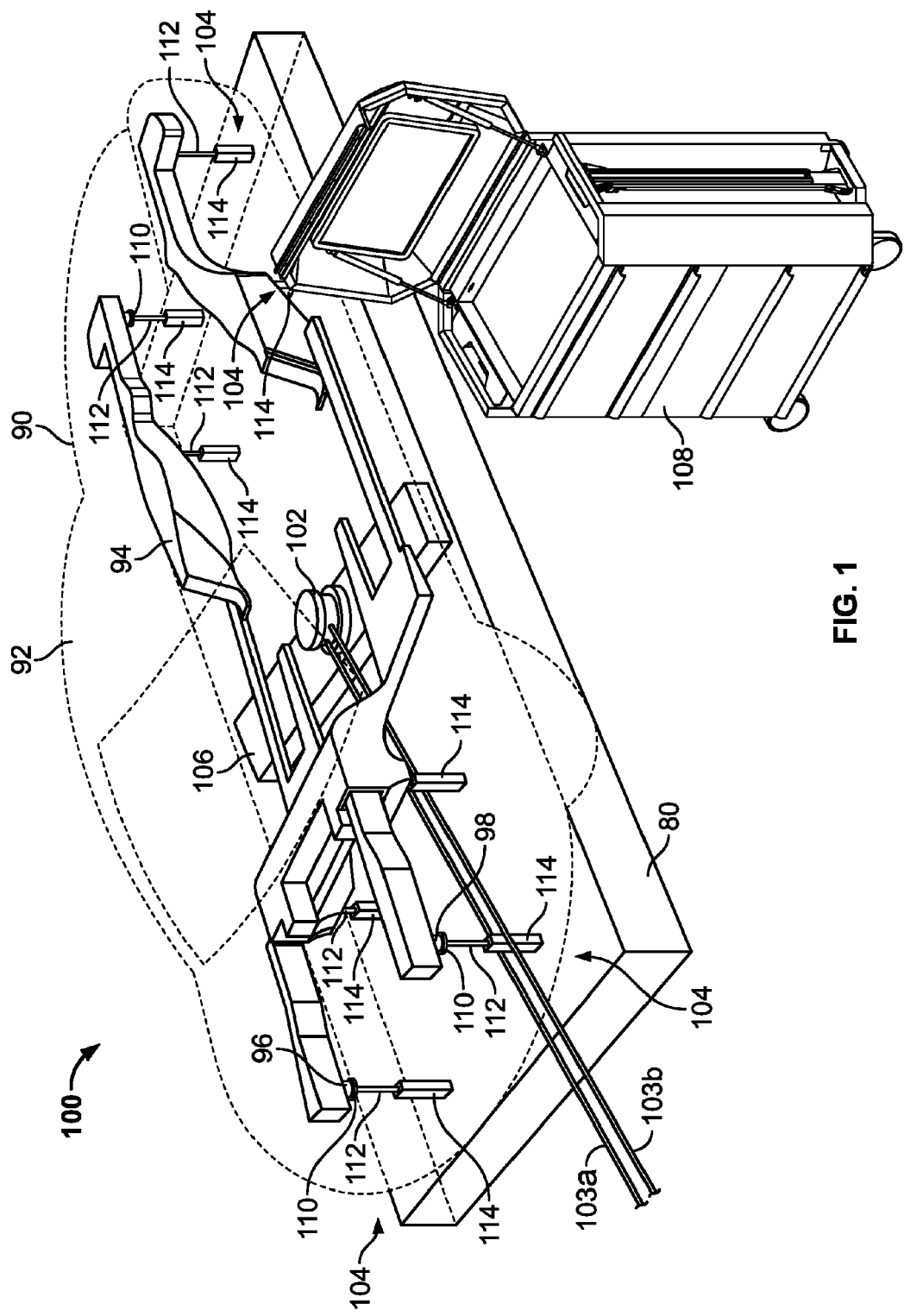
FIG. 1 is a schematic perspective view of an example measurement system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a schematic perspective view of an example measurement system 100. Measurement system 100 is depicted in FIG. 1 in an exemplary environment including a vehicle lift system 80 and vehicle 90. The vehicle 90 includes a body 92, frame 94, and plurality of frame points represented by points 96 and 98.

The example measurement system 100 includes scanner 102, target assemblies 104, bridge 106, and cart 108. Examples of target assemblies 104 include frame attachment device 110, stems 112, and targets 114.

Measurement system 100 operates, in some embodiments, to measure the location of one or more points of frame 94 of vehicle 90, or other vehicle points. Examples of the points are points 96 and 98, shown in FIG. 1. If vehicle 90 includes a unibody design, frame 94 is the unibody.

Measurement system 100 includes a scanner 102 that operates to emit light, such as one or more laser beams 103$a$ and 103$b$. At least a portion of scanner 102 rotates about a central vertical axis, which in turn causes laser beams 103$a$ and 103$b$ to rotate about that axis. The laser beams 103$a$ and 103$b$ thereby define one or more horizontal reference planes, from which distances to frame points 96 and 98 can be computed.

Scanner 102 is typically arranged in a central region of frame 94, between the front and rear ends of frame 94 and between left and right sides of frame 94. Scanner 102 is also typically arranged below frame 94, or below portions of frame 94, such that parts of frame 94 do not block the paths between scanner 102 and targets 114. In some embodiments, a bridge 106 is placed on top of part of vehicle lift system 80, and provides a sturdy platform for supporting scanner 102 in the central region of frame 94.

Target assemblies 104 are each connected to a point of interest of frame 94, such as points 96 and 98. In one example, target assembly 104 includes a frame attachment device 110 that connects directly to frame 94 such as using a magnet or by frictional engagement. An example of a point 96 or 98 is a location of a particular bolt of frame 94. Other examples of points 96 or 98 are joints, corners, holes, surfaces, edges, or any other identifiable location of frame 94.

Stem 112 a device that is configured to support a target 114 in a spaced relationship to frame attachment device 110. When assembled, stem 112 is connected to frame attachment device 110. Stem 112 has a length that is known or can be identified by measurement system 100. An example of stem 112 is a rod.

Target 114 operates to detect laser beams 103$a$ and 103$b$. The time and position of the laser beam is recorded. Subsequent calculations are then performed by measurement system 100 using this data to compute the three-dimensional location of target 114, and the associated point of frame 94.

Cart 108 provides a storage location for the various other components of measurement system 100, and also houses a computing device. In some embodiments the computing device receives position data from scanner 102 and/or targets 114 and includes software that generates one or more user interfaces.

Figure 2:
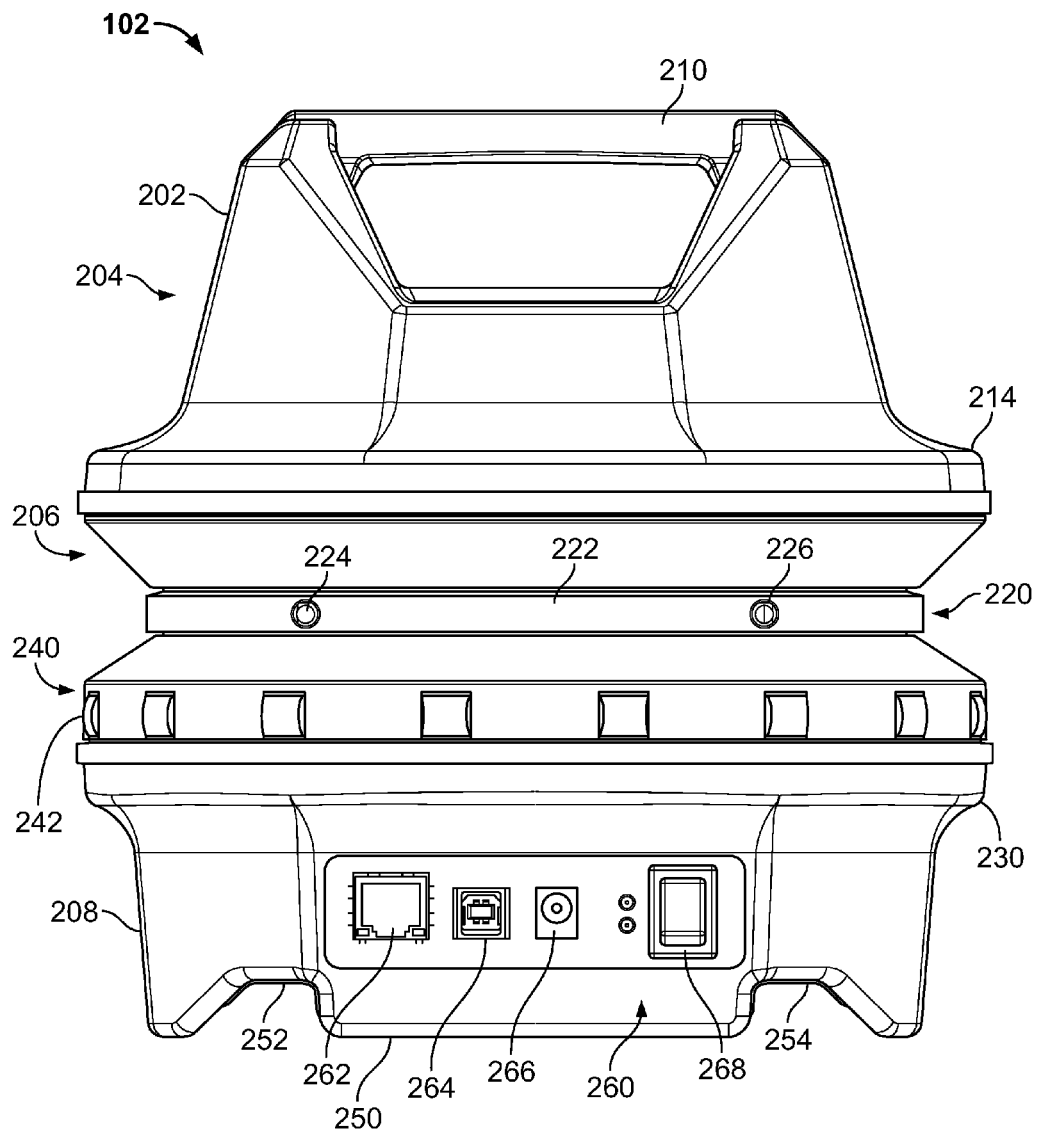
FIG. 2 is a side view of an example scanner of the measurement system shown in FIG. 1.

FIG. 2 is a side view of an example scanner 102. In this example, scanner 102 includes housing 202 including an upper portion 204, a central portion 206, and a lower portion 208.

Housing 202 forms a protective enclosure for various scanner components contained therein. The upper portion 204 of housing 202 includes a handle 210, in some embodiments, which permits a user to easily grasp and transport scanner 102. In some embodiments, upper portion 204 houses communication circuitry that sends and/or receives electromagnetic signals, such as radio frequency waves. Accordingly, in some embodiments upper portion 204 is made of a material that does not significantly interfere with sending and/or reception of such signals, such as a non-metallic material. An example of a suitable material is a polymer, such as a plastic material. Other materials or combinations of materials are used in other embodiments.

Central portion 206 includes a recessed region 220 that is recessed from the lower periphery 214 of upper portion 204 and from an upper periphery 230 of lower portion 208. A rotating section 222 of scanner 102 is located within recessed region 220. The rotating section 222 is protected from inadvertent contact with other objects by being located within recessed region 220. For example, if an object, such as a hand, comes into contact with a side of scanner 102, the protruding upper and lower periphery 214 and 230 will tend to come into contact with the object to stop the object from contacting the recessed rotating section 222.

In some embodiments, rotating section 222 includes an optics assembly (shown in FIG. 3) that generates one or more light beams. Apertures 224 and 226 are provided in rotating section 222 to permit the one or more light beams to pass therethrough. In some embodiments the outer part of rotating section 222 forms a flywheel, which contains apertures 224 and 226.

Lower portion 208 of housing 202 encloses a bottom portion of scanner 102. In some embodiments a synchronization assembly 240 is contained within lower portion 208, and includes lenses 242 through which a synchronization signal is transmitted. An example of a synchronization signal is an infrared light pulse (or set of pulses).

Lower portion 208 also includes a profiled bottom surface 250 in some embodiments. The profiled bottom surface 250 includes recesses 252 and 254. Recesses 252 and 254 aid in proper alignment of scanner 102 by engaging with rails of bridge 106. When bridge 106 is arranged transverse to lift system 80, recesses 252 and 254 engage with bridge 106 when recesses 252 and 254 are arranged parallel with rails of bridge 106. The engagement of recesses 252 and 254 with rails of bridge 106 reduces potential movement or rotation of scanner 102 with respect to bridge 106, such as due to the rotation of rotating section 222 or any vibration generated by scanner 102.

Some embodiments of scanner 102 include a connection panel 260 for electrically connecting scanner 102 with another device. In this example, connection panel 260 includes an Ethernet port 262, universal serial bus port 264, and a power adapter port 266. Scanner 102 also includes a power switch 268 that allows an operator to turn on and turn off scanner 102.

Figure 3:
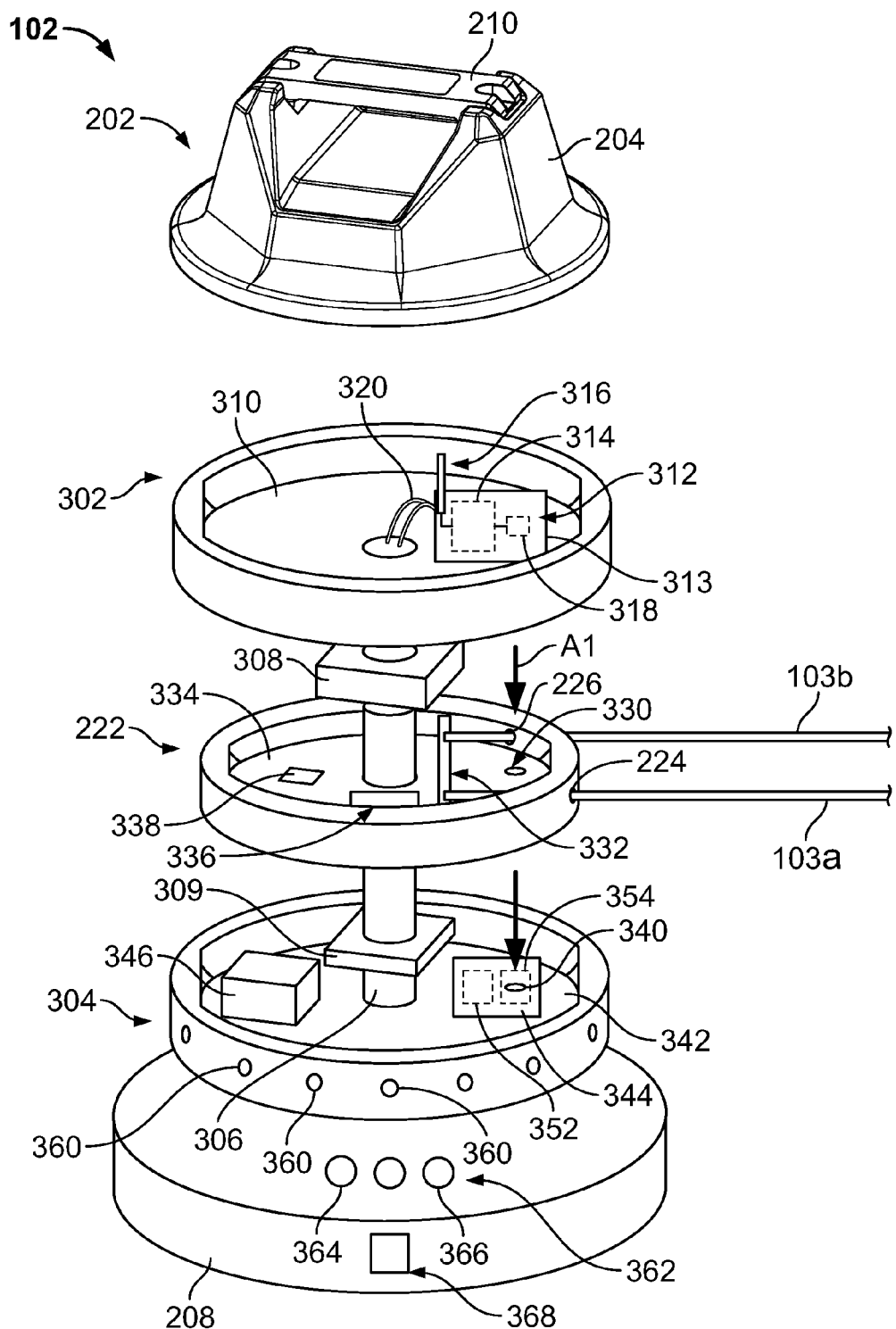
FIG. 3 is a schematic exploded block diagram of the example scanner shown in FIG. 2.

FIG. 3 is a schematic exploded block diagram illustrating an example of scanner 102. Scanner 102 includes housing 202 (including upper portion 204 and lower portion 208), upper section 302, rotating section 222, lower section 304, and central shaft 306. Additional components are also included in each section, as discussed below.

Upper portion 204 of housing 202 forms a cover for scanner 102 in some embodiments, while lower portion 208 of housing 202 forms a base for scanner 102. One or more bearing assemblies 308 and 309 are used in some embodiments as an interface between stationary upper and lower sections 302 and 304 and rotating section 222. Bearing assemblies 308 and 309 include one or more bearings, such as a sliding bearing (such as a bushing or plain bearing), rolling-element bearing (such as a ball bearing or pin bearing), fluid bearings, or other bearings.

In this example, scanner 102 includes a multi-tiered design including multiple different sections that form different interior levels of the scanner 102. In this example, scanner 102 includes three different sections, including an upper section 302, a rotating section 222, and a lower section 304. A hollow central shaft 306 extends through each of the sections 302, 222, and 304 and supports each section with respect to the other sections. In some embodiments shaft 306 is hollow and provides a conduit for electrical wires that extend between upper section 302 and lower section 304 that protects the electrical wires against wear or other damage that could otherwise occur if the wires were to come into contact with rotating section 222.

In this example, upper section 302 and lower section 304 remain stationary during operation, while rotating section 222 is caused to rotate about shaft 306, the operation of which is discussed in more detail below.

Upper section 302 typically includes a base 310 that is rigidly supported and connected to shaft 306 to prevent rotation of upper section 302 and to support section 302 in a spaced relationship to rotating section 222 and lower section 304. Base 310 supports additional components of upper section 302 in some embodiments, such as electronic circuitry 312. Electronic circuitry 312 is arranged above, below, or both above and below base 310 in various possible embodiments.

Electronic circuitry 312 includes, for example, communication circuitry 314 and synchronization circuitry 318. In some embodiments communication circuitry 314 and/or synchronization circuitry 318 include one or more printed circuit boards 313. Communication circuitry 314 includes one or more electronic circuits that allow scanner 102 to communicate with targets 114 and/or a computing device (such as housed in cart 108), as shown in FIG. 1. In some embodiments, communication circuitry 314 permits direct communication between scanner 102 and targets 114, and between scanner 102 and the computing device of cart 108. As one example, communication circuitry 314 includes a radio frequency transceiver configured to send and receive radio frequency signals. An example of a suitable RF transceiver is the MRF24J40MA 2.4 GHz RF Transceiver module distributed by Microchip Technology Inc. having a corporate office in Chandler, Ariz. Other embodiments include other communication circuitry.

In some embodiments communication circuitry also includes programmable electronics, such as a processor and memory. An example of a suitable processor is the dsPIC30F5011 high-performance, 16-bit digital signal controller distributed by Microchip Technology Inc. Another example of a suitable processor is the PIC32MX320F128H 32-bit microcontroller also distributed by Microchip Technology Inc. Other examples of programmable electronics include a central processing unit, a microprocessor, a microcontroller, a programmable logic device, a field programmable gate array, a digital signal processing device, a reduced instruction set computing device, a complex instruction set computing device, and an application-specific integrated circuit device.

Memory is configured to store digital data including data computed by the processor or received through the communication circuitry. Memory is also configured to store data instructions, which when executed by the processor, cause the processor to execute one or more methods or operations as described herein. Examples of memory devices include flash memory, random access memory ("RAM"), read only memory ("ROM"), synchronous dynamic access memory ("SDRAM"), and other known forms of digital storage.

In some embodiments, communication circuitry also includes an antenna 316 for transforming electrical signals into electromagnetic signals, as well as for transforming electromagnetic signals into electrical signals.

In some embodiments electronic circuitry 312 also includes synchronization circuitry 318. Synchronization circuitry 318 is used by scanner 102 to detect rotation of rotating section 222. In some possible embodiments, synchronization circuitry 312 includes a synchronization light generator, such as a light emitting diode (LED). The LED is positioned above an aperture formed through base 310 to permit light to pass therethrough. Alternatively, in another embodiment the LED is positioned below base 310. Light generated by the synchronization circuitry 318 shines toward rotating section 222 in the direction of arrow A1. As rotating section 222 rotates, a sync aperture 330 formed through rotating section 222 periodically becomes aligned with the LED, allowing light to pass therethrough. The light is then detected by an optical detector 340 located at lower section 304. This allows scanner 102 to monitor the rotation of rotating section 222 and to identify each time a full rotation is made.

In another possible embodiment, the synchronization LED is included as part of power supply 338, which can be positioned above or within aperture 330. Light generated from the LED is then detected by optical detector 340 once per rotation.

As noted above, bearing 308 is provided in some embodiments between upper section 302 and rotating section 222 to maintain a desired spacing between upper section 302 and rotating section 222 and to prevent undesired contact between the sections. Bearing 308 includes a hollow center so as to not interfere with shaft 306 that extends therethrough.

Rotating section 222 is arranged between upper section 302 and lower section 304 and typically includes an optics assembly 332, base 334, and power supply 338. In this example, optics assembly 332 includes a light generator in the form of laser 336. Optics assembly 332 generates one or more laser beams 103a and 103b that are output from scanner 102 through apertures 224 and 226. Laser beams 103a and 103b rotate as rotating section 222 rotates. Optics assembly 332 is described in more detail herein with reference to FIGS. 4-7.

One example laser 336 generates a green laser beam. One example of a suitable laser 336 is the industrial laser module manufactured by Diode Laser Concepts, Inc. of Central Point, Oreg. under Part No. 5K12B2-0010. The color of the green laser can be expressed in terms of the primary wavelength of light produced by laser 336. In some embodiments the wavelength is in a range from about 492 nanometers to about 577 nanometers. In another embodiment, the wavelength is in a range from about 520 nanometers to about 565 nanometers. In another possible embodiment, the wavelength is in a range from about 525 nanometers to about 540 nanometers. In another possible embodiment, the wavelength is about 532 nm. Other embodiments, however, generate light having wavelengths outside of these ranges. For example, another possible embodiment generates a red laser beam. Yet another possible embodiment includes an ultra-violet laser either in place of, or in addition to laser 336. As one example, light from the ultra-violet laser has a wavelength in a range from 10 nanometers to 400 nanometers.

Green light is close to the center of the visible spectrum, which makes the light more easily detectable to the human eye. In addition, green light can be separated from infrared light, using filters, to distinguish the laser beam from the infrared light pulse used for synchronization at the targets.

In some embodiments laser 336 is a continuous wave laser, in which the output of the laser is substantially constant over time. In another possible embodiment, however, a pulsed mode laser is used. In one embodiment, the pulsed mode laser pulses at a high frequency, such as greater than about 100 kHz, or greater than about 175 kHz, or greater than about 250 kHz, or greater than about 350 kHz, or greater than about 700 kHz. In some embodiments where high frequency pulsing is used, the frequency should be great enough that one or more pulses will fall within the detectable range of each target. In another possible embodiment a low frequency pulse is used. For example, in some embodiments each pulse is approximately equal to or less than the duration of a complete rotation of rotating section 222. For example, if rotating section 222 operates complete a full rotation in about 250 milliseconds, a low frequency pulse may have a pulse time of less than or equal to about 250 milliseconds.

Power supply 338 is provided to supply power to laser 336. Due to the rotation of rotating section 222, a standard wire is typically not used to supply power from upper and/or lower sections 302 and 304. Instead, in some embodiments power is delivered to rotating section 222 with a rotational power delivery device, such as a rotary transformer. In some embodiments bearing 308 is a combination bearing 308 and rotary transformer.

An example of a rotary transformer includes two portions. A first portion is a stationary portion that is connected to the upper section 302 or the lower section 304 and receives power from the corresponding electrical circuitry. Some embodiments provide an AC drive signal to the first portion. The second portion is a rotary portion that is connected to rotating section 222. The first portion and the second portion are maintained in close proximity to each other (such as within a few thousandths of an inch). Each of the first and second portions contain doughnut-shaped pot cores and corresponding coils. As the second portion rotates with rotating section 222, electricity is generated within the coils from the magnetic field generated from the first portion. The electricity is then delivered to power supply 338.

Other embodiments include other rotational power delivery devices, such as a brush and ring connection, a slip ring device, or a rotating electrical connector.

In some embodiments, additional power supply circuitry is provided by power supply 338, which receives power from the rotary transformer. Examples of power supply 338 circuitry include a fuse, a filter (such as including one or more capacitors or inductors), a linear regulator, or other power supply circuitry.

Lower section 304 is arranged below rotating section 222 in some embodiments. As discussed above, bearing assembly 309 is used at the interface between rotating section 222 and lower section 304. The bearing assembly 309 supports rotating section 222 with respect to lower section 304 and permits rotating section 222 to rotate about shaft 306.

In some embodiments, lower section 304 includes base 342, electronic circuitry 344, and motor 346. Electronic circuitry 344 and motor 346 are connected to and supported by base 342 in some embodiments.

Electronic circuitry 344 typically includes programmable electronics, such as a processor and memory. Additional examples of programmable electronics are discussed herein. In this example, electronic circuitry includes control circuitry 352 and synchronization circuitry 354. In some embodiments control circuitry includes a processor and memory. Program instructions, such as in the form of software, can be stored in the memory and executed by the processor to perform one or more methods or operations, such as described herein. For example, in some embodiments communications from targets is received through communication circuitry 314 and communicated to control circuitry 352, such as via one or more wires 320 connected between electronic circuitry 312 and electronic circuitry 344. Data contained in the communications is then stored in memory of control circuitry 352. In addition, in some embodiments additional processing is performed on the data. Examples of such communications and data processing operations are discussed in more detail herein.

Some embodiments of control circuitry 352 further include communication circuitry, such as configured to communicate via a network communication protocol, such as Ethernet or a wireless communication protocol, such as one of the 802.11 family of communication protocols.

Some embodiments of control circuitry 352 include motor control circuitry. In another possible embodiment, separate motor control circuitry is provided. The motor control circuitry controls the operation of motor 346, which is coupled to rotating section 222 to cause rotating section to rotate relative to stationary components of scanner 102 (such as lower section 304).

Motor 346 includes a transmission assembly that delivers power from motor 346 to rotating section 222. An example of a transmission assembly is a belt that is connected to a belt guide coupled to rotating section 222. Other embodiments include other transmission assemblies, such as a chain, gear assembly, frictional wheel, or other transmission assemblies.

A gear module is included in some embodiments to transform power from motor 346 to the desired form and/or to deliver the power to the desired location. For example, the gear module can be used to convert the motors rotational speed (e.g., rotations per minute) to a desired rotational speed for the rotating section 222. As another example, the gear module can be used to increase (or decrease) the torque applied to rotating section 222.

Some embodiments of electronic circuitry 344 further include synchronization circuitry 354, which operates with synchronization circuitry 318 to monitor the rotation of rotating section 222 and to generate a synchronization signal that is communicated to targets 114. In one example, synchronization circuitry 354 is located vertically below the synchronization light generator (such as an LED) of synchronization circuitry 318. As rotating section 222 rotates, light from the light generator periodically becomes aligned with sync aperture 330 and a light detector of synchronization circuitry 354. This occurs, for example, once per rotation if rotating section 222 includes one aperture. Additional apertures are provided in some embodiments. When the light detector, such as a photo diode, receives light from the light generator, the light is converted into electricity that is detected by synchronization circuitry 354. At that time, synchronization circuitry generates a synchronization signal using one or more synchronization signal generators 360 that communicate the synchronization signal to targets 114.

In some embodiments, synchronization signal generators are light-emitting diodes that generate electromagnetic radiation having frequencies within (or substantially within) the infrared light spectrum. The infrared light spectrum includes, for example, electromagnetic radiation having a wavelength between 0.7 and 300 micrometers. In one example embodiment, the synchronization signal has a wavelength of about 940 nm. Other embodiments generate electromagnetic radiation having other wavelengths. Some embodiments use other synchronization signal generators, such as a radio-frequency communication device, or a visible light generator. Yet other embodiments communicate synchronization events using wired communications.

In some embodiments, scanner 102 further includes a control panel 362, such as provided at lower portion 208. Control panel 362 includes one or more output devices 364 and/or one or more input devices. Examples of output devices 364 include status indicators, such as a power status light, communication status indicators (such as a send light and a receive light), and a laser status light. Examples of input devices 366 include switches (or buttons), other controls, and data communication ports. An example of a switch is a power on/off switch for turning on or off scanner 102. Another example of a switch is a laser on/off switch. An example of a data communication port is an Ethernet communication port for data communication between scanner and a computing device (such as within cart 108). Such communication can be either direct communication or network communication. In some embodiments, the Ethernet communication port provides power to scanner 102. An example of a suitable Ethernet communication port is a Power Over Ethernet (POE) compatible port. Some embodiments include target data communication ports. Another example of a data communication port is a USB port. The USB port can be used, for example, for data communication between scanner 102 and another device (i.e., a computing device, a target, or another external device), or for plugging in a memory card (such as a USB memory stick). The memory card can then be used by scanner 102 to store data, or to retrieve data, such as a software update. In another possible embodiment, the USB port is a 'B' port and is not used to receive a USB memory stick in some embodiments. In some embodiments the USB port is used to configure and diagnose the system.

Some embodiments of scanner 102 further include one or more ports 368. An example of a port 368 is a power jack, such as for receiving power from a power adapter, AC power cable, or DC power cable. Some embodiments of electronic circuitry 344 include power supply circuitry, such as for filtering or otherwise transforming power received from port 368. In other embodiments, a power cord is provided instead of (or in addition to) port 368. Other ports are used in some embodiments.

FIGS. 4-7 illustrate several example embodiments of optics assembly 332 of scanner 102, such as shown in FIG. 3.

Figure 4:
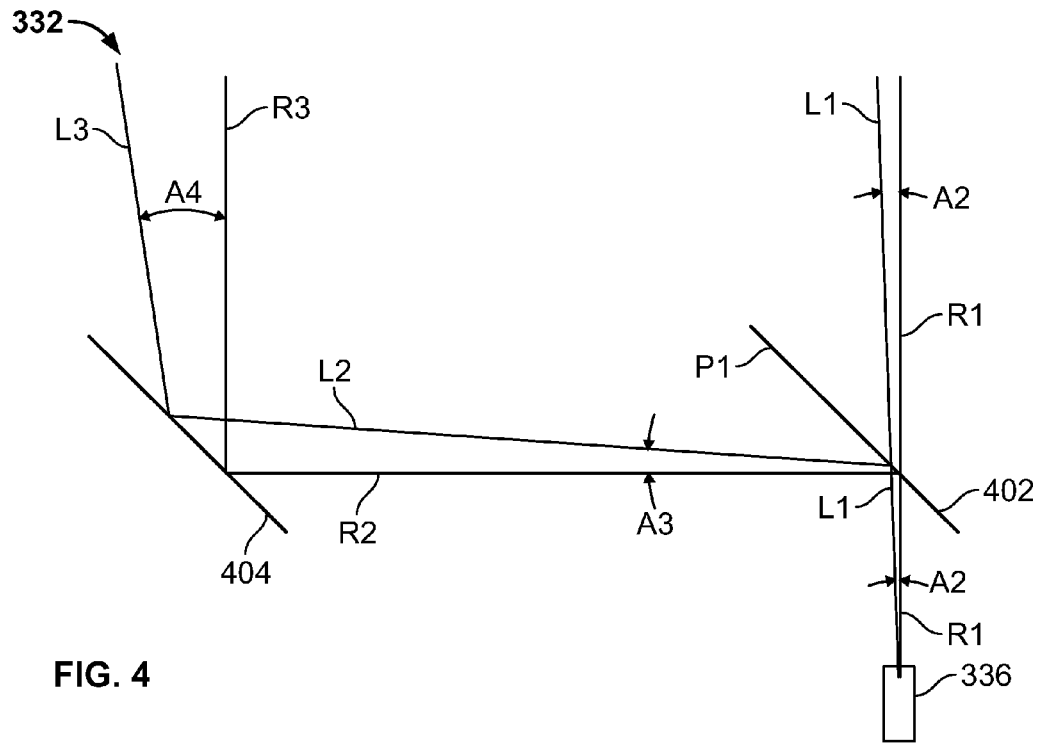
FIG. 4 is a block diagram of an example optics assembly.

FIG. 4 is a first embodiment of an example optics assembly 332. In this example, optics assembly 332 includes laser 336, beam splitter 402, and mirror 404.

Laser 336 generates a laser beam L1 that is directed toward beam splitter 402. Beam splitter 402 allows a portion P1 of the light to pass through (L1), while reflecting the remaining portion as beam L2. In some embodiments, P1 is in a range from about 40% to about 60%, and in some embodiments is about 50%. In some embodiments measurement of P1 is performed with light of a specific wavelength, such as 630 nm. In another embodiment, the specific wavelength of light generated by laser 336 is used to determine P1. After the laser beam L2 has reflected, beam L2 is then directed toward mirror 404, which is then reflected by mirror 404 as beam L3.

It can be difficult, however, to precisely align laser 336 during manufacturing. Even if precisely aligned, the laser angle may shift during use, particularly with solid-state lasers. For example, a reference direction R1 is a desired location of laser beam L1. If laser beam is slightly misaligned or shifted, as shown, laser beam L1 can deviate by an angle A2 from the reference direction. As a hypothetical, assume L1 deviates from reference direction R1 by an angle A2 of 2°.

When beam L1 is reflected into beam L2 by beam splitter 402, the deviation angle is multiplied by the reflection of beam splitter 402. As a result, beam L2 now deviates from a desired reference direction R2 by an angle of A3. In the hypothetical, the angle A3 is now 4°, or twice A2. Beam L2 is then reflected by mirror 404 as beam L3. A deviation is now further multiplied, such that beam L3 deviates from reference direction R3 by a deviation angle A4. In the hypothetical, angle A4 is 8°, or double angle A3, and quadruple angle A2. The difference between beams L1 and L2 is 6° (the difference between A4 (8°) and A2 (2°)).

As a result of the deviation, some embodiments include a calibration operation in which laser 336 is carefully and precisely aligned within a small tolerance range, such as within a fraction of an angle to a reference direction R1. In some embodiments a calibration operation is performed to measure the deviation angle. In some embodiments, mathematical corrections are performed on the resulting data to correct for the known or estimated deviation angle.

Figure 5:
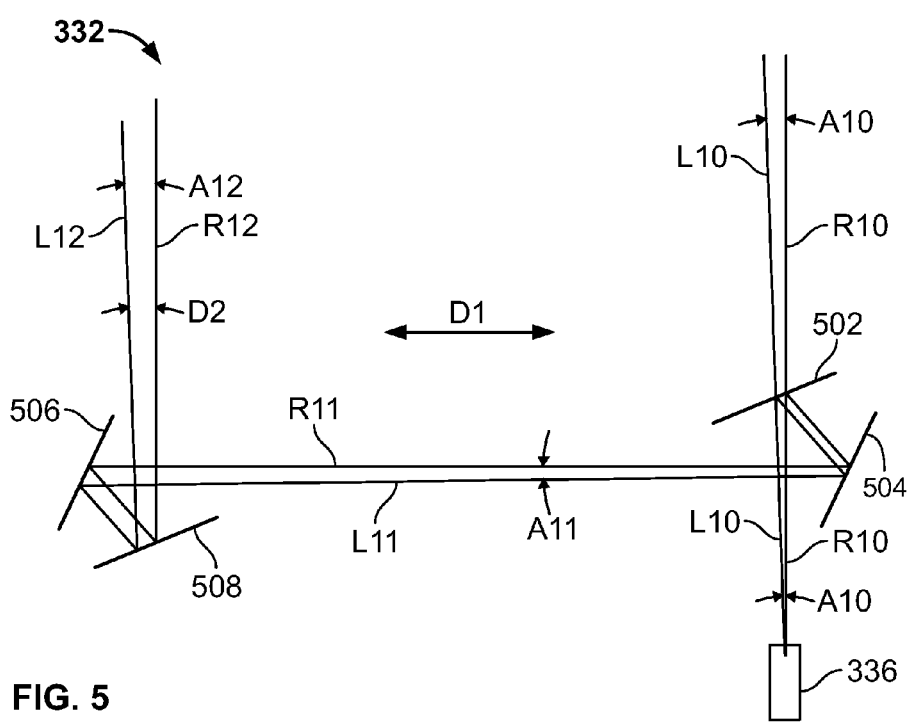
FIG. 5 is a block diagram of another example optics assembly.

FIG. 5 is a second embodiment of an example optics assembly 332. In this example, optics assembly 332 includes laser 336, and mirrors 502, 504, 506, and 508. Mirror 502 allows a portion of the light to pass through, while reflecting the remaining portion. In some embodiments the mirror 502 allows a portion in a range from about 40% to about 60% to pass through, and in another embodiment allows a portion of about 50% to pass through.

Laser 336 generates laser beam L10. Due to the difficulty of precisely aligning the laser beam L10 generated by laser 336 along a desired reference direction R10, a deviation angle A10 can result. However, in this embodiment the deviation angle A10 is not multiplied. In a hypothetical example, angle A10 is 2°.

A portion of laser beam L1 is reflected by mirror 502 toward mirror 504, which is in turn reflected by mirror 504 toward mirror 508. Mirrors 502 and 504 are positioned and angled relative to each other such that the resulting laser beam L11 is reflected substantially 90° from the incoming direction. Because laser L11 is reflected at 90° regardless of whether it is deviating from the reference direction or not, the mirrors 502 and 504 do not multiply the deviation angle. In the hypothetical example, the deviation angle remains at 2°.

In some embodiments, mirrors 502 and 504 are surfaces of a first pentaprism, and mirrors 506 and 508 are surfaces of a second pentaprism. Each pentaprism includes surfaces that act as mirrors 502 and 504 or 506 and 508 to reflect incoming light substantially 90°.

Beam L11 then impinges upon mirror 508, which reflects beam L11 toward mirror 506. The laser beam is the reflected by mirror 506 as laser beam L12. As previously discussed, mirrors 506 and 508 are positioned and aligned so as to reflect an incoming beam substantially 90°. As a result, the deviation angle A12 of laser beam L12 from the reference direction R12 is not further multiplied. In the hypothetical example, angle A12 remains at 2°.

A10 and A12 have the same angle, such that the difference between angles A10 and A12 is substantially zero. As a result, laser beams L10 and L12 remain substantially parallel will a small deviation in laser angle A10.

Although the deviation angles A10, A11, and A12 do not change in some embodiments, the distance traveled by beam L10, L11, and L12 does cause a small deviation distance D2. The deviation distance can be calculated using the formula:

$$D2 = D1 \times \sin(A10)$$

where D1 is the overall distance that the laser beam L10, L11, and L12 has traveled.

Figure 6:
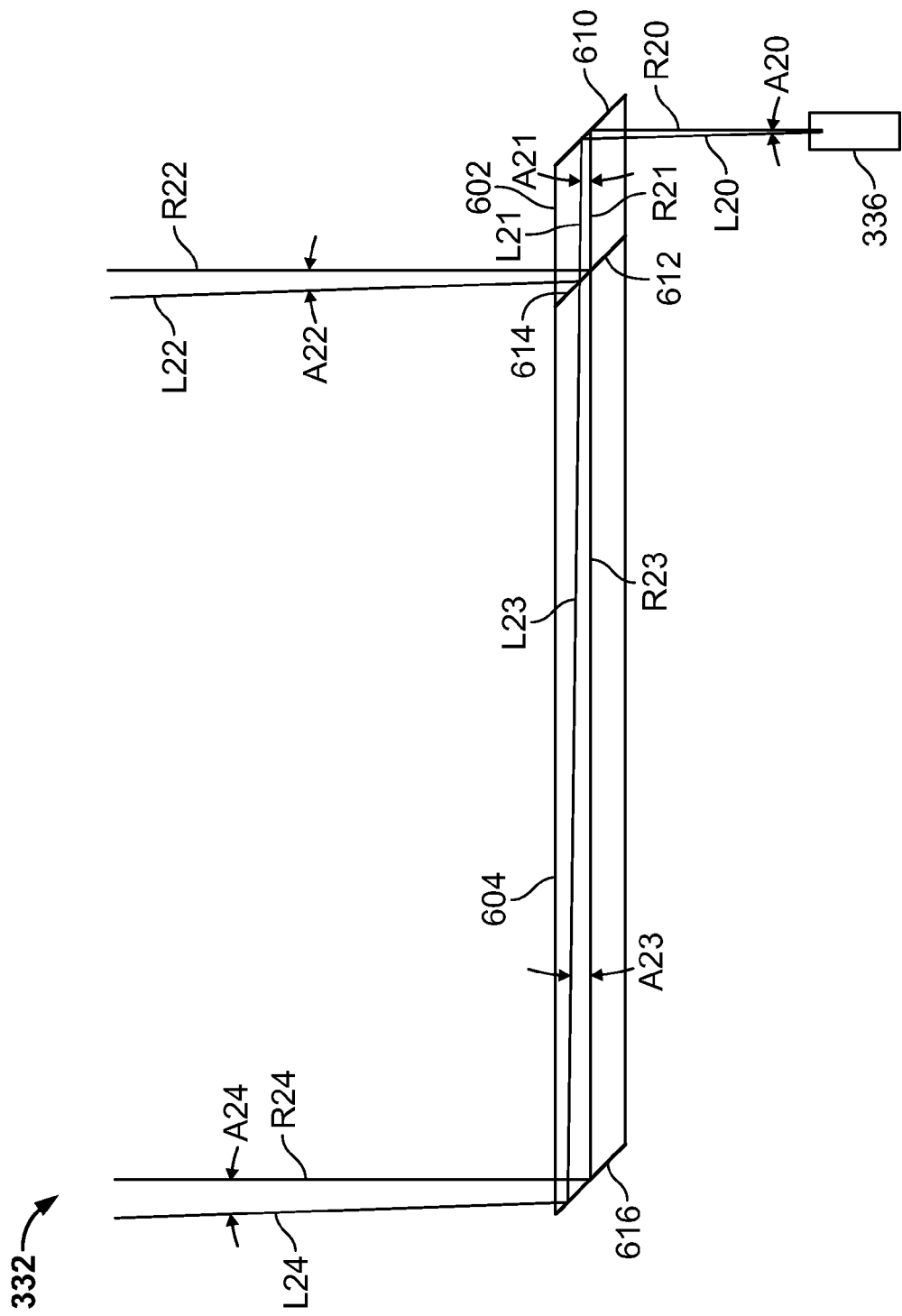
FIG. 6 is a block diagram of another example optics assembly.

FIG. 6 is a third embodiment of an example optics assembly 332. In this example, optics assembly 332 includes a first rod 602 and a second rod 604. The first rod includes surface 610 at a first end and surface 612 at a second opposing end. The second rod includes surface 614 at a first end and surface 616 at a second opposing end.

In one example embodiment, rods 602 and 604 are made of glass or other transparent or translucent materials. Rods 602 can be formed of a one or more solid cylindrical rods, or solid rectangular rods, for example. Surfaces 610, 612, 614, and 616 are beveled at desired angles, such as substantially 45° angles. Surfaces 612 and 614 are aligned and in facing relationship. In some embodiments surfaces 612 and 614 are abutted together. In other embodiments surfaces 612 and 614 are fastened together, such as with an adhesive (i.e., glue) or other fastener, such as tape or a bracket. In some embodiments rods 602 and 604 are inserted within an orifice within a block, and orifices are provided to allow laser beams L22 and L24 to pass therethrough. In some embodiments, one or more of rods 602, 604, or the combination of rods 602 and 604 have a rhombic shape, and are therefore sometimes referred to herein as rhombic prisms. In some embodiments, one or more of the rods have a side cross-sectional shape of a rhomboid—a parallelogram in which the angles are oblique. Some embodiments have adjacent sides of unequal lengths. Some embodiments have a side cross-sectional shape of a rhombus—a parallelogram in which the angles are oblique and adjacent sides are of substantially equal length. In some embodiments, one or more of rods 602 and 604 are made of two or more pieces.

In an example embodiment, rods 602 and 604 have a substantially square lateral cross-section, having a width in a range from about 1 mm to about 20 mm, and preferably in a range from about 3 mm to about 8 mm. In an example embodiment, an offset distance between laser beam L20 and laser beam L22 is less than about 20 mm, and preferably in a range from about 3 mm to about 7 mm.

Laser beam L20 is generated by laser 336, and as discussed above, may deviate from a desired reference direction R20, such as by an angle A20. In a hypothetical example, angle A20 is 2°.

Beam L20 passes through a side of rod 602 and impinges on the interior side of surface 610. Preferably surface 610 is mirrored to reflect all or substantially all of the laser beam internally, resulting in laser beam L21. The deviation angle is multiplied by the reflection, such that angle A21 is double angle A20. In the hypothetical example, angle A21 is 4°.

One or more of surfaces 612 and 614 are mirrored such that a portion of laser beam L21 is reflected out of optics assembly 332 as laser beam L22 and the rest is passed into rod 604. The deviation angle of laser beam L22 is multiplied by mirror surface 612 or 614, such that angle A22 is double that of angle A21. In the hypothetical example, angle A22 is 8°. In this example embodiment, laser L21 approaches the mirror (including surfaces 614 and 612) from one side, and laser beam L23 passes through the other side on its path to surface 616. This is in contrast to the embodiment shown in FIG. 4, where laser beam L1 approaches mirror 402 from one side, and laser beam L2 reflects from that same side toward mirror 404. The alignment of the laser beams is therefore improved in the embodiment shown in FIG. 6.

The rest of laser beam L21 continues into rod 604 as beam L23. The deviation angle A23 is unchanged from angle A21 by passing through surfaces 612 and 614. Beam L23 then impinges on the interior side of surface 616. Surface 616 is mirrored such that beam L23 is reflected out of optics assembly 332 as laser beam L24. The deviation angle A24 is multiplied by the reflection at surface 616, such that angle A24 is double that of angles A21 and A23. In the hypothetical example, angle A24 is 8°.

In this example, however, the deviation angles A22 and A24 are substantially equal. As a result, the difference between the angles is substantially zero. As a result, laser beams L22 and L24 are substantially parallel. In some embodiments the distance between beams L22 and L24 is in a range from about 50 mm to about 200 mm, and preferably from about 80 mm to about 120 mm. In one specific example, the distance between beams L22 and L24 is about 101.6 mm. In some embodiments, laser beam L22 and L24 is parallel to less than 10 mrad in both axes, and preferably to less than 3 mrad in both axes.

As noted above, some embodiments involve determining the deviation angle and correcting measurements accordingly. Such a determination of the deviation angle can be performed, for example, during a calibration operation.

In some of the embodiments discussed above, anti-reflective coatings are provided at interfaces where reflection is not desired, such as on the side of rod 602 where laser beam L20 enters rod 602, and on the side of rod 604 where laser beam L24 exits rod 604. In some embodiments, reflective coatings are provided on surfaces where it is desired that substantially all of the laser beam be reflected, such as surface 610 and surface 616.

An alternative to the embodiment shown in FIG. 6 is to replace rod 602 with a combination of a prism and a beam splitter. Laser L20 is first directed into the prism, and then reflected into the beam splitter, where laser beams L22 and L23 are separated. Similarly, rod 604 is replaced in some embodiments with a glass rod with flat ends, where one of the ends is aligned with the beam splitter to receive laser beam L23. A prism is then arranged at the other end of the rod to reflect the laser beam as laser beam L24. Other embodiments include yet other optical arrangements.

FIG. 7 is a fourth embodiment of an example optics assembly 332. In this example, optics assembly includes laser 336*a* and laser 336*b*. Laser 336*a* generates a laser beam L31. Laser 336*b* generates a laser beam L32.

In this example, separate lasers are used to generate the laser beams L31 and L32. It is possible that laser 336*a* and laser 336*b* will be slightly misaligned from the desired reference directions R31 and R32. For example beam L31 may be misaligned by an angle A31, while beam L32 may be misaligned by an angle A32. In this example, however, there may not be any correlation between angles A31 and A32, such as if they are separately mounted and secured within scanner 102.

Figure 8:
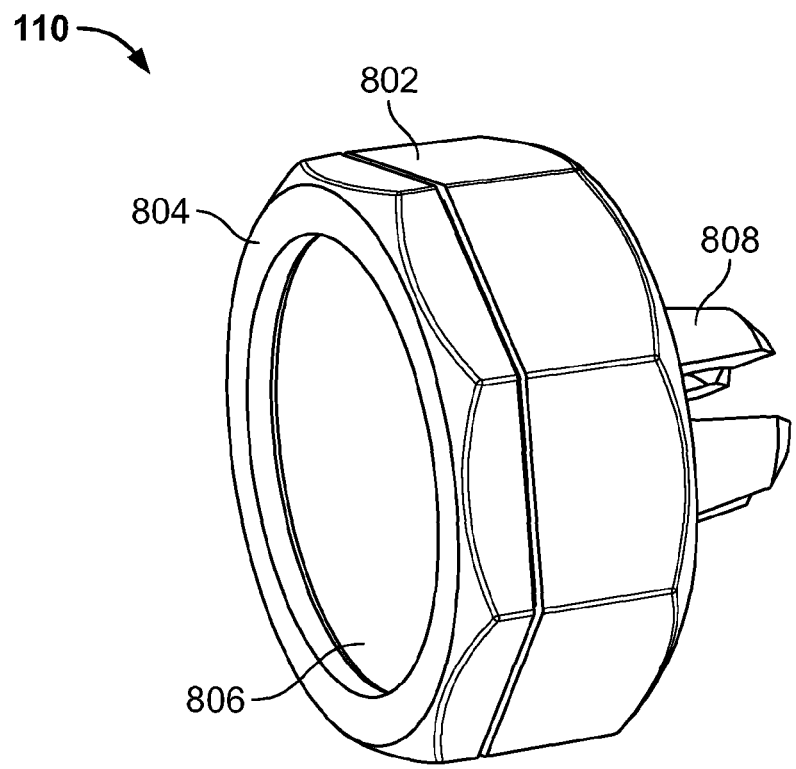
FIG. 8 is a perspective view of an example attachment device of the measurement system shown in FIG. 1.
Figure 9:
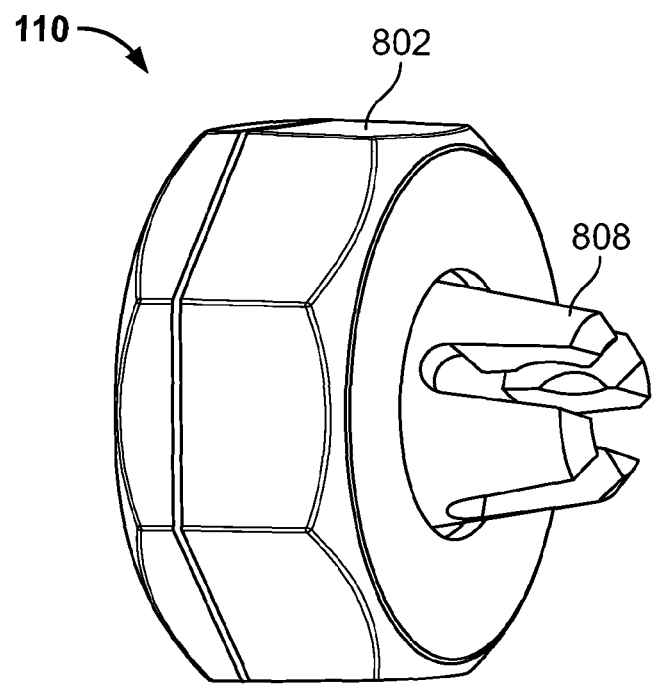
FIG. 9 is another perspective view of the example attachment device shown in FIG. 8.
Figure 10:
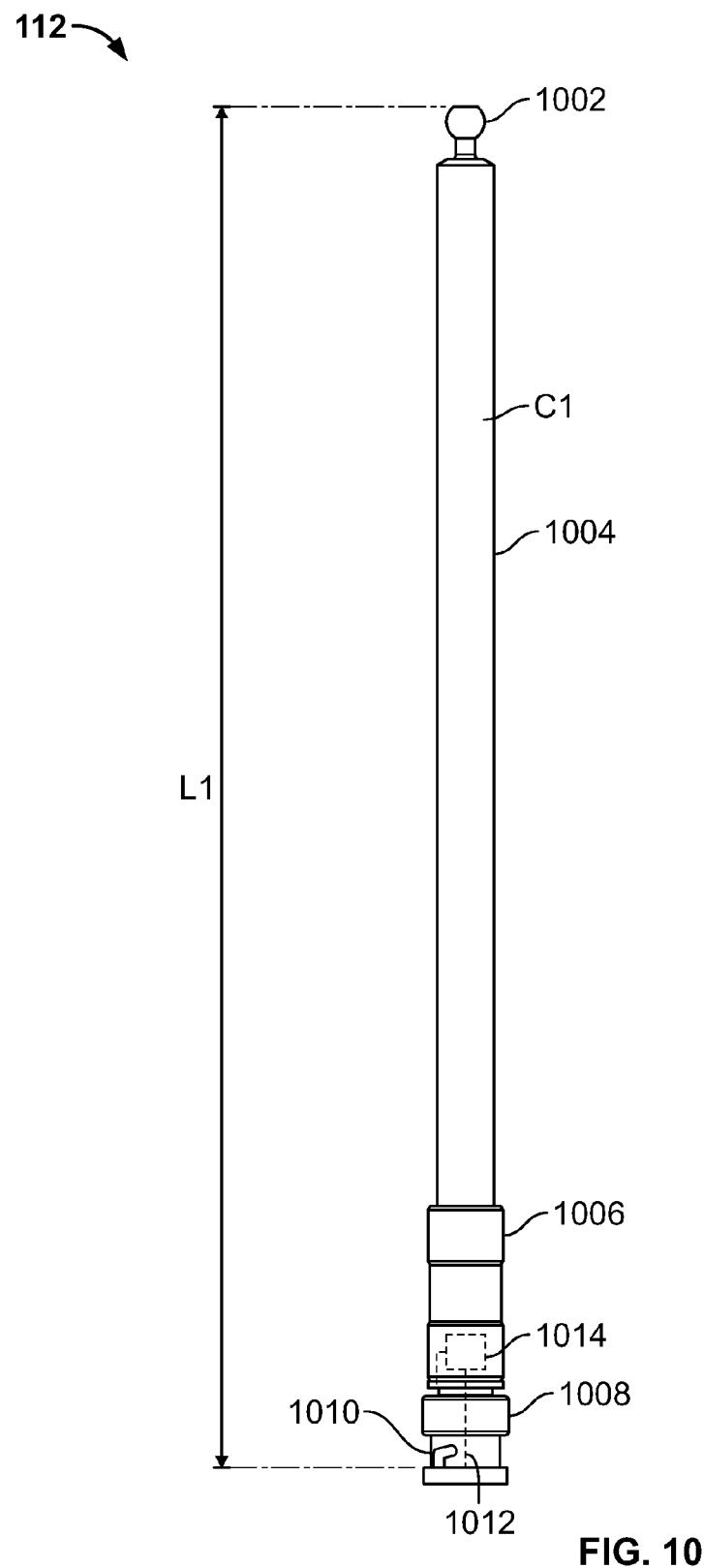
FIG. 10 is a side view of an example stem of the measurement system shown in FIG. 1.
Figure 11:
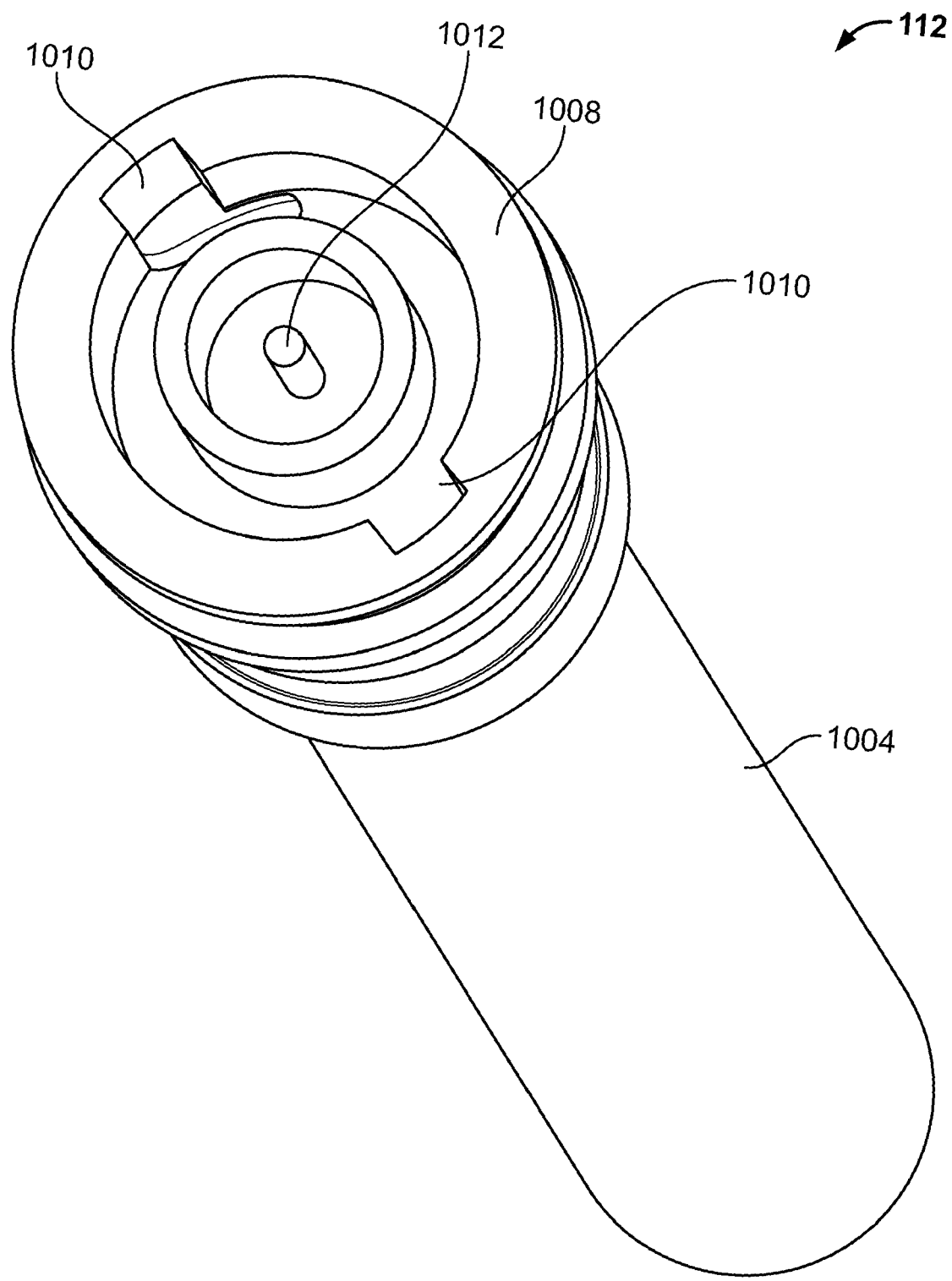
FIG. 11 is a perspective end view of the example stem shown in FIG. 10.

FIGS. 8-15 illustrate example embodiments of target assembly 104, such as including an attachment device 110, stem 112, and target 114. FIGS. 8-9 illustrate an example of attachment device 110. FIGS. 10-11 illustrate an example of stem 112. FIGS. 12-15 illustrate an example of target 114.

FIG. 8 is a perspective view of an example attachment device 110. FIG. 9 is another perspective view of the example attachment device 110, shown in FIG. 8. The attachment device is configured to attach to a frame 94 (or other portion) of a vehicle 90, such as illustrated in FIG. 1.

In this example, attachment device 110 includes a body 802 and stem engagement device 808. Body 802 includes a face surface 804 that is configured to abut a surface of frame 94. Attachment device 110 includes a fastener 806, such as a magnet, that magnetically attaches attachment device 110 to frame 94 at a desired location. In some embodiments fastener 806 is a rare-earth magnet that provides a relatively high attachment force. Other embodiments include other fasteners 806, such as an adhesive, tape, clip, hook, bolt, nail, strap, or other device capable of fastening to frame 94 or other portion of a vehicle. In some embodiments face surface 804 has a ring-shape that protrudes from a central region. The protrusion permits a bolt, screw, or other protruding feature of frame 94 to be received therein.

Attachment device 110 typically includes a stem engagement device 808 configured to engage with a portion of stem 112. In some embodiments stem engagement device 808 forms a socket joint for receiving a ball portion of stem 112. The socket joint permits the ball portion to pivot within the socket. Ball portion of stem 112 can be inserted by applying a sufficient insertion force, which causes arms of stem engagement device 808 to expand to receive the ball portion into the socket. Similarly, a sufficient removal force will cause arms of stem engagement device 808 to expand, thereby releasing the ball portion from the socket. Other stem engagement devices are used in other embodiments.

In some embodiments, attachment device 110 is used with an adapter. The adapter is arranged between the attachment device 110 and the frame. A variety of different adapters can be used to permit attachment to various features of the frame, such as holes, studs, bolts, or other features of the frame. In some embodiments, magnets are included within the adapter rather than, or in addition to being in attachment device 110. One or more small round magnets are used in some embodiments, which can be pressed into holes formed in the adapter body, which may be formed of aluminum or one or more other non-ferrous materials. In another embodiment, a magnetic ring is used, with or without non-ferrous material added to it.

FIGS. 10-11 illustrate an example stem 112. FIG. 10 is a side view and FIG. 11 is a perspective end view. In this example, stem 112 includes ball portion 1002, extension member 1004, coupler 1006, and connector 1008.

Stem 112 is configured to connect between attachment device 110 and target 114. Stem 112 allows target 114 to hang a distance L1 below attachment device 110, so that target 114 can be arranged within the path of laser beams 103, as shown in FIG. 1.

Ball portion 1002 is configured to engage with stem engagement device 808 to allow stem to be hung from attachment device 110, when the attachment device 110 is connected to a frame 94. Other joints or fasteners are used in other embodiments.

Ball portion 1002 extends from an end of extension member 1004. Extension member performs the function of separating ball portion 1002 from connector 1008 by a desired distance. In some embodiments a plurality of differently sized stems 112 are provided as a kit, and the user can select from the plurality of differently sized stems to obtain a stem 112 that has a length L1 suitable to lower the target 114 into the path of laser beams 103. In some embodiments extension member 1004 is color coded with a color C1. The color C1 is associated with a length L1 of that particular stem 112. An example of the color coding is illustrated in Table 1.

TABLE 1

Stem Length Color Codes

| Type | Stem Color | Length L1 (mm) | Kit Quantity | Resistance (ohms) |
|---|---|---|---|---|
| Lower Stem | Black | 44.73 | 10 | 1K |
| Lower Stem | Silver | 75.72 | 10 | 1.8K |
| Lower Stem | Red | 155.23 | 10 | 2.7K |
| Lower Stem | Gold | 232.77 | 10 | 3.7K |
| Lower Stem | Green | 312.88 | 10 | 4.8K |
| Lower Stem | Blue | 392.53 | 10 | 5.9K |
| Lower Stem | Purple | 472.87 | 10 | 7.15K |
| Upper Stem | Red | 177.53 | 6 | — |
| Upper Stem | Gold | 252.54 | 6 | — |

In this example, a kit comes with a plurality of differently sized stems 112. The lengths L1 are, for example, the overall length from the top of the ball portion 1002 to the bottom of connector 1008. In some embodiments this data is stored as a lookup table in memory of a computing device. In some embodiments additional data regarding relevant lengths is stored in memory. For example, in some embodiments a distance from a center point of ball portion 1002 to a center line of target 114 is computed for each stem 112, when the target assembly 104 is fully assembled. This distance is referred to as the optimized functional length of the stem 112. This value is subsequently used, in some embodiments, to determine the location of the feature of frame 94 to which attachment device 110 is attached, as discussed below. The example kit described in Table 1 is only one possible example of a kit. Other possible embodiments include other quantities and collections of stems.

In some embodiments multiple types of stems are included. For example, lower stems 112 are used as illustrated in FIG. 1 to hang a target from a location on frame 94. Upper stems are used in cooperation with an upper tram, discussed in more detail herein, to hang target 114 from the upper tram.

A coupler 1006 is used in some embodiments to connect extension member 1004 with connector 1008. Connector 1008 is, for example, a device that connects stem 112 with a target 114. In some embodiments connector 1008 is a male Bayonet Neill-Concelman (BNC) type of connector, although other embodiments include other connectors. In some embodiments BNC connectors include one or more slots 1010 for receiving corresponding pins of a female BNC connector, which allows the female connector to be inserted straight into connector 1008 and then rotated to lock the female connector in place within the male connector 1008. To remove the female connector, a slight inward force is applied, and then the female connector is rotated and removed out from the male connector 1008.

In some embodiments, connector 1008, and/or coupler 1006 are water tight and sealed from fluid intrusion (when connector 1008 is mated with the female connector). This prevents water (such as from vehicle 90) from entering the connector 1008.

In some embodiments stem 112 includes an automatic identification device that allows target 114 to identify which stem 112 it is connected to. An example of an automatic identification device is a conductive element coupled to a resistive element 1014. The resistance of the resistive element can be detected by the target by an electrical connection between the conductive element 1012 and the connector 1008 housing, for example. Once the resistance is known, the target 114 (or another device) uses a lookup table, in some embodiments, to determine the length L1 of the associated stem 112. Other identification devices are used in other embodiments. For example, other electrical components can be used, such as a capacitor (having a given capacitance) or inductor (having a given inductance) to identify the device. Yet other embodiments include an RFID tag or wireless transmitter. Another embodiment includes an integrated circuit or microprocessor that communicates identification information to target 114. In some embodiments, targets turn on automatically when stem 112 is connected to it.

Figure 12:
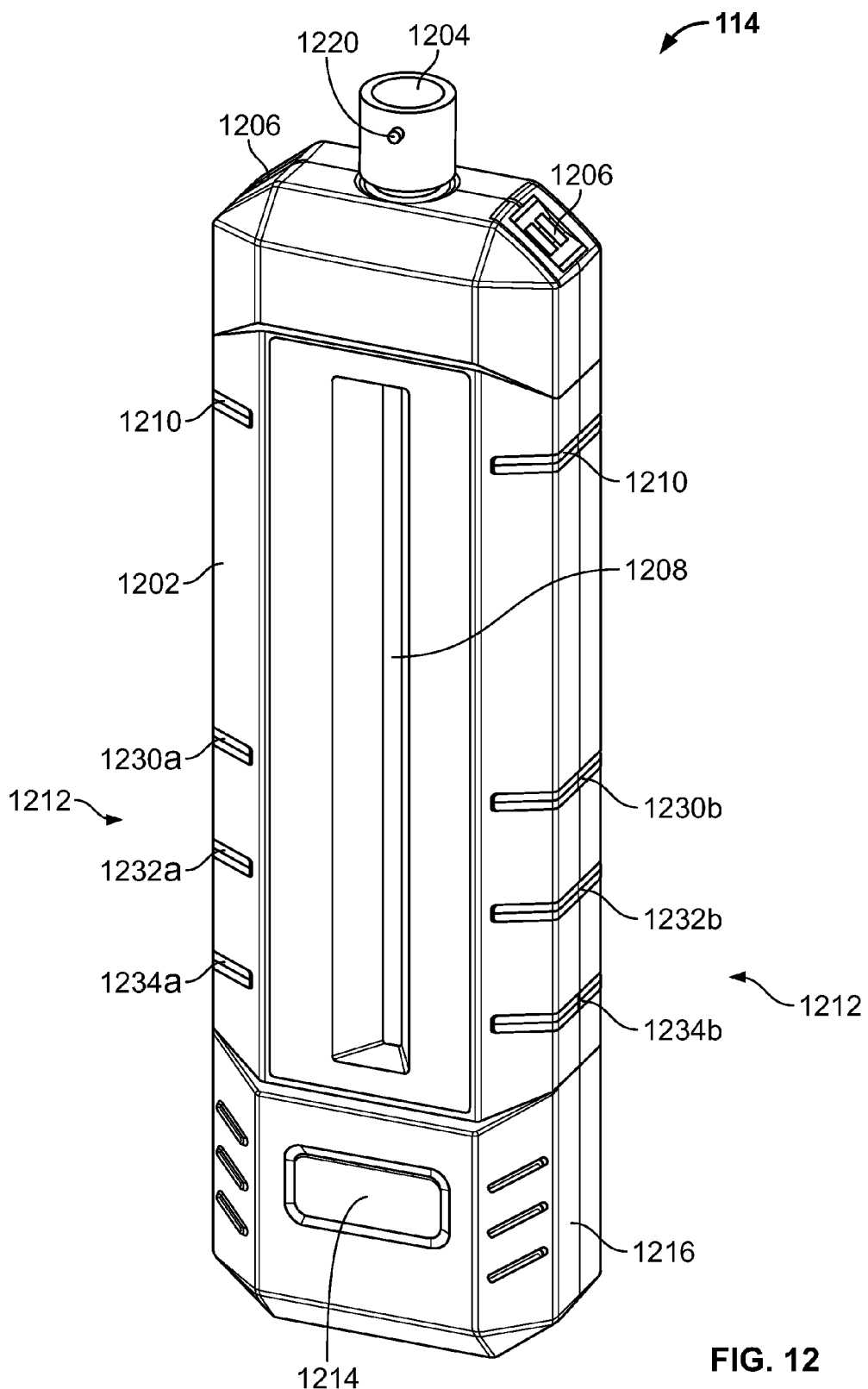
FIG. 12 is a front perspective view of an example target of the measurement system shown in FIG. 1.
Figure 13:
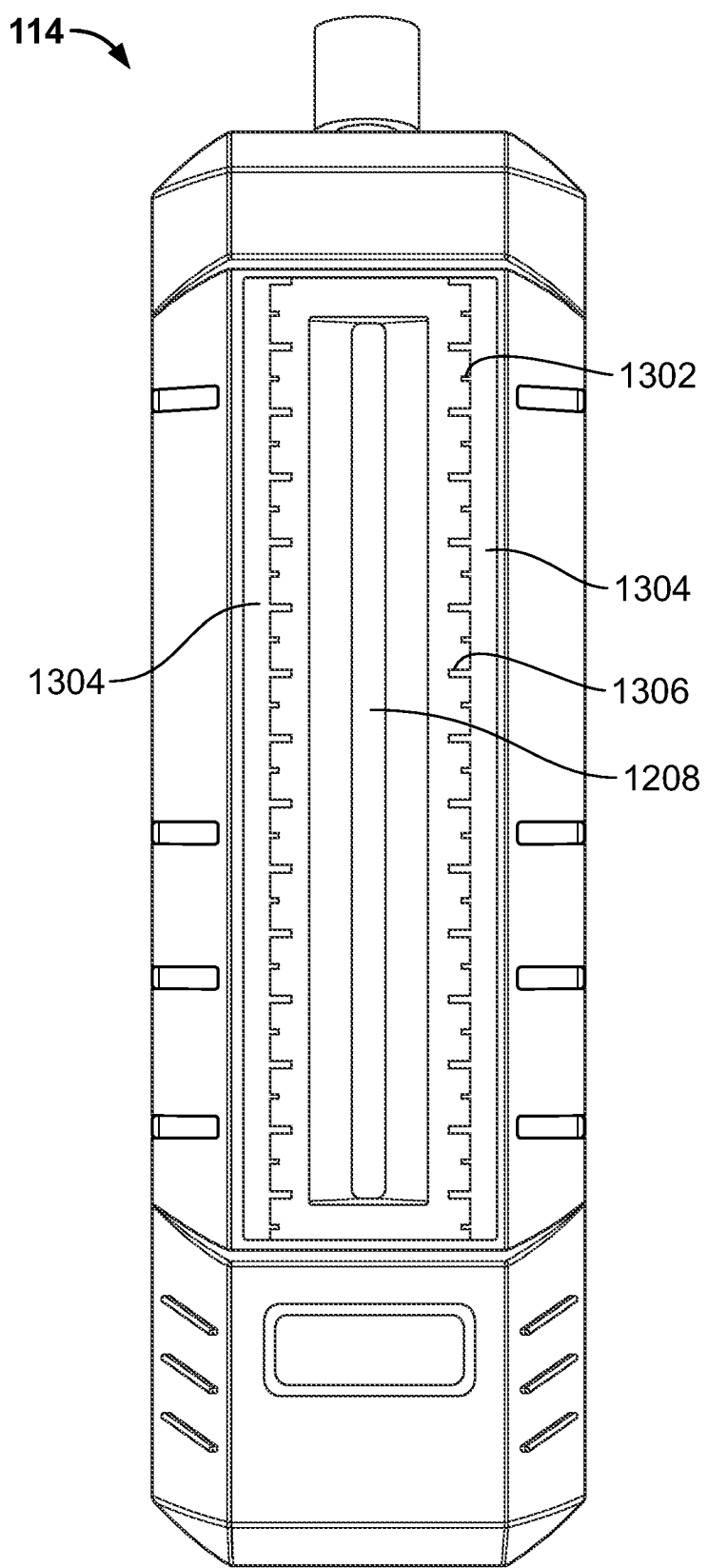
FIG. 13 is a front elevational view of the example target shown in FIG. 12.
Figure 14:
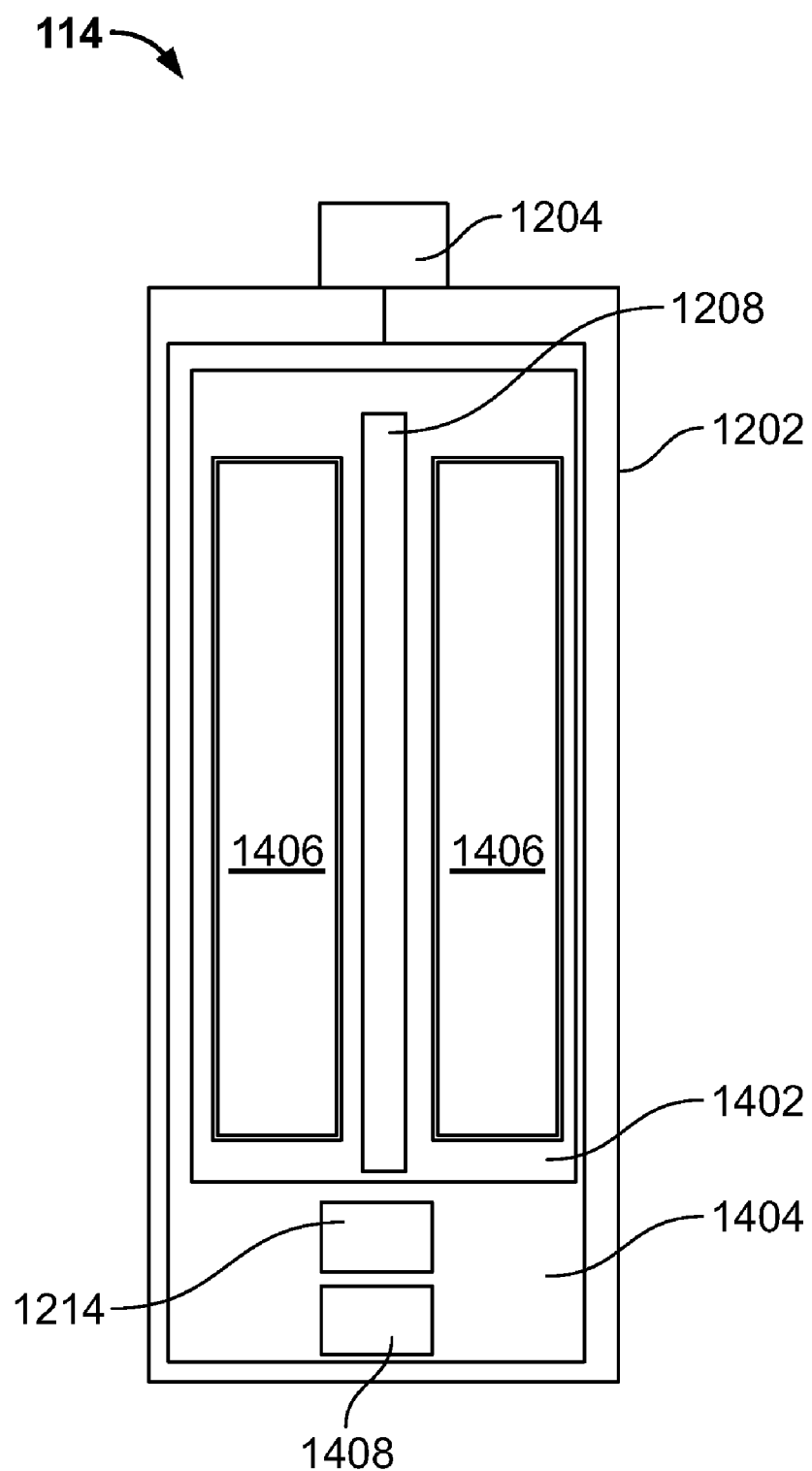
FIG. 14 is a front cross-sectional block diagram of the example target shown in FIG. 12.
Figure 15:
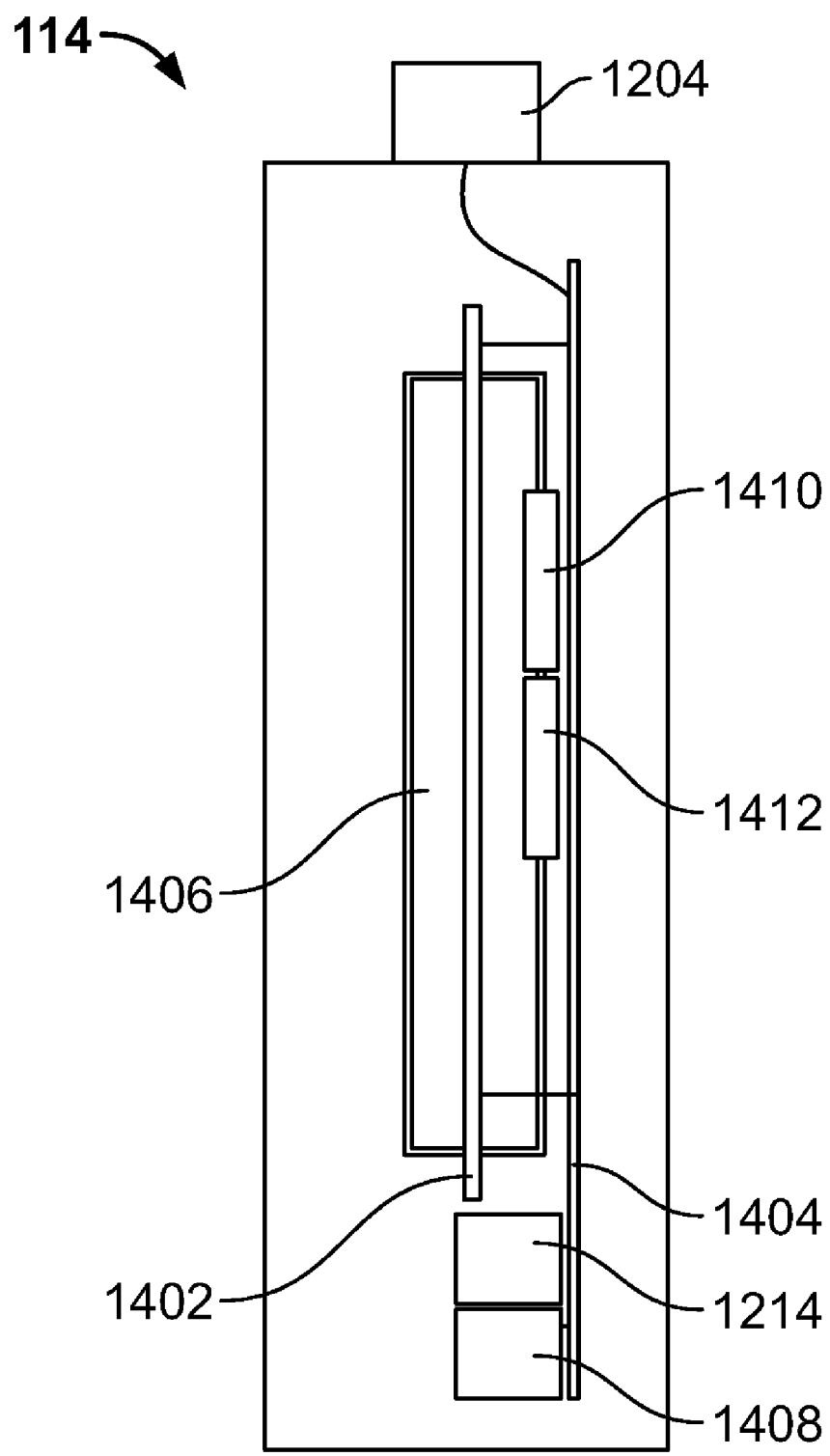
FIG. 15 is a side cross-sectional block diagram of the example target shown in FIG. 12.

FIGS. 12-15 illustrate examples of target 114. FIG. 12 is a front perspective view, FIG. 13 is a front elevational view, FIG. 14 is a front cross-sectional block diagram, and FIG. 15 is a side cross-sectional block diagram.

In some embodiments, target 114 includes a housing 1202, connector 1204, charging contacts 1206, optical detector 1208, status indicators 1210, position indicators 1212, synchronization detector 1214, and boot 1216.

Housing 1202 forms a protective enclosure for target 114, which contains various components therein, such as electrical circuitry, a circuit board, and batteries. In some embodiments, housing 1202 is sealed against fluid intrusion. An example of a suitable material for housing 1202 is a polymer, such as plastic. Other embodiments include other materials.

Connector 1204 is provided in some embodiments to connect target 114 with stem 112. An example of connector 1204 is a female BNC connector. In some embodiments connector 1204 includes one or more pins 1220 that are configured to engage with slots 1010 of stem connector 1008. In another possible embodiment, connector 1204 is a male connector, while connector 1008 is a female connector. Yet other connectors are used in other embodiments. In this example, connector 1204 is coupled to an upper portion of housing 1202, and is substantially aligned with a vertical center of mass of target 114 so that target 114 will hang substantially vertically when suspended by attachment device 110 and stem 112. In some embodiments, one or more of connectors 1204 and 1008 are spring loaded.

Charging contacts 1206 are provided in some embodiments to receive power from an external source for recharging batteries contained within target 114. In some embodiments target 114 includes a battery recharging module that is electrically connected to charging contacts. The battery recharging module includes, for example, electronics configured to properly recharge the batteries, such as a smart charger that prevents overcharging of the batteries. In some embodiments the battery recharging module is configured to perform trickle charging to maintain a battery in a fully charged state after recharging. Other embodiments do not include a battery recharging module, which may, instead, be provided by an external device, such as cart 108 as discussed in more detail herein.

Optical detector 1208 is provided in some embodiments to detect light generated by scanner 102. An example of an optical detector is a sensor array, such as an array of photodiodes. The optical detector 1208 operates to detect when a laser beam 103 of scanner 102 hits optical detector 1208. Also, in some embodiments, the optical detector 1208 further determines a position along the optical detector 1208 where the laser beam 103 made contact with the optical detector 1208. In some embodiments the optical detector is arranged co-axial with a vertical center of gravity of target 114.

An example of a photodiode array is a plurality of photodiodes arranged along an imaginary line. In one example, the cathodes of each of the photodiodes are shorted to a voltage source, while the anodes of the photodiodes are electrically coupled along a resistive ladder. Electrical circuitry is then coupled to each end of the photodiode array to detect the respective currents (or voltages). In an example embodiment, the optical detector 1208 is a sensor array including a plurality of optical sensors, the number of optical sensors being in a range from about 10 to about 100, and in another possible embodiment, being in a range from about 20 to about 40. In some embodiments the optical detector 1208 has a vertical height in a range from about 5 cm to about 30 cm, and in another possible embodiment, from about 10 cm to about 15 cm.

In some embodiments, optical detector 1208 operates to generate instantaneous peak signals from each end of the sensor array. The ratio of the difference over the sum of these two signals provides an approximate position that the laser beam 103 was detected along the range of the optical detector 1208. In some embodiments the sensor array is non-linear. A look-up table with interpolation is used in some embodiments to identify the position of the laser beam with respect to the optical detector 1208. The lookup table is stored in memory in some embodiments, such as on target 114, or on scanner 102, or on a computing device, such as within cart 108.

Another example of an optical detector includes a fluorescent bar. The fluorescent bar is made of a material that can absorb light generated by the laser beam 103 in scanner 102. For example, laser beam 103 is an ultraviolet laser beam. Once the fluorescent bar has absorbed light from laser beam 103, the fluorescent bar fluoresces. In some embodiments, the fluorescing is detected by photocells positioned at each end of the fluorescent bar. The position of the laser beam along the fluorescent bar can then be determined by comparing the signals from each photocell, such as by taking a ratio of the difference over the sum and linearizing the result with a look-up table. Some embodiments include multiple optical detectors 1208, such as sensor array and a fluorescent bar.

One or more status indicators 1210 are provided in some embodiments to indicate an operating status of target 114. In some embodiments, status indicators 1210 include one or more lights, such as light emitting diodes. The lights are arranged in some embodiments such that at least one light is visible from any horizontal direction (when target 114 is arranged vertically as shown), such as in any location 360° around target 114. As shown in FIG. 12, some embodiments include status indicators 1210 on the left and right sides, as well as portions of the front and back sides (the rear side of the status indicator being a mirror image of the front side). Other embodiments include other configurations.

One of more status codes are provided by status indicators 1210. For example, in some embodiments the status indicator turns on when the target 114 is powered on in some embodiments, and turns off when the target 114 is powered off. In another possible embodiment, multiple different colored lights are used to represent different statuses. For example, in one possible embodiment the following status lights are used: (1) red indicates that an error has been detected, (2) blue indicates that the target is on and has received a sync signal but not detected a laser beam, (3) green indicates that the target is on and has received a sync signal and detected a laser beam, and (4) magenta indicates that the target is on but is not detecting sync or laser beams. Status lights can be constant on or flashing. In some embodiments, the computing device sends a message to a target 114 through scanner 102 asking the target to identify itself. When target 114 receives the message, a white status light flashes so that the operator can identify the particular target.

Position indicators 1212 are provided in some embodiments to provide a visual indication of the position of target 114 relative to an expected or desired position. Some embodiments do not include position indicators 1212, while other embodiments include one or more position indicators 1212.

One possible embodiment includes a single position indicator 1230. The position indicator 1230 can include multiple lights, in some embodiments, so that it is more easily visible from different locations around target 114. For example, left position indicator 1230a can include one or more lights that are easily visible toward the left side of target 114, while right position indicator 1230b can include one or more lights that are easily visible toward the right side of target 114.

The position indicator 1230 indicates, for example, how close to the expected position the target 114 is at a given time. Multiple differently colored lights are provided in some embodiments, such as a red light, a yellow light, and a green light. The red light indicates that the target 114 is outside of a specified range of positions. The yellow light indicates that the target 114 is within a specified range of acceptable positions. The green light indicates that the target is within a preferred range of positions.

As one example, suppose that a target 114 is initially positioned so that it is outside of a specified range of positions. In this situation, the position indicator 1230 of target 114 may be red. An operator may then use a winch or other device to attempt to adjust the frame. While the adjustment is being made, the target 114 continues to monitor its current position and adjusts the position indicator 1230 to yellow as soon as the position comes to within a specified range of acceptable positions. The operator may continue adjusting the frame, for example, until the position indicator 1230 is adjusted to green, showing that the target 114 (and the frame to which it is ultimately attached) is within a preferred range of positions.

In some embodiments, if the operator inadvertently adjusts the frame too far, such that target detects that the position has started to go outside of the preferred range of positions in the opposite direction from the original position, the position indicator 1230 illuminates a different colored (e.g., blue) light to indicate that the adjustment has gone too far and that the target is not within the preferred range of positions. If the adjustment continues in the wrong directly, a magenta light is used to indicate that the operator has gone far past the original position.

It is noted that although the position of the target is sometimes referred to herein, a position of the stem, a position of an attachment device, or a position of a part of a frame can alternatively be used by computing the respective distance that the position is from the target position.

Another possible embodiment includes multiple position indicators, such as three position indicators including height indicator 1230, width indicator 1232, and length indicator 1234. In this embodiment, height indicator 1230 indicates the height position of target 114 with respect to an expected height, width indicator 1232 indicates a width position of target 114 with respect to an expected width position, and length indicator 1234 indicates a length position of target 114 with respect to an expected length. In this way, target 114 provides a visual indication to the operator that tells the operator whether the frame to which the target 114 needs to be adjusted vertically, laterally, longitudinally, or a combination of these.

The terms longitudinally and laterally are used with respect to the length of the vehicle, such that a longitudinal axis extends between the front and rear of the vehicle, and a lateral axis extends between left and right sides of the vehicle.

A synchronization detector 1214 is provided in some embodiments to detect a synchronization signal, such as generated by scanner 102. The synchronization detector is, for example, an infrared detector.

A protective boot 1216 is provided on one or more external surfaces of housing 1202 in some embodiments, such as around a bottom portion of target 114. The boot 1216 is typically made of a shock absorbing material, such as a rubber material, to protect target 114 from a sudden shock, such as if the target 114 is accidentally dropped or otherwise comes into contact with another object. In some embodiments, protective boot 1216 also acts to protect other objects in case of contact with target 114. For example, protective boot 1216 can protect a body of a vehicle from an unintended scratch or dent if target 114 were to make contact with the body.

FIG. 13 is a front view of an example target 114. In this example, housing 1202 includes a face surface 1302 that surrounds optical detector 1208.

In some embodiments, at least portions of face surface 1302 have a color. The color is selected such that the laser beam 103 is easily visible on face surface 1302 when it comes into contact with the face surface 1302. In some embodiments the portions of face surface 1302 are in the form of measurement bars 1304. In this example, measurement bars are white. Laser beam 103 is easily visible on the white surface. In some embodiments other portions of housing 1202 have a dark color, such as black, on which laser beam 103 is not as easily visible.

In some embodiments, measurement bars 1304 includes ruled markings 1306 that allow an operator to estimate distances. In some embodiments larger ruled markings are used to identify points that are one centimeter apart, while smaller ruled markings are used to identify points that are 5 mm away from each larger ruled marking. Other ruled markings are used in other embodiments.

FIGS. 14-15 illustrate additional block diagrams of example targets 114. FIG. 14 is a front cross-sectional block diagram and FIG. 15 is a side cross-sectional block diagram.

In this example, target 114 includes housing 1202, connector 1206, optical detector 1208, synchronization detector 1214, one or more circuit boards 1402 and 1404, one or more batteries 1406 (i.e., one battery, two batteries, etc.), communication device 1408, and other electronic circuitry, such as processor 1410 and memory 1412.

At least some electronic circuitry is typically included on one or more circuit boards, such as circuit board 1402 and circuit board 1404. Examples of electronic circuitry are discussed herein. One example of electronic circuitry is programmable circuitry, such as including processor 1410 and memory 1412. In some embodiments, memory 1412 stores instructions, which when executed by processor 1410 cause processor 1410 to perform one or more methods or operations, such as those discussed herein. In some embodiments batteries 1406 are supported by or connected to one or more of boards 1402 and 1404. In another embodiment, batteries 1406 are contained within the housing and are electrically coupled to the electronic components of target 114, but are physically separated from boards 1402 and 1404.

Electronic circuitry is powered, in some embodiments, by one or more batteries 1406, contained within housing 1202. In some embodiments, target 114 is normally off, but automatically powers on when connected with stem 112. For example, in some embodiments an electronic circuit between batteries 1406 and the electronic circuitry is normally open at connector 1204. The circuit is closed upon connection of stem 112 and current flows through conductive element 1012, resistive element 1014, and connector 1010. In some embodiments the current flow does not go through outer connector 1010, but rather through another connector.

Electronic circuitry includes, in some embodiments, a battery charging module that is electrically coupled to batteries 1406 to recharge the batteries 1406 after use. While some embodiments include rechargeable batteries, other embodiments include disposable batteries. In some embodiments, batteries store enough power to allow target 114 to operate for more than 8 hours under normal use. In other embodiments, batteries store enough power for more than 12 hours of use, or for more than 16 hours of use. Other embodiments use other power sources, such as receiving power through a wire, or from a solar panel, etc.

In some embodiments electronic circuitry further includes synchronization detector 1214 and communication device 1408. Synchronization detector 1214 is discussed above, and operates, for example, to detect a synchronization signal generated by scanner 102. Communication device 1408 is a device that operates to communicate with another device, such as scanner 102 or a computing device, such as in cart 108. An example of communication device 1408 is a radio frequency communication device. In some embodiments communication device 1408 communicates digital data utilizing a data communication protocol, such as one of the family of 802.11 protocols. For example, in some embodiments the processor 1410 of target 114 utilizes communication device 1408 to communicate digital data with communication circuitry 314 of scanner 102. In other possible embodiments, communication device 1408 communicates digital data with a computing device, such as contained within cart 108. In some embodiments, communication between target 114 and scanner 102 and target 114 and the computing device is direct communication. In some embodiments, targets 114 only directly communicate with scanner 102.

Figure 16:
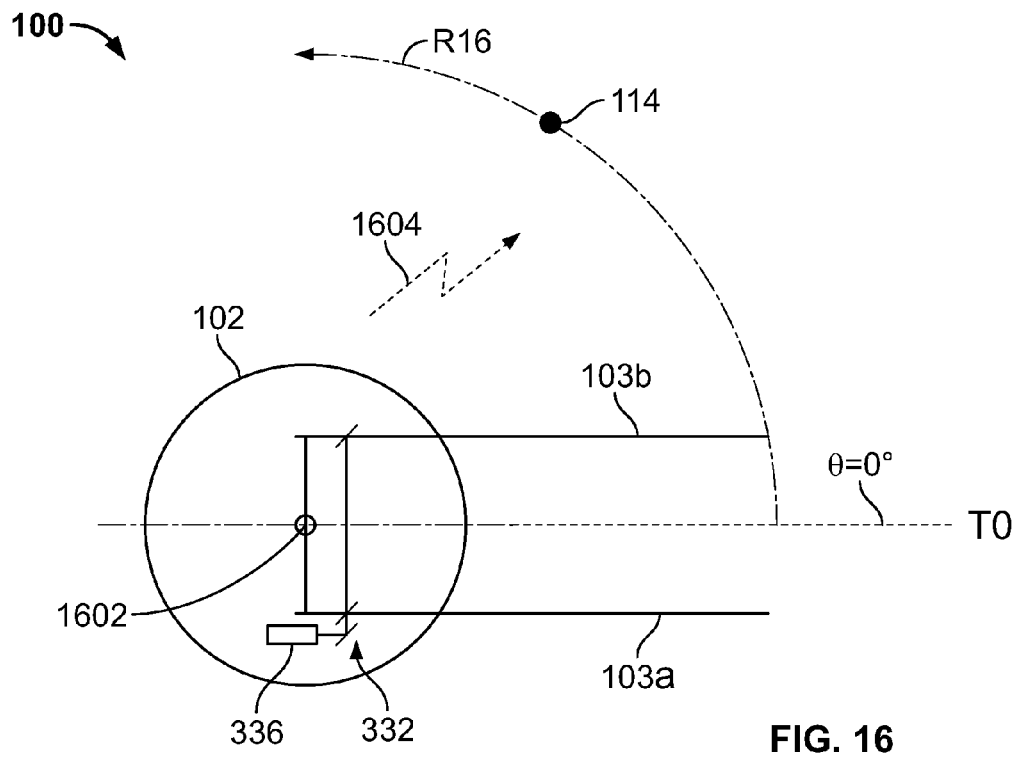
FIG. 16 is a schematic plan view of portions of the measurement system shown in FIG. 1, showing the scanner at a home position.

FIGS. 16-20 illustrate an example method of determining a position of a target 114. FIG. 16 is a schematic plan view of portions of an example measurement system 100. The measurement system 100 includes a scanner 102 having an optics assembly 332 and at least one laser 336. The outputs of the optics assembly 332 are laser beams 103a and 103b. At least part of scanner 102 rotates in the direction of rotation R16 about a vertical axis of rotation 1602. Scanner includes a home position where an angle of rotation $\theta=0°$. In some embodiments the home position is defined as shown in FIG. 3, as the position in which synchronization circuitry 318 (such as a synchronization LED) is aligned with sync aperture 330 and optical detector 340. When in the home position, scanner 102 generates a synchronization signal 1604. The synchronization signal 1604 is detected by target 114, which records a time T0 from an internal clock at which the synchronization signal 1604 is received. An example of the internal clock is a 32 bit counter with a clock speed of 10 ns (100 MHz). Another example of the internal clock is a counter with a clock speed of 50 ns (20 MHz). Other embodiments include other counters or other clock speeds.

Figure 17:
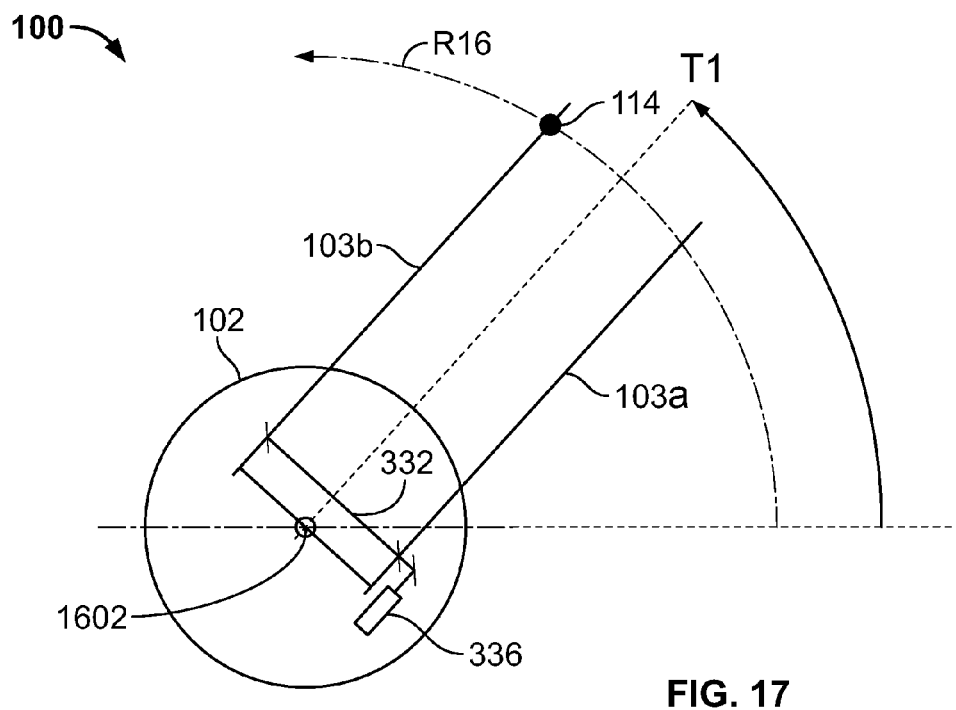
FIG. 17 is a schematic plan view of portions of the measurement system shown in FIG. 1, showing the scanner at time T1.

Referring now to FIG. 17, scanner 102 continues to rotate about vertical axis of rotation 1602. At some point, laser beam 103b comes into contact with target 114. The optical detector 1208 of target 114 detects laser beam 103b and target 114 records in memory a time T1 from an internal clock at which the laser beam 103b is detected. In some embodiments, target 114 records both times when the leading and trailing edge of laser beam 103b are detected, and averages them together to obtain time T1 at which the laser beam 103b is at the center of the optical detector 1208.

Figure 18:
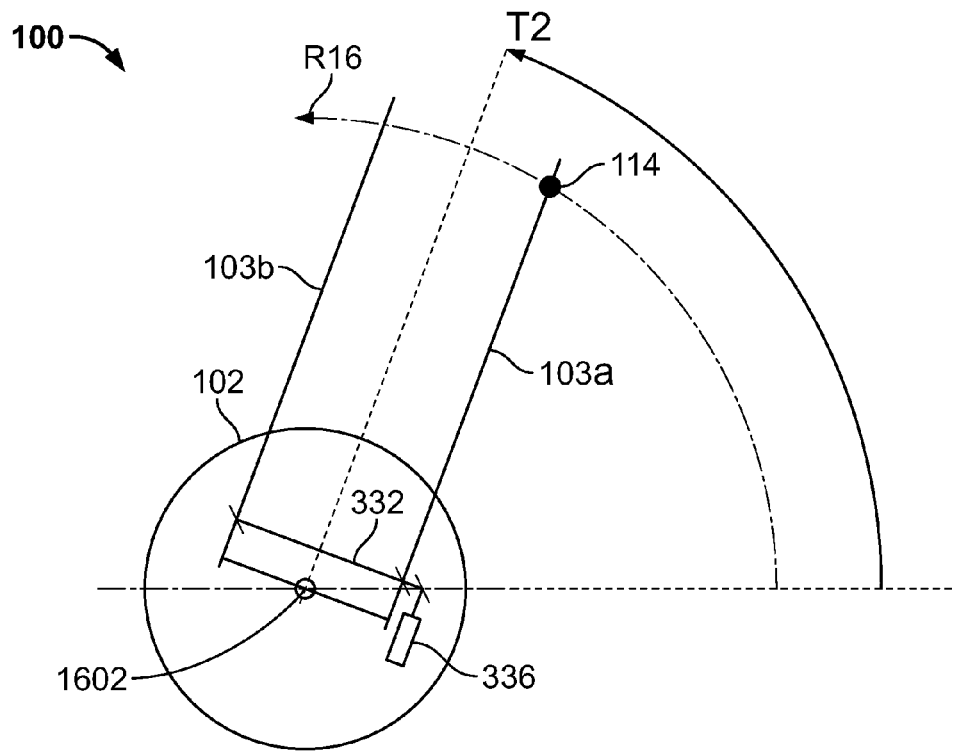
FIG. 18 is a schematic plan view of portions of the measurement system shown in FIG. 1, showing the scanner at time T2.

Referring now to FIG. 18, scanner 102 continues to rotate about vertical axis of rotation 1602. Shortly after time T1, laser beam 103a comes into contact with target 114. The optical detector 1208 of target 114 detects laser beam 103a and target 114 records in memory a time T2 from an internal clock at which the laser beam 103b is detected. In some embodiments T2 is the average time of the detected leading and trailing edges of the laser beam 103a.

Figure 19:
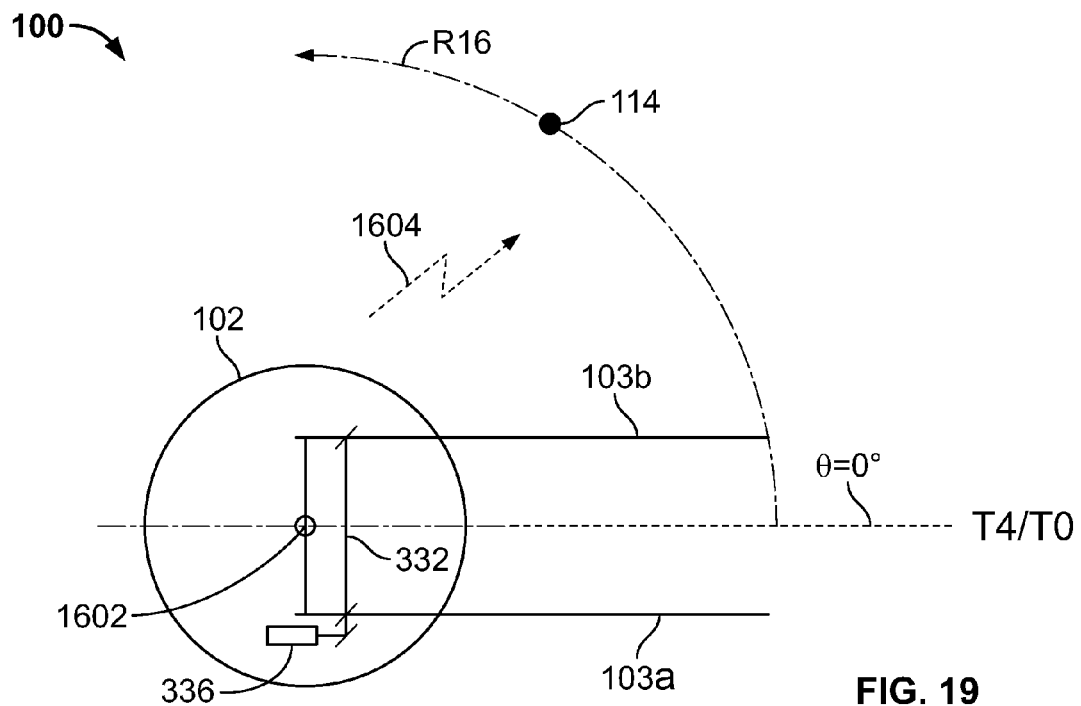
FIG. 19 is a schematic plan view of portions of the measurement system shown in FIG. 1, showing the scanner back at the home position.

Referring now to FIG. 19, scanner 102 continues to rotate about vertical axis of rotation 1602. Once scanner 102 has completed a full rotation, it returns to the home position. At this time scanner 102 transmits another synchronization signal 1604, which is detected by target 114. Target 114 records the time T4 in memory. This time is also used as T0 for the next scan.

Figure 20:
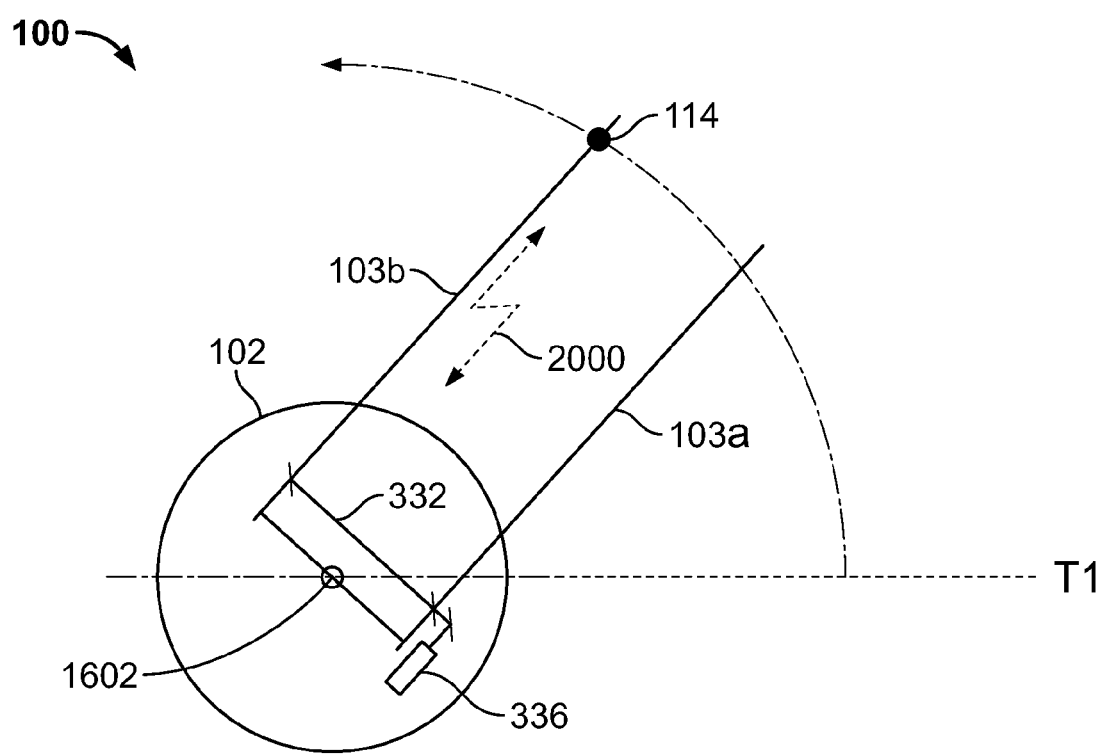
FIG. 20 is a schematic plan view of portions of the measurement system shown in FIG. 1, showing the communication of data between a target and the scanner.

Referring now to FIG. 20, scanner 102 continues to rotate about vertical axis of rotation 1602. While scanner 102 is rotating, target 114 operates to process data and prepare it for transmission to scanner 102. For example, in some embodiments times T0, T1, T2, and T3 are modified by subtracting T0 to obtain a value of the time that elapsed from time T0.

In some embodiments, in order to reduce the chance that multiple targets 114 will attempt to communicate with scanner 102 at the same time, targets 114 package a message together but wait to send the message until a predetermined transmit time. As one example, target 114 waits to transmit the message back to scanner 102 until the next time T1, when laser beam 103b is detected.

A message 2000 is then transmitted from target 114 to scanner 102, such as using communication device 1408 of target 114 and communication circuitry 314 of scanner 102.

An example of the data transmitted in message 2000 includes one or more of the following. The period, or total time of one rotation of scanner 102 (T4); the times T1 and T2 at which laser beams 103b and 103a were detected; the heights H1 and H2 of each laser beam 103b and 103a along optical detector 1208 or any other desired data. In some embodiments, if scanner 102 has data to send to the target 114, the data can be transmitted from scanner 102 to target 114 during this communication. For example, scanner 102 can send status information, alignment information, or other information to target 114. In some embodiments, scanner 102 sends data to target 114 after receiving the data from the computing device of cart 108. An example of alignment data is data that indicates whether the associated position is properly aligned or is out of alignment, and can include height, width, and length related data. This data is used by the target 114 to properly illuminate position indicators (e.g., 1230, 1232, and 1234 shown in FIG. 12) to visually indicate whether the associated point is currently out of position, and the relative extent of the error.

In some embodiments, height values H1 and H2 are computed as a distance from a center point of optical detector 1208. In some embodiments a laser beam detected below the center point is given a positive value and a laser beam detected above the center point is given a negative value. This is done in some embodiments because raising of the frame would cause the laser beam 103 to strike lower on optical detector 1208, while lowering the frame would cause the laser beam 103 to strike higher on optical detector 1208.

In some embodiments, the heights H1 and H2 are further adjusted based on a known length of an attached stem. For example, if target 114 detects a stem is attached, the target 114 determines which stem is connected to it (such as by checking a resistance of the resistor). A lookup table contained in memory of the target 114 is then used to identify the length of that stem. Alternatively, the lookup table is stored in the scanner or on the computing device of the cart 108. The length is then used to adjust height H1 and H2 to represent the height of a point on the frame relative to the laser beams 103b and 103a.

As data from each of the targets 114 is returned to scanner 102, the scanner performs further processing on the data. For example, in some embodiments scanner 102 utilizes data from targets 114 to determine three-dimensional points associated with the frame of the vehicle. In some embodiments the points are computed in x, y, and z coordinates. The three-dimensional points are then sent, in some embodiments, to a computing device, such as the computing device within cart 108. The computing device can then utilize these points to perform various measurements between the points. The measurements are compared to known data about the respective frame 94 to determine whether one or more points are not in their expected locations. If so, a message can be communicated back to the targets (such as though scanner 102) to cause targets to display the appropriate position codes using position indicators 1212.

Additional details regarding the computation of x, y, and z coordinates are provided in U.S. Pat. No. 7,181,856, issued on Feb. 27, 2007, by Hanchett et al., and titled LASER MEASUREMENT SYSTEM.

Figure 21:
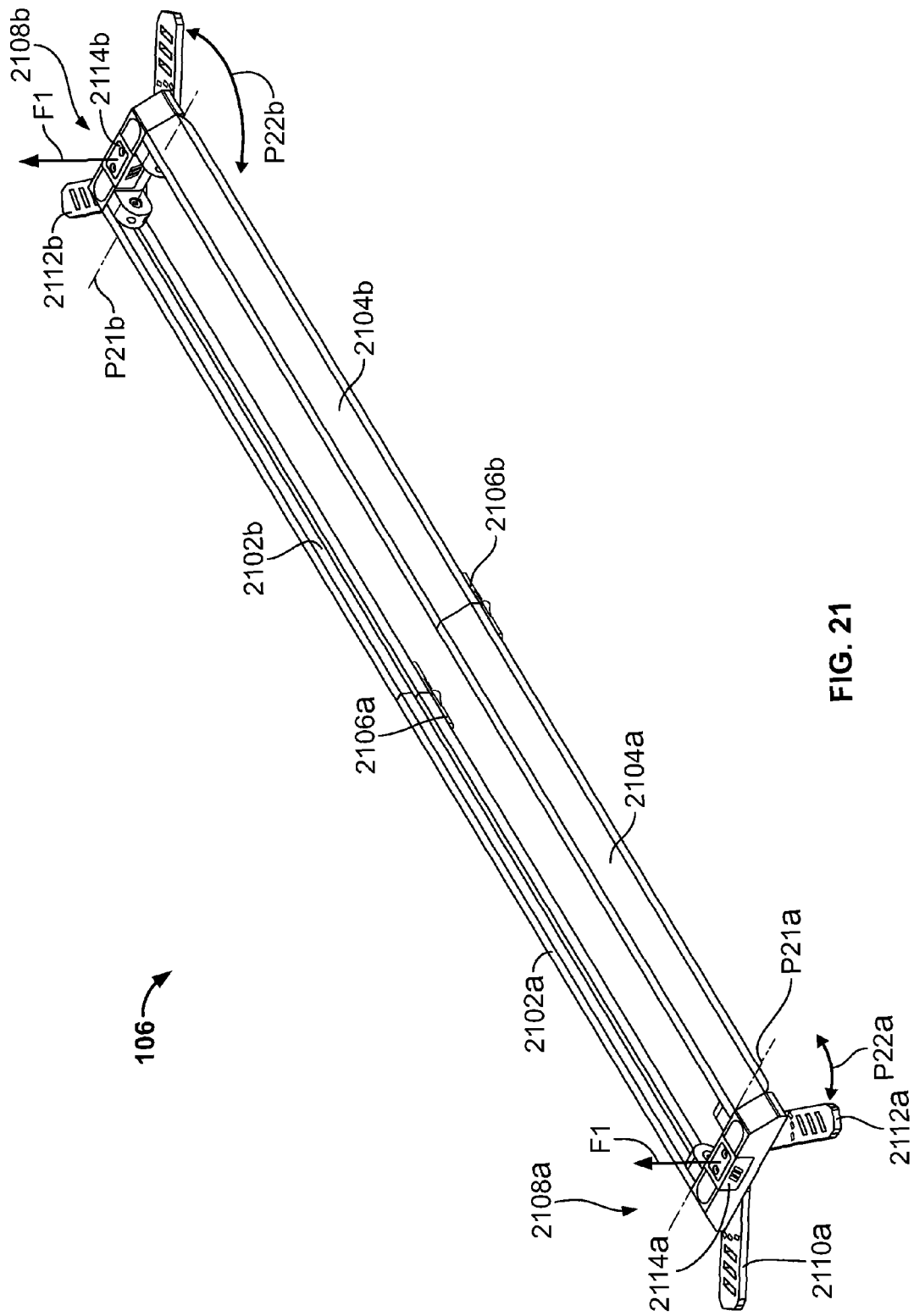
FIG. 21 is a schematic perspective view of an example bridge of the measurement system shown in FIG. 1.

FIG. 21 is a schematic perspective view of an example bridge 106. As described in FIG. 1, bridge 106 is used in some embodiments to support scanner 102 during operation. Bridge 106 can be arranged on top of portions of lift system 80, and scanner 102 arranged on top of bridge 106.

In this example, bridge 106 includes support members 2102 and 2104, and adjustable leg assemblies 2108. Support members 2102 are contoured to match the shape of recesses 252 and 254 of profiled bottom surface 250 of scanner 102 (shown in FIG. 2). In some embodiments support members 2102 and 2104 have substantially smooth surfaces, such after bridge 106 has been arranged on lift 80, scanner 102 can be placed near one of adjustable leg assemblies 2108 and then slid along bridge 106 until scanner 102 is roughly at the center of bridge 106, such as above hinges 2106.

In some embodiments, support members 2102 and 2104 are split into a first side 2102a and 2104a and a second side 2102b and 2104b. The sides are joined by hinges 2106a and 2106b. Hinges 2106 allow support members 2102 and 2104 to fold between a fully extended position and a folded position.

Some embodiments of bridge 106 include a height adjustment feature provided by adjustable leg assemblies 2108. Adjustable leg assemblies 2108 are adjustable between a lowered position (shown in FIG. 21) and a height adjustment position. When in the lowered position, legs 2110 and 2112 can be used to provide added support and stability to bridge 106.

To adjust bridge 106 to the height adjustment position, a handle 2114 is provided. A force F1 is applied by an operator to handle 2114 to release a locking mechanism of adjustable leg assembly 2108. Adjustable leg assembly 2108 is then free to pivot in pivot direction P22 about pivot axis P21. Once adjustable leg assembly 2108 reaches the vertical height adjustment position, and the force F1 is released from handle 2114, adjustable leg assembly 2108 locks in the height adjustment position. When in this position, bridge 106 is supported on lift 80 by legs 2110 and 2112.

If additional height adjustment is desired, a force F1 is applied to handle 2214, which causes adjustable leg assembly 2108 to release a lock on legs 2110 and 2112. The position of legs 2110 and 2112 can then be adjusted by pivoting legs 2110 and 2112 until bridge 106 is at the desired height.

Figure 22:
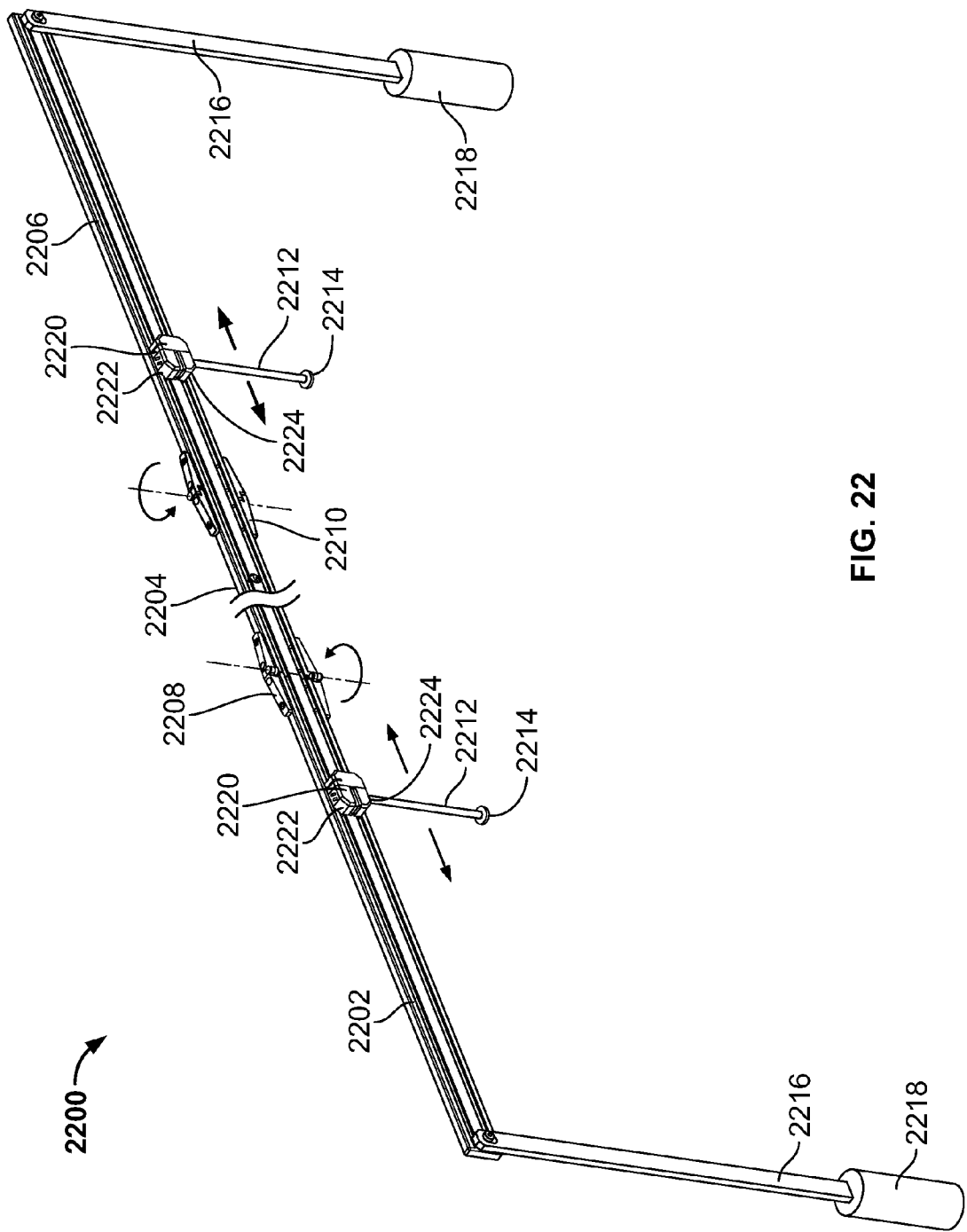
FIG. 22 is a schematic perspective view of an example upper tram assembly of the measurement system shown in FIG. 1.

FIG. 22 is a schematic perspective view of an example upper tram assembly 2200. In this example, upper tram assembly 2200 includes tram members 2202, 2204, and 2206, hinges 2208 and 2210, riser stems 2212 with feet 2214, tram stems 2216 with weights 2218, and adjustable trolleys 2220.

In some embodiments, measurement system 100 includes upper tram assembly 2200. The upper tram assembly 2200 can be connected to points of frame 94 or body 92 that other target assemblies 104 themselves cannot reach. For example, upper tram assembly 2200 can be used to determine the positions of shock towers of vehicle 90. In this example, feet 2214 are connected to tops of the vehicle's shock towers and riser stems 2212 raise and support upper tram members 2202, 2204, and 2206 a suitable distance above the vehicle body.

Riser stems 2212 are connected to members 2202, 2204, or 2206 by adjustable trolleys 2220. Adjustable trolleys 2220 can be moved along the lengths of members 2202, 2204, or 2206 by squeezing buttons 2222 inward. When squeezed, buttons 2222 allow trolleys 2220 to be slid by an operator to the desired position. For example, trolleys 2220 are adjusted until they are separated by approximately the same distance as the distance between the vehicle's shock towers.

It is typically preferred that adjustable trolleys 2220 each be substantially an equal distance from a center point of upper tram 2200 so that upper tram 2200 can remain balanced from one end to the other. To assist with this, ruled markings are provided on a top surface of members 2202, 2204, and 2206 in some embodiments. The measurements can, for example, show the distance from the center point, or the distance from each respective end. In some embodiments, letters are associated with the ruled markings, such starting with the letter A at or about the center point of member 2204 and proceeding through part or all of the alphabet as the distance away from the center point increases in both directions. In this way, an operator can select the letter that provides the proper distance, such as "G" and move the adjustable trolley 2220 until it is aligned with the G marking. The operator can then move the other adjustable trolley to the corresponding letter ("G") at the other end of the upper tram. By moving the adjustable trolleys 2220 to the same letters, the upper tram 2200 is properly balanced. The letter information is provided to a computing device in some embodiments, which uses a lookup table to determine the distance between the adjustable trolleys, which is also substantially the same as the distance between feet 2214.

Tram stems 2216 are then provided to extend downward from upper tram members 2202 and 2206, which are preferably positioned beyond the sides of the vehicle frame and body. Weights 2218 are provided to increase the stability of upper tram 2200. Weights 2218 preferably have an equal weight, so as to maintain the balance of upper tram 2200.

In some embodiments tram stems 2216 include a stem attachment device at lower ends, which can be similar to stem engagement devices 808 shown in FIGS. 8-9. The stem attachment devices are configured to receive a stem for supporting a target 114. The stem is selected to have a length suitable to position the target 114 within the path of laser beams 103 of scanner 102. If needed, upper stems (listed in Table 1) are used to provide greater length.

Tram members 2202, 2204, and 2206 are connected by hinges 2208 and 2210 that allow tram members 2202, 2204, and 2206 to fold and collapse into a more compact configuration for storage.

Figure 23:
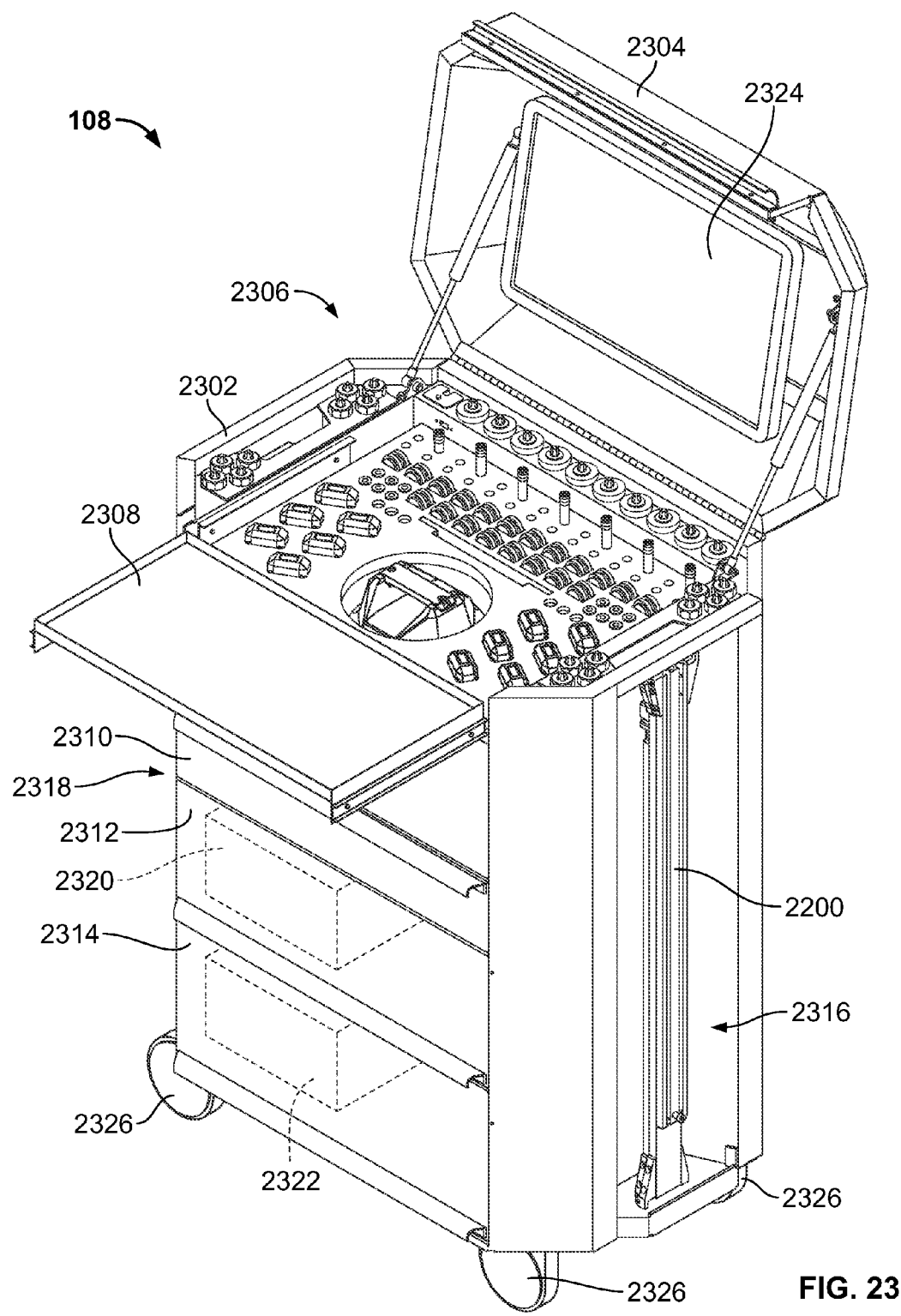
FIG. 23 is a schematic perspective view of an example cart of the measurement system shown in FIG. 1.

FIG. 23 is a schematic perspective view of an example cart 108. In this example, cart 108 includes a body 2302, cover 2304, storage area 2306, retractable tray 2308, storage compartments such as drawers 2310, 2312, and 2314, storage regions 2316 and 2318, printer 2320, computing device 2322 with display device 2324, and wheels 2326.

In some embodiments cart 108 is configured to store all components of measurement system 100. The body 2302 forms the outer structure of the cart 108, and is preferably made of a strong material such as metal, which can be painted or anodized. In some embodiments, body 2302 includes a hinged cover 2304 that pivots about a hinged axis between opened and closed positions. In some embodiments, gas springs are used to support cover 2304 in the opened position and to prevent cover 2304 from slamming shut when moved to the closed position.

In this example, a storage area 2306 is provided at the top of body 2302. When cover 2304 is in the opened position, the storage area 2306 is easily accessible by an operator. When cover 2304 is in the closed position, the storage area 2306 is enclosed under cover 2304, which operates to keep out debris and moisture. The storage area 2306 includes receptacles for storing most of the components of measurement system 100, discussed herein, including scanner 102 (front center), targets 114 (left and right of scanner 102), as well as the various different stems 112 and attachment devices 110 (upper shelf and rear). In some embodiments, cart 108 includes charging receptacles, such as to provide power to targets 114, such as through charging contacts 1206. Electrical circuitry for charging batteries of target 114 is contained either in target 114 or in cart 108. Cart 108 receives power from an external source, such as by plugging in a power cord into an AC wall receptacle. Some embodiments include a digital camera for capturing digital images. Examples of digital images include pictures of a damaged vehicle, pictures of the vehicle during repair (such as to document the steps that were taken to repair the vehicle), and pictures showing the vehicle after a repair has been completed.

Cover 2304 further supports display device 2324, which is mounted to the inner surface. When cover 2304 is in the closed position, cover 2304 encloses and protects display device 2324. When cover 2304 is in the open position, display device 2324 is held substantially vertically where it is easily visible by an operator.

Tray 2308 provides a slide-out work surface, such as for supporting a keyboard and a mouse. Tray 2308 has a retracted position in which it is within storage area 2306, and an extended position in which is out outside of storage area 2306.

Additional storage compartments are provided in some embodiments, such as drawers 2310, 2312, and 2314. In an example embodiment, drawer 2312 stores a printer, for printing reports generating by computing device 2322 out onto paper. In the example embodiment drawer 2314 stores computing device 2322. An example of computing device 2322 is a desktop style personal computer.

In some embodiments body 2302 includes external storage regions 2316 and 2318 for storing additional components of measurement system 100. As one example, storage region 2316 is configured to receive upper tram 2200, when the upper tram 2200 is in the collapsed storage position. A fastener such as a magnet or a belt is used to hold upper tram 2200 securely in storage region 2316. Similarly, storage region 2318 is configured to receive bridge 106.

Wheels 2326 are provided in some embodiments to allow cart 108 to be easily moved. An example of wheel 2326 is a swivel caster. Some embodiments include lockable wheels that can be locked by an operator to reduce movement of cart 108 during use or storage.

Figure 24:
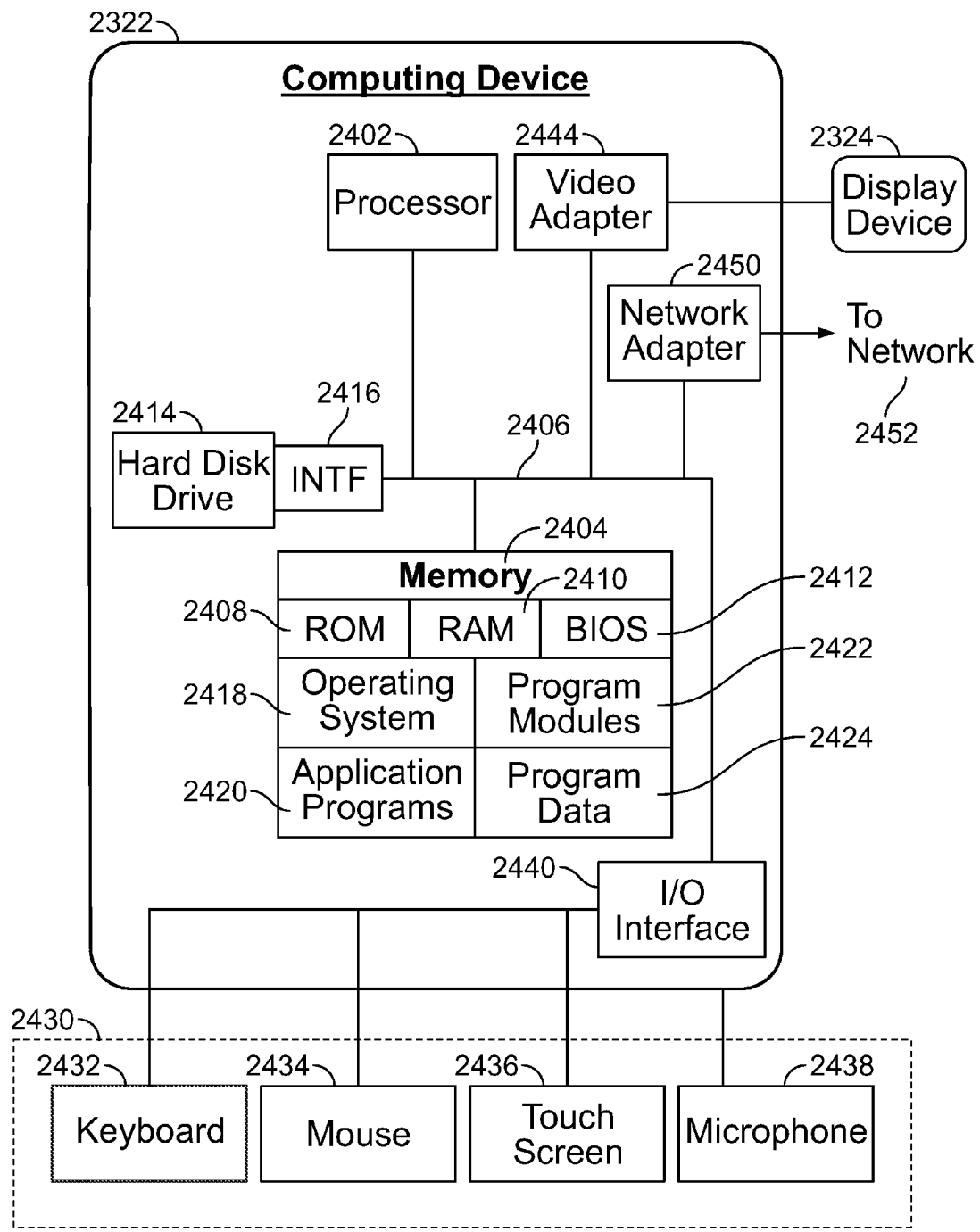
FIG. 24 is a schematic block diagram illustrating an architecture of an example computing device of the measurement system shown in FIG. 1.

FIG. 24 is a schematic block diagram illustrating an architecture of an example computing device 2322. In one example, computing device 2322 is a personal computer. Other examples of computing device 2322 include a laptop computer, a smart phone, a personal digital assistant (PDA), or other devices capable of processing data instructions. In some embodiments, computing device 2322 operates to execute the operating system 2418, application programs 2420, and program modules 2422, and to store and retrieve data from program data 2424.

Computing device 2322 includes, in some embodiments, at least one processor 2402. A variety of processing devices are available from a variety of manufacturers, for example, Intel or Advanced Micro Devices. In this example, computing device 2322 also includes system memory 2404, and system bus 2406 that couples various system components including system memory 2404 to processor 2402. System bus 2406 is one of any number of types of bus structures including a memory bus or memory controller, a peripheral bus, and a local bus using any of a variety of bus architectures.

System memory 2404 includes read-only memory 2408 and random access memory 2410. Basic input/output system 2412, containing the basic routines that act to transfer information within computing device 2322, such as during start up, is typically stored in read-only memory 2408.

Computing device 2322 also includes secondary storage device 2414 in some embodiments, such as a hard disk drive, for storing digital data. Secondary storage device 2414 is connected to system bus 2406 by secondary storage interface 2416. Secondary storage devices 2414 and their associated computer readable media provide nonvolatile storage of computer readable instructions (including application programs and program modules), data structures, and other data for computing device 2322.

Although the exemplary architecture described herein employs a hard disk drive as a secondary storage device, other types of computer readable media are included in other embodiments. Examples of these other types of computer readable media include magnetic cassettes, flash memory cards, digital video disks, Bernoulli cartridges, compact disc read only memories, digital versatile disk read only memories, random access memories, or read only memories.

A number of program modules can be stored in secondary storage device 2414 or system memory 2404, including operating system 2418, one or more application programs 2420, other program modules 2422, and program data 2424.

In some embodiments, a user provides inputs to the computing device 2322 through one or more input devices 2430. Examples of input devices 2430 include keyboard 2432, mouse 2434, and touch screen 2436 (or a touch pad). Other embodiments include other input devices 2430, such as a microphone 2438 for receiving voice commands. Input devices 2430 are often connected to the processor 2402 through input/output interface 2440 that is coupled to system bus 2406. These input devices 2430 can be connected by any number of input/output interfaces, such as a parallel port, serial port, game port, or a universal serial bus. Wireless communication between input devices and interface 2440 is possible as well, and includes infrared, BLUETOOTH® wireless technology, 802.11a/b/g/n wireless communication (or other wireless communication protocols), cellular communication, or other radio frequency communication systems in some possible embodiments.

In some embodiments, a display device 2324, such as a monitor, liquid crystal display device, projector, or touch screen display device 2436, is also connected to system bus 2406 via an interface, such as video adapter 2444. In addition to display device 2324, the computing device 2322 can include various other peripheral devices (not shown), such as speakers or a printer 2320.

When used in a local area networking environment or a wide area networking environment (such as the Internet), computing device 2322 is typically connected to network 2452 through a network interface or adapter 2450. Other possible embodiments use other communication devices. For example, some embodiments of computing device 2322 include a modem for communicating across network 2452. For example, in some embodiments a network interface or adapter 2450 permits computing device 2322 to communicate with a remote server or other remote computing device. As an example, the remote server includes a database that stores vehicle frame dimensions and other vehicle data. The data can be downloaded by computing device 2322 from the server through network adapter 2450.

Computing device 2322 typically includes at least some form of computer-readable media. Computer readable media include any available media that can be accessed by computing device 2322. By way of example, computer-readable media include computer readable storage media and communication media.

Computer readable storage media includes volatile and nonvolatile, removable and non-removable media implemented in any device configured to store information, such as computer readable instructions, data structures, operating systems 2418, application programs 2420, program modules 2422, program data 2424, or other data. System memory 2404 is an example of computer readable storage media. Computer readable storage media includes, but is not limited to, read-only memory 2408, random access memory 2410, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by computing device 2322.

Communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, communication media includes wired media such as a wired network or direct-wired connection, and wireless media such as acoustic, radio frequency, infrared, and other wireless media. Combinations of any of the above are also included within the scope of computer readable media.

FIGS. 25-31 are screen shots of an example application program 2420. The application program 2420 utilizes data received from scanner 102 and targets 114 to generate various reports, such as in the form of user interface displays, electronic reports, or printed reports.

Although the application program 2420 is described herein as operating on computing device 2322, the application program 2420 can alternatively operate on another computing device. For example, in some embodiments application program 2420 operates on a remote server, acting as an application service provider. The computing device 2322 interacts with the remote server, for example, using a browser software application. The browser software application generates user interface displays defined by data received from the remote server according to a protocol, such as hypertext markup language or various other protocols.

Figure 25:
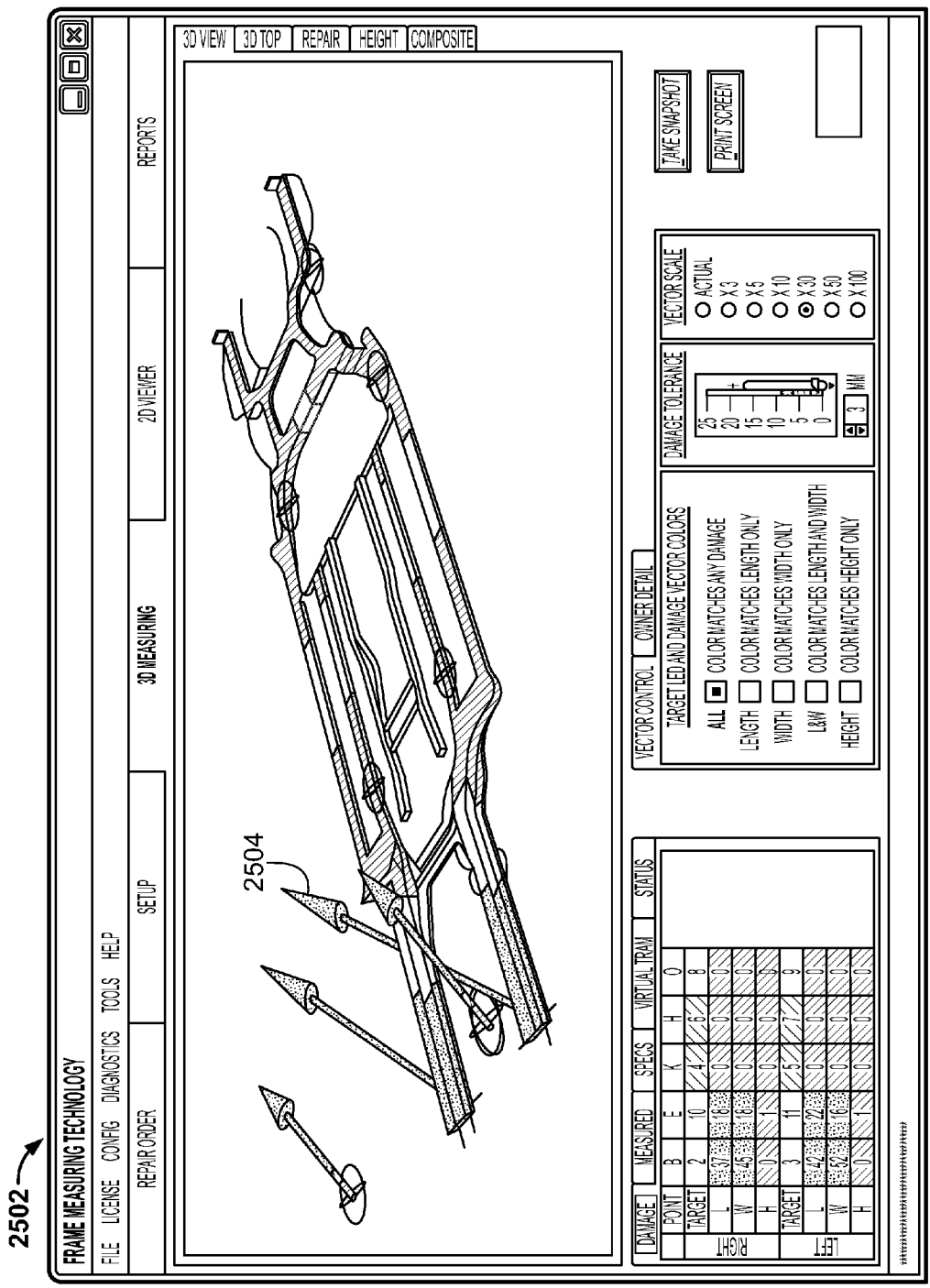
FIG. 25 is an screen shot of an example user interface of an application program of the measurement system shown in FIG. 1.

FIG. 25 is a screen shot of an example user interface 2502 of application program 2420. In this example, application program 2420 has received data from scanner 102 and targets 114 identifying the position of various points of a vehicle frame. Application program 2420 then processes the data to determine whether the point locations match expected point locations.

Expected point locations are extracted from a database of vehicle-specific data. The database contains a large amount of information regarding expected point locations and distances between point locations for a specific vehicle. An example of a database of vehicle-specific data is the Mitchell Information Center, and more specifically the Vehicle Dimensions Module distributed by Mitchell International, Inc. headquartered in San Diego, Calif. In another possible embodiment, the data is stored on a server, and is available to computing devices as needed. In another possible embodiment, the data is stored in a computing device, such as the computing device in cart 108.

In order to retrieve the appropriate vehicle data from the database, application program 2420 first needs to know what vehicle is currently being examined. In one embodiment, application program 2420 prompts the operator to enter the vehicles make, model, and year. In another embodiment, application program 2420 prompts the user to scan a barcode associated with the vehicle's vehicle identification number (VIN). Once the VIN is known, the make, model, and year are retrieved from a lookup table or database.

Data for the vehicle being examined is then retrieved from the database of vehicle-specific data. The data is then compared with data received from scanner 102 and targets 114 representing actual locations of frame points on the vehicle being examined. For example, distances between points are compared with expected distances between points. The application program 2420 then determines whether some or all of the point locations are not properly positioned. This indicates, for example, that the frame has become bent at that location, such as due to a collision. In some embodiments, the application program 2420 operates to check the vehicle frame for various types of damage, such as one or more of sway damage, banana damage, twist damage, diamond damage, mash damage, kick up or kick down damage, and other types of damage.

In some embodiments, the results are graphically displayed in user interface 2502. Graphical elements 2504 are used, in some embodiments to graphically illustrate the direction that a portion of a frame needs to be bent in order to return the frame portion to the proper location. In this example, graphical elements 2504 are vector arrows. The arrows point in the direction in which the frame portion needs to be bent, and the length of the arrow represents the degree of bending that is required. A longer arrow, for example, indicates that a larger degree of bending is needed than a shorter arrow.

Color coding of frame portions is used in some embodiments of user interface 2502. As one example, frame portions that are properly positioned are displayed in a first color, such as white or gray. Frame portions that are slightly mis-positioned are displayed in a second color, such as yellow. Frame portions that are the greatly mis-aligned are displayed in a third color, such as red. More, fewer, or additional color codes are used in other possible embodiments.

In some embodiments, application program 2420 utilizes data regarding frame materials and/or material properties. This data is then used by application program 2420 to provide additional information to the operator, such as through user interface 2502. For example, some embodiments include color coding based on materials or material properties. An example of a material property is the tensile strength or yield strength of the material. Some vehicle frames now include frame components that are made of high tensile materials, such as aluminum. These materials may become permanently damaged if sufficient force is applied to them, and it may be preferred that such frame components be replaced rather than repaired. In some embodiments a finite element analysis is performed by application program 2420 to determine whether a yield strength of the material is likely to have been exceeded. Color coding of such materials in user interface 2502 aids the operator in knowing whether or not to try to repair a damaged frame component or to replace it instead. Color coding can additionally or alternatively be provided to indicate portions in which the yield strength has been exceeded. An alert or warning message may also be displayed to the operator in some embodiments to provide this or additional information.

In some embodiments user interface 2502 includes a graphical representation of the frame. Some embodiments display a three-dimensional graphical representation of the frame. The three-dimensional graphical representation can be rotated using a mouse or other input device to provide inputs into user interface 2502.

In some embodiments the graphical representation of the vehicle frame is a graphical representation of the expected shape of the frame. In other embodiments, however, the graphical representation shows a live three-dimensional representation of the frame of the vehicle currently being examined. In this example, if a portion of the vehicle frame is bent, the three-dimensional representation graphically illustrates that portion as being bent by the amount measured by the measurement system 100. If the frame is being repaired, user interface 2502 automatically updates the display to show the new position of the portion of the frame as it is bent back to the proper position.

Figure 26:
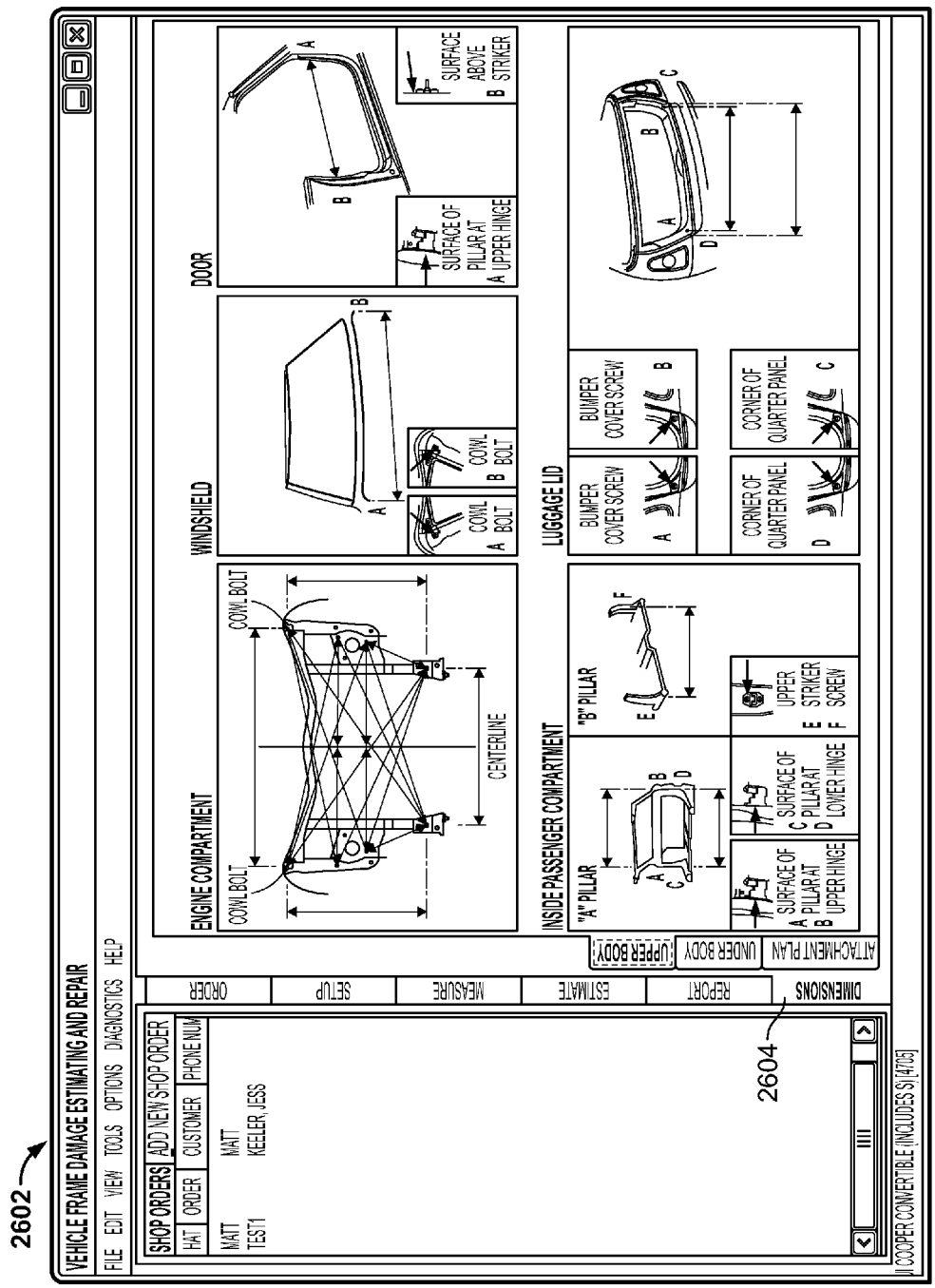
FIG. 26 is an screen shot of an example user interface of an application program.

FIG. 26 is a screen shot of an example user interface 2602 of application program 2420. User interface 2602 includes a dimensions tab that is selected. User interface 2602 provides graphical representations of portions of the vehicle and provides dimensional data showing distances between selected points of the portions of the vehicle. In some embodiments portions of the vehicle include the attachment points (to which target assemblies 104 can be connected), under body, or upper body.

Figure 27:
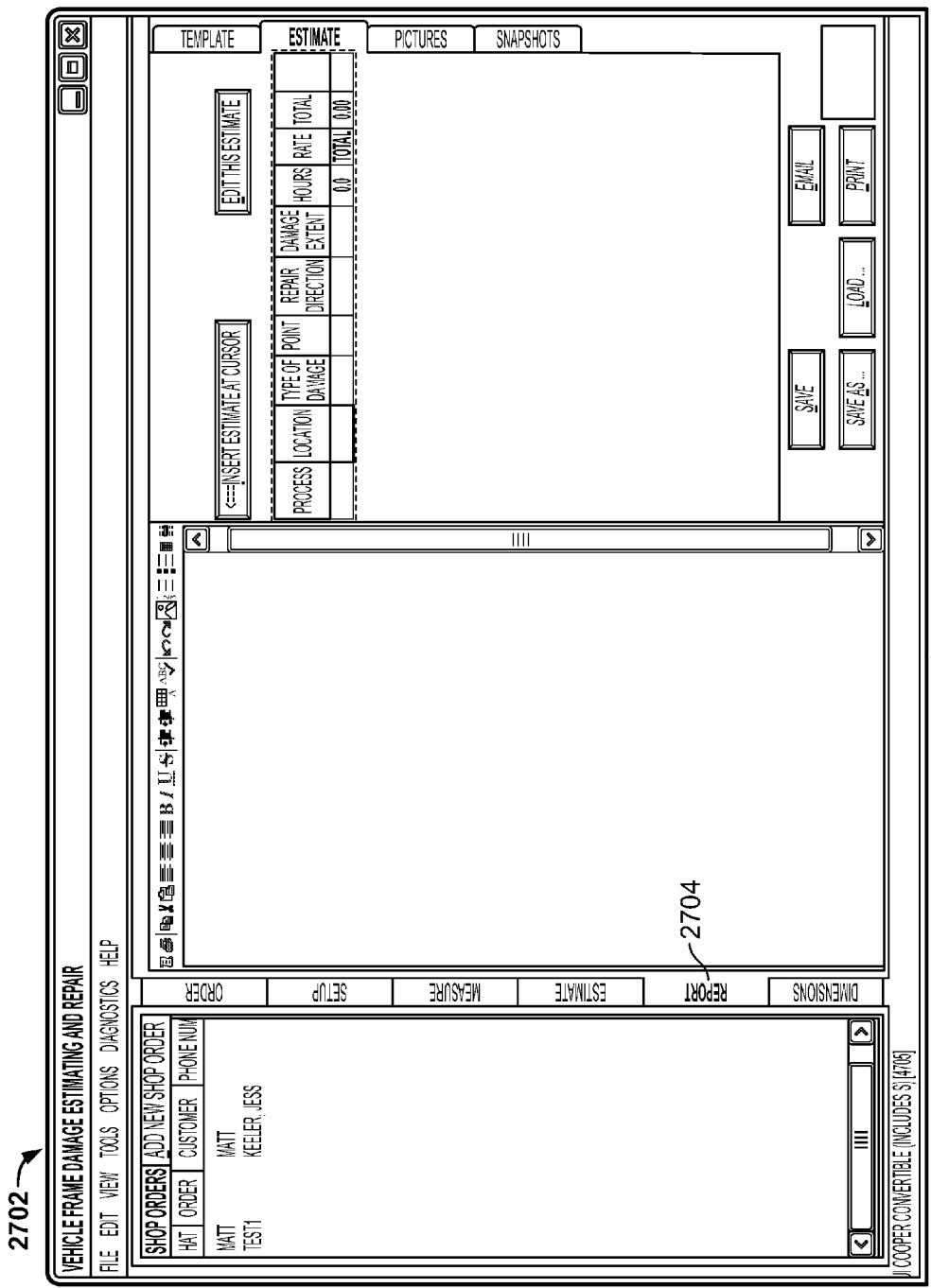
FIG. 27 is an screen shot of another example user interface of an application program.

FIG. 27 is a screen shot of an example user interface 2702 of application program 2420. User interface 2702 includes a report tab that is selected. The report tab is selected by the operator when the operator wants to generate a report. An example of a report is a vehicle damage report that identifies what damage was found by measurement system 100. In some embodiments, the report includes pictures of the vehicle showing the damage, and if desired, can also include pictures of the vehicle during or after the repair. In some embodiments the vehicle damage report also identifies what repairs are required or recommended, and an estimate of the costs associated with the repairs. The report can be saved, printed, or e-mailed. As discussed in more detail herein, the reports can be printed and given directly (or mailed) to the owner or an insurance adjuster, or can be stored in electronic format and sent electronically, such as via an e-mail message.

Figure 28:
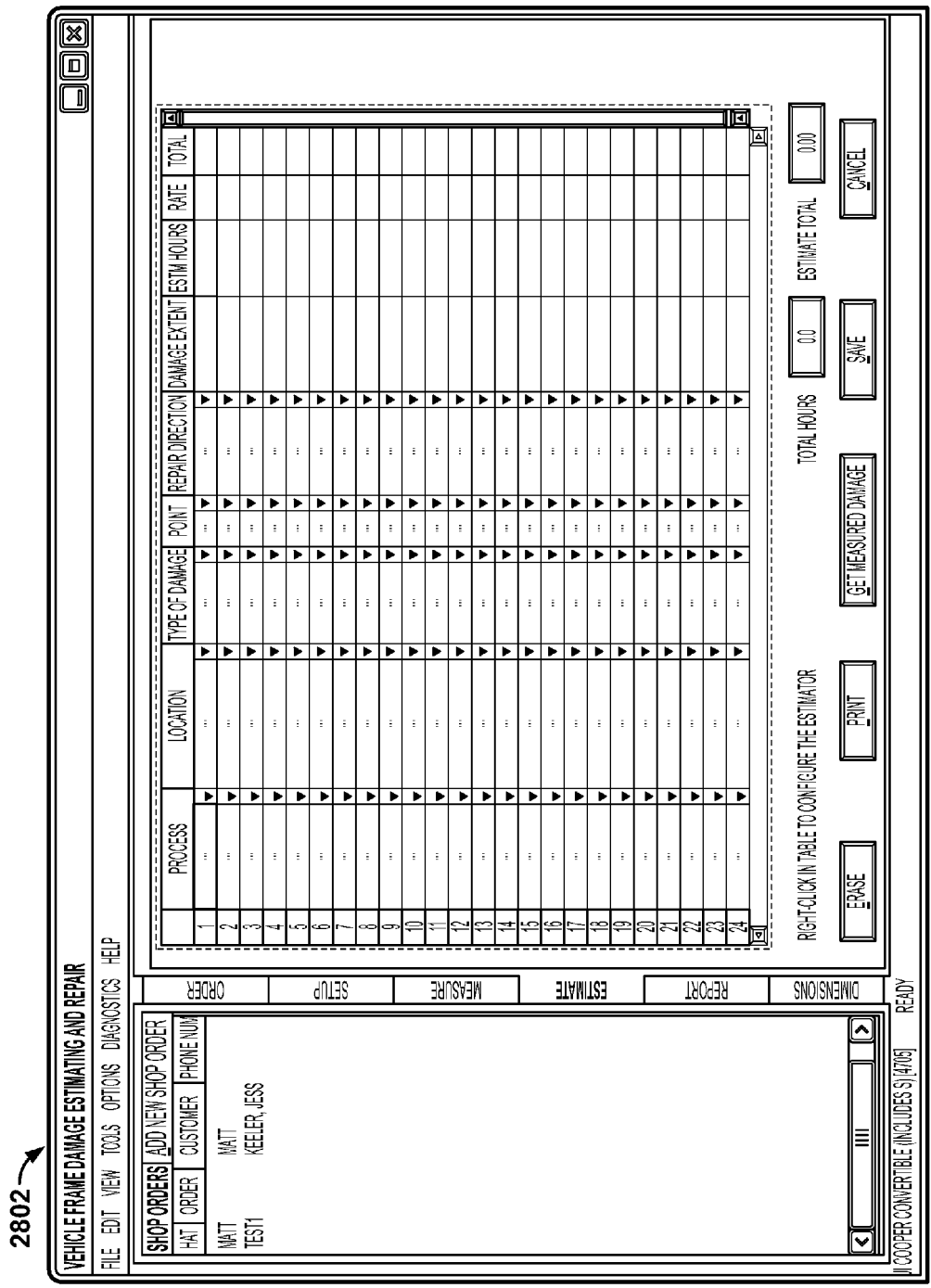
FIG. 28 is an screen shot of another example user interface of an application program.

FIG. 28 is a screen shot of an example user interface 2802 of application program 2420. User interface 2802 includes an estimate tab that is selected. User interface 2802 assists an operator in generating an estimate for a repair. In some embodiments application program 2420 automatically populates fields with data based on the damage that was detected by the measurement system 100. The operator can then review the suggestions and make any desired changes, before finalizing the estimate.

Figure 29:
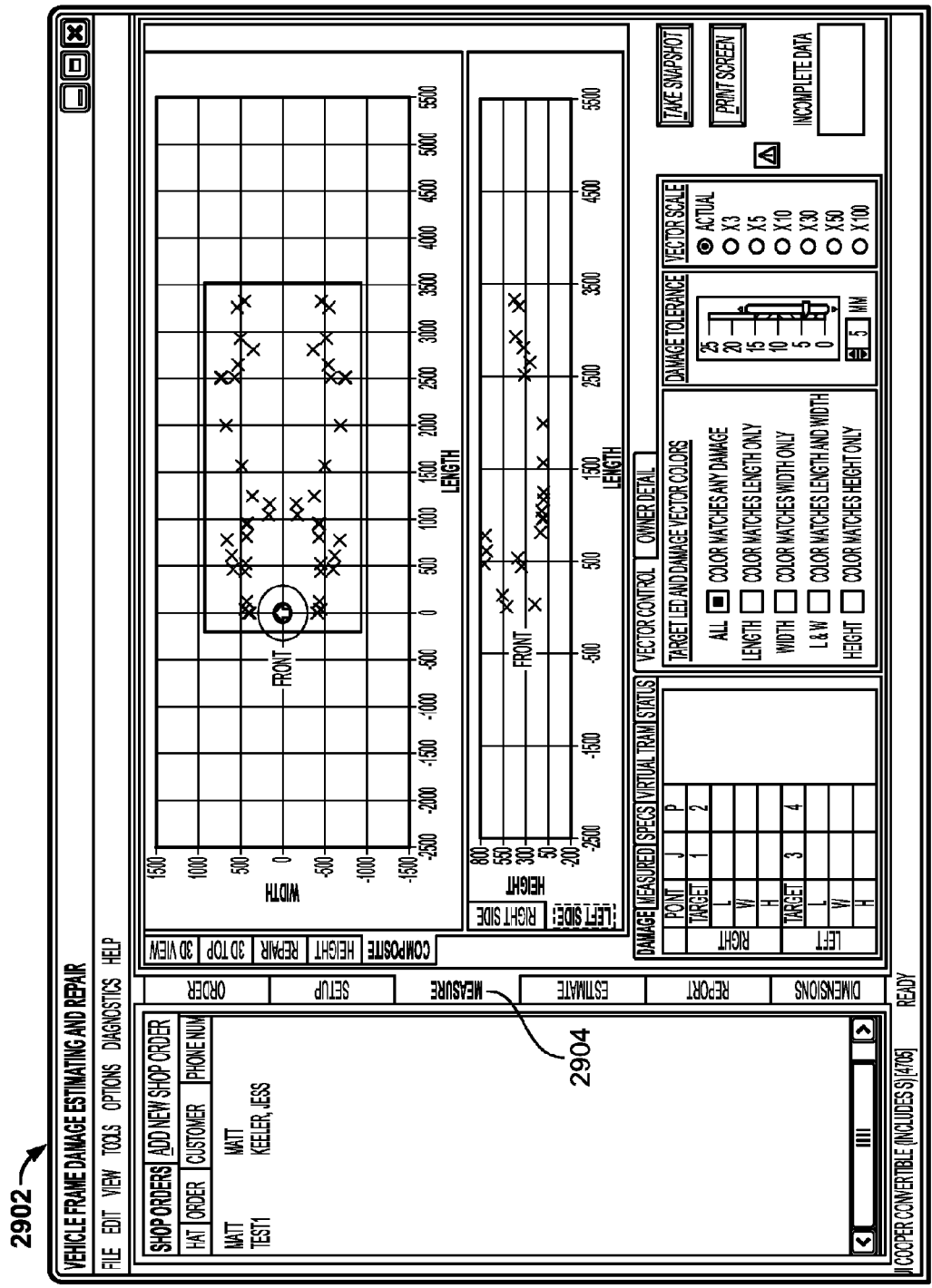
FIG. 29 is an screen shot of another example user interface of an application program.

FIG. 29 is a screen shot of an example user interface 2902 of application program 2420. User interface 2902 includes a measurement tab 2904 that is selected. User interface 2902 graphically illustrates point data, such as expected point locations and/or actual point locations measured on the vehicle. User interface 2902 can display additional information, such as recommended repairs (such as a recommended direction for bending) or a summary of the damage that has been detected. Color coding is used in some embodiments to show a degree of damage for a given point.

Figure 30:
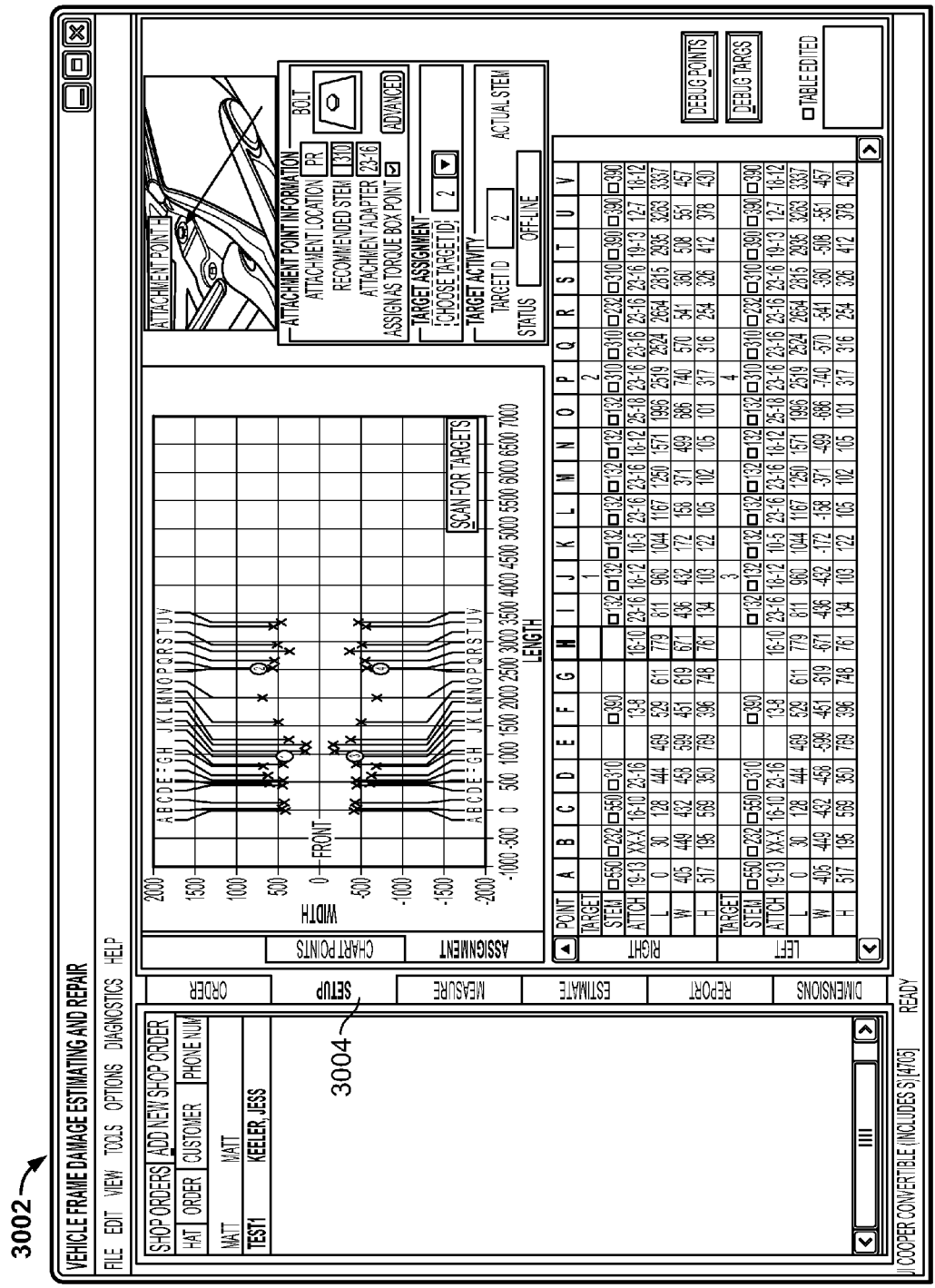
FIG. 30 is an screen shot of another example user interface of an application program.

FIG. 30 is a screen shot of an example user interface 3002 of application program 2420. User interface 3002 includes a setup tab 3004 that is selected. User interface 3002 is used, for example, to assist an operator in setting up measurement system 100, such as by displaying a plurality of different points to which target assemblies 104 can be connected. The user interface 3002 shows what target assemblies 104 are currently connected to the frame and active, what stems are currently being used, and the positions of each of the target assemblies. If a target assembly 104 has not yet been installed, user interface 3002 suggests the stem length that should be appropriate for a given point (by identifying the color of the stem, for example), and assists the operator in identifying the correct point, such as by providing a photograph that shows what the point looks like on an actual vehicle.

Figure 31:
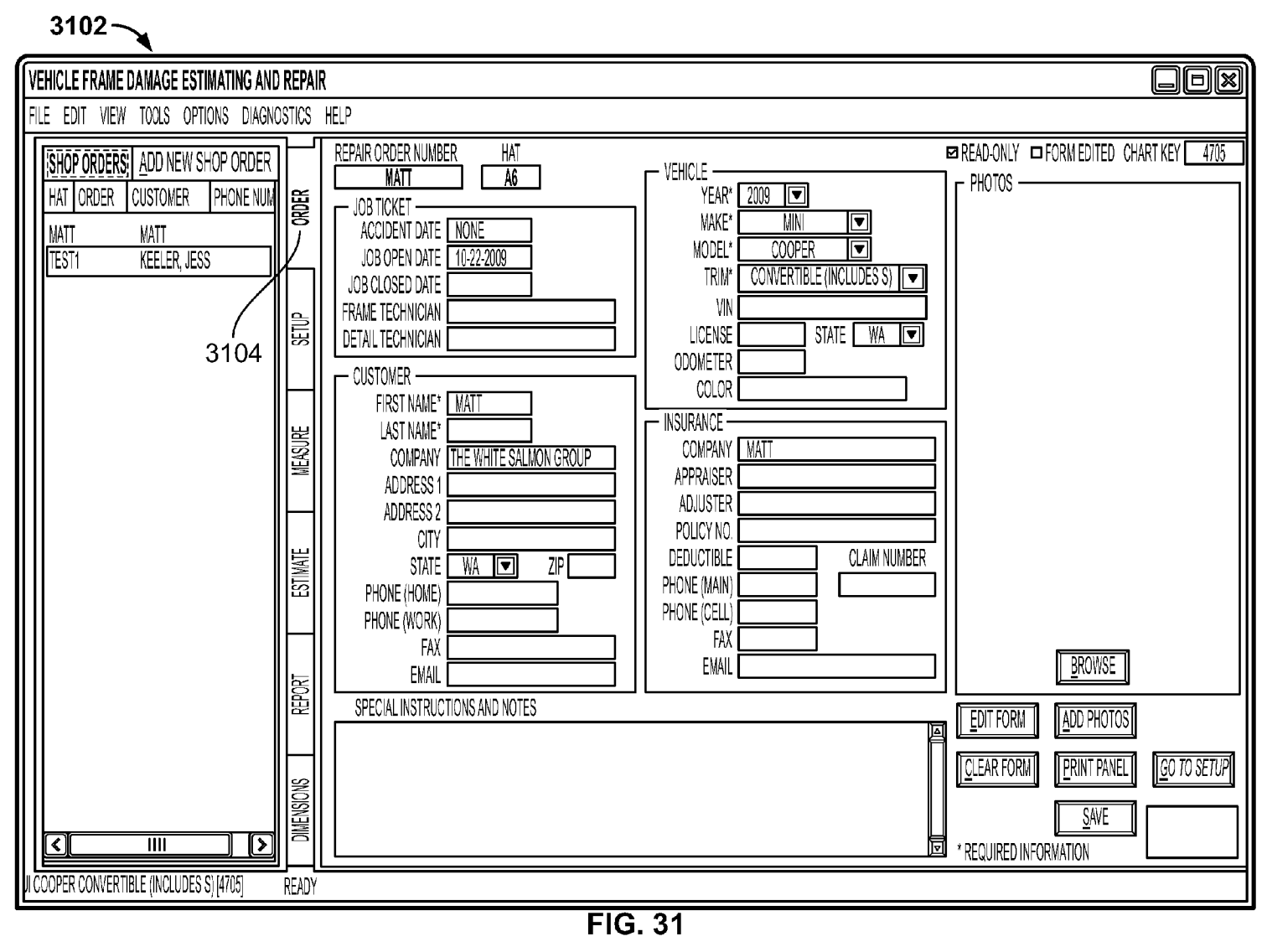

FIG. 31 is a screen shot of an example user interface 3102 of application program 2420. User interface 3102 includes an order tab 3104 that is selected. User interface 3102 is used, for example, to setup a repair order. The user interface 3102 prompts the user to enter various information, such as accident data, technician information, customer information, vehicle information, insurance company information, any special instructions or notes, and photographs (such as illustrating damage that was detected).

Figure 32:
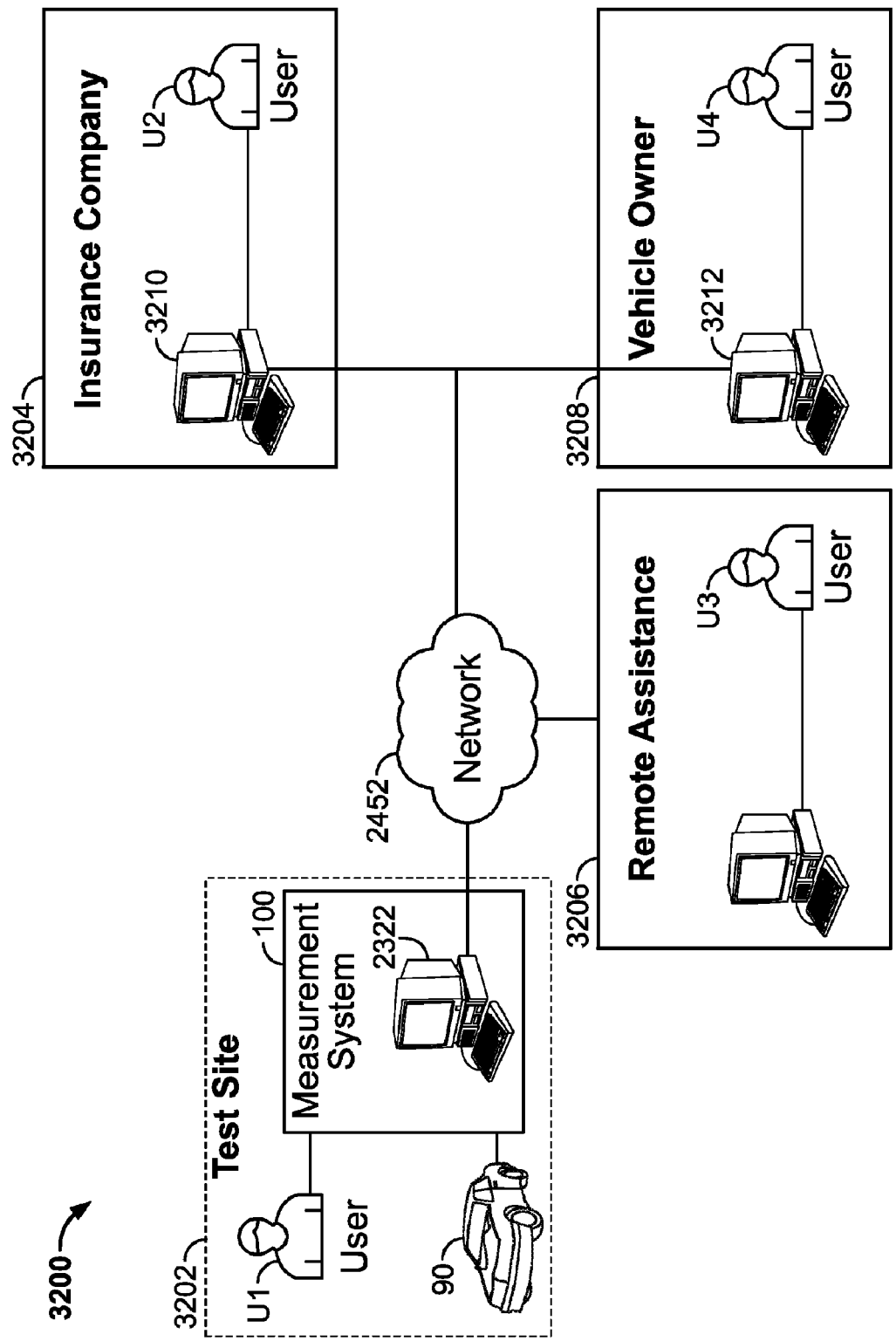
FIG. 32 is a schematic block diagram illustrating an example communication network associated with the measurement system shown in FIG. 1.

FIG. 32 is a schematic block diagram illustrating an example communication network 3200 associated with measurement system 100. In this example, communication network 3200 includes test site 3202, insurance company 3204, remote assistance 3206, and vehicle owner 3208.

Test site 3202 is the location at which an inspection of vehicle 90 is performed by measurement system 100. As discussed herein, some embodiments of measurement system 100 include a computing device 2322. Computing device 2322 is configured to communicate digital data across network 2452, such as the Internet or other wired or wireless data communication network. In some embodiments computing device 2322 operates to communicate data to one or more of insurance company 3204, remote assistance 3206, and vehicle owner 3208.

Insurance company 3204 is an example of a third-party that can communicate with measurement system 100. For example, in some embodiments measurement system 100 generates a report following the inspection of vehicle 90 and sends the report to the insurance company 3204. An electronic report can be sent, for example, as an attachment to an e-mail message, through a web site, or through a custom software interface. Insurance company 3204 includes a computing device 3210 that receives the message from computing device 2322. A user U2, such as an employee of the insurance company, reviews the report and determines whether or not the insurance company will pay for a repair of the vehicle. A message is then sent from computing device 3210 to computing device 2322 authorizing or denying the repair request. This process could be completed within a short period of time, such as within minutes or several hours, allowing the repair to begin shortly after the damage has been detected or confirmed.

In addition or alternatively, an electronic report generated by measurement system 100 can be communicated in a message by computing device 2322 to the vehicle owner 3208. For example, user U4, who owns the vehicle, can receive the report via computing device 3212.

Some embodiments of measurement system 100 further include a remote assistance feature. In this example, a technician U3 located at a remote assistance site can assist operator U1 in diagnosing problems encountered during the use of measurement system 100. In another possible embodiment, remote assistance 3206 automatically provides and installs software updates to computing device 2322 or measurement system 100.

FIGS. 33-44 are screen shots of another an example application program 2420, shown in FIG. 24.

In some embodiments, application program 2420 is stored and operates on a computing device located in a body shop or other repair facility. In other embodiments, application program 2420 is stored and operates on a web server. A computing device located in a body shop or other repair facility accesses the web server across a communication network, such as the Internet, retrieves data from the web server, and generates a user interface based on the data. In some embodiments a browser software application operating on the computing device generates the user interface. Data is communicated using a standard network data communication protocol, in some embodiments, such as hypertext markup language. Other embodiments utilize other data communication protocols.

Figure 33:
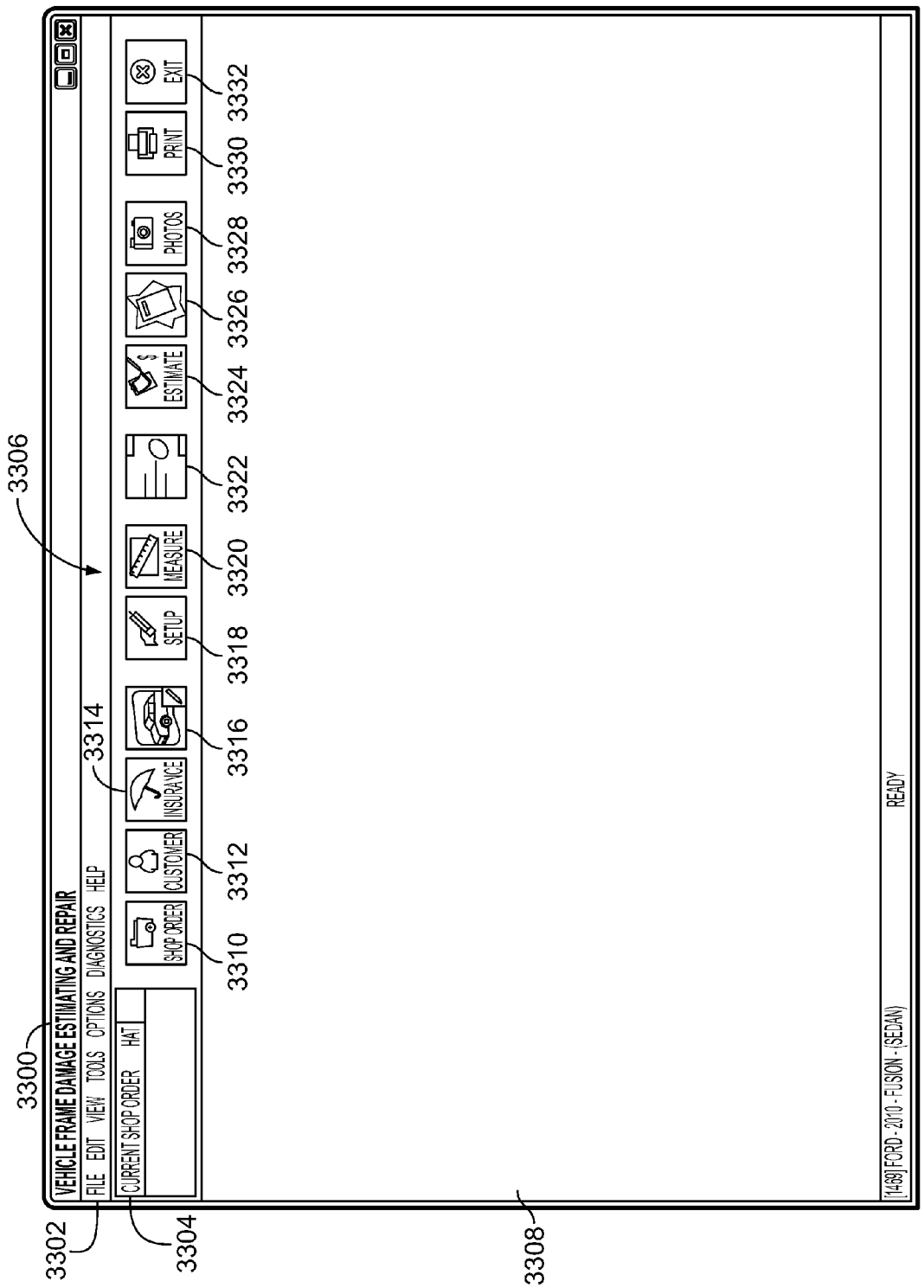
FIG. 33 is a screen shot of an example user interface of another example application program.

FIG. 33 is a screen shot of an example user interface 3300. In this example, user interface 3300 includes menu bar 3302, current order window 3304, toolbar 3306, and main window 3308. An example toolbar 3306 includes a plurality of selectable controls, such as shop order control 3310, customer control 3312, insurance control 3314, vehicle control 3316, setup control 3318, measure control 3320, dimensions control 3322, estimate control 3324, reports control 3326, photos control 3328, print control 3330, and exit control 3332.

In some embodiments, user interface 3300 is displayed on a display device when the software application is first executed by a computing device. The user interface provides selectable controls to access a variety of tools. For example, a menu bar 3302 provides a plurality of drop down menus where tools can be selected. In this example, the menu bar 3302 includes a file menu, an edit menu, a view menu, a tools menu, an options menu, a diagnostics menu, and a help menu. The file menu provides tools for file management, such as to open, save, or print files. The edit menu provides edit tools, such as to cut, copy, paste, and undo tools. The view menu provides tools to adjust or change views of the user interface, such as to zoom in or out, change to full screen mode, and show or hide features of user interface 3300. The options menu provides tools to change user-configurable options, such as whether to use English or metric units, change color schemes, and select the model of laser measurement device to be used. The diagnostics menu provides tools to perform diagnostics on the system. Help menu provides tools to access help files, request remote assistance, and display information about the version of the software application that is currently running.

Current order window 3304 is provided in user interface 3300 to display information about a current shop order that is being worked on. It is blank in FIG. 33 because no shop order is currently selected.

Toolbar 3306 provides a plurality of selectable controls where additional tools can be selected. Tools in toolbar 3306 are arranged in this example in the order, from left to right, that they are commonly used. However, the tools can be used in any desired order. Tools provided by controls 3310, 3312,

3314, 3316, 3318, 3320, 3322, 3324, 3326, and 3328 are described in more detail herein. Print control 3330 is selected to print information displayed in user interface. In another possible embodiment, print tool 3330 is provided to print a report, as discussed below. When use of the software application is completed, the user can select exit control 3332 to close and exit the software application.

Main window 3308 provides a workspace for the various tools of the software application, as described in more detail herein.

Figure 34:
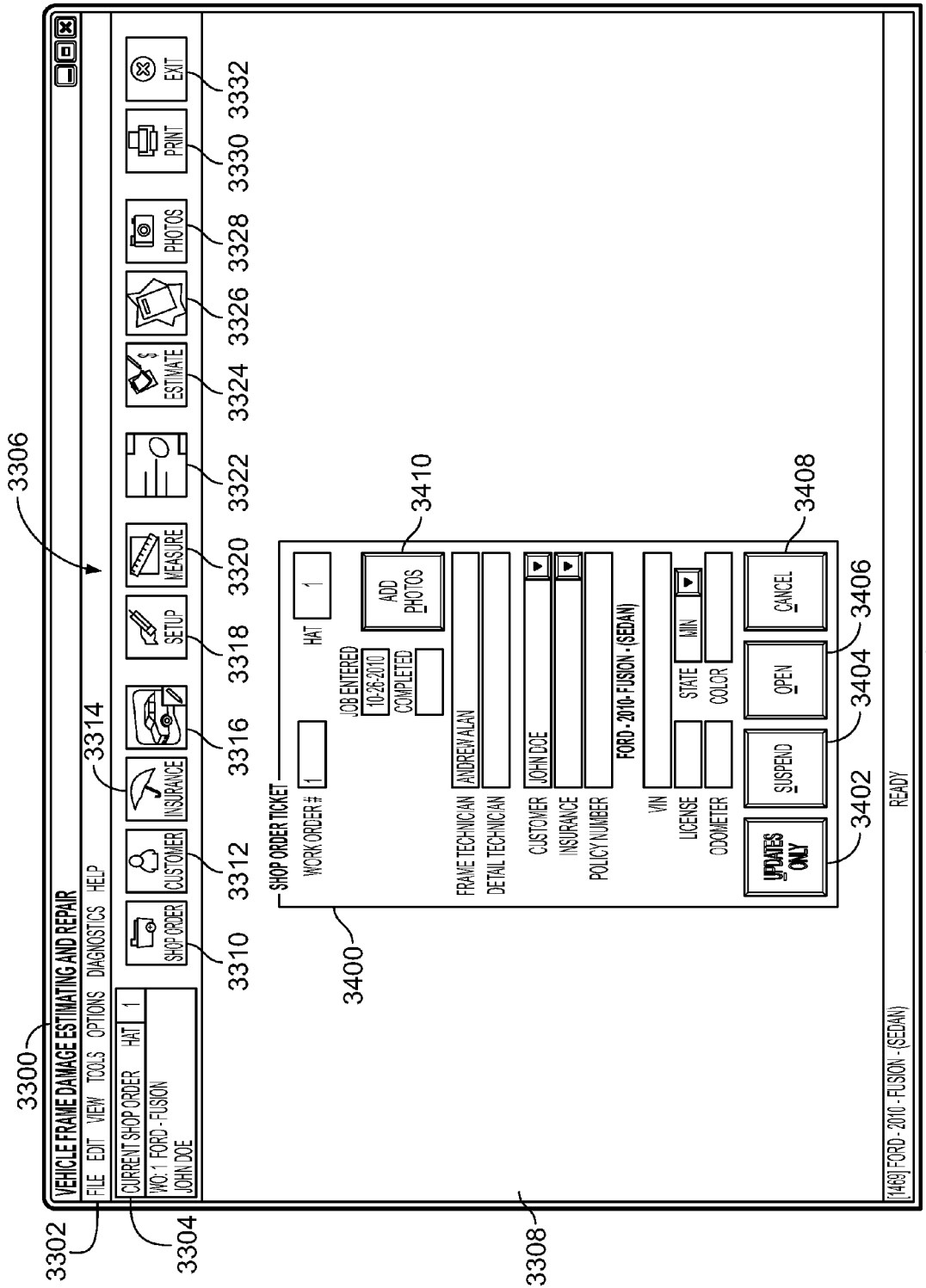
FIG. 34 is a screen shot of the user interface shown in FIG. 33, including an example shop order window.

FIG. 34 is a screen shot of the user interface 3300 including an example shop order window 3400.

To begin a new shop order, the user selects shop order control 3310. Upon selection, user interface 3300 displays shop order window 3400. The shop order window includes fields where information about the shop order can be entered, stored, and displayed, and also includes a plurality of selectable controls, such as including an update control 3402, suspend control 3404, open control 3406, and cancel control 3408.

In this example, the shop order information includes a work number, a hat number, a job entered date, a job completed date, a frame technician, a detail technician, a customer name, insurance company, insurance policy number, a vehicle identification number, a license plate number, a license state, an odometer reading, and a vehicle color. Other embodiments include more or fewer data fields. The work number is a unique number that the repair shop uses to identify the project. The hat number is a number placed on or in the vehicle to identify the vehicle.

After the information has been entered, the user selects open control 3406 to open the new shop order. At this time, current order window 3304 is updated with the information about the shop order, such as the work order number, make and model of the vehicle, and name of the customer.

Update control 3402 is provided to save information entered into shop order window 3400 without opening a new shop order. Suspend control 3404 is provided to temporarily or permanently close a shop order, such as after a repair has been completed, or to temporarily remove the shop order from the pending orders list while waiting for a part to arrive. Cancel control 3408 is used to discard changes made in shop order window 3400 and close the window.

Some embodiments also include an add photos control 3410, which can be selected to add photos to a shop order. Upon selection, an add photos window is displayed that allows a user to select photos to add to the shop order, such as by browsing through a set of available photographs, or by selecting the location of the file from a hard drive or network drive.

Figure 35:
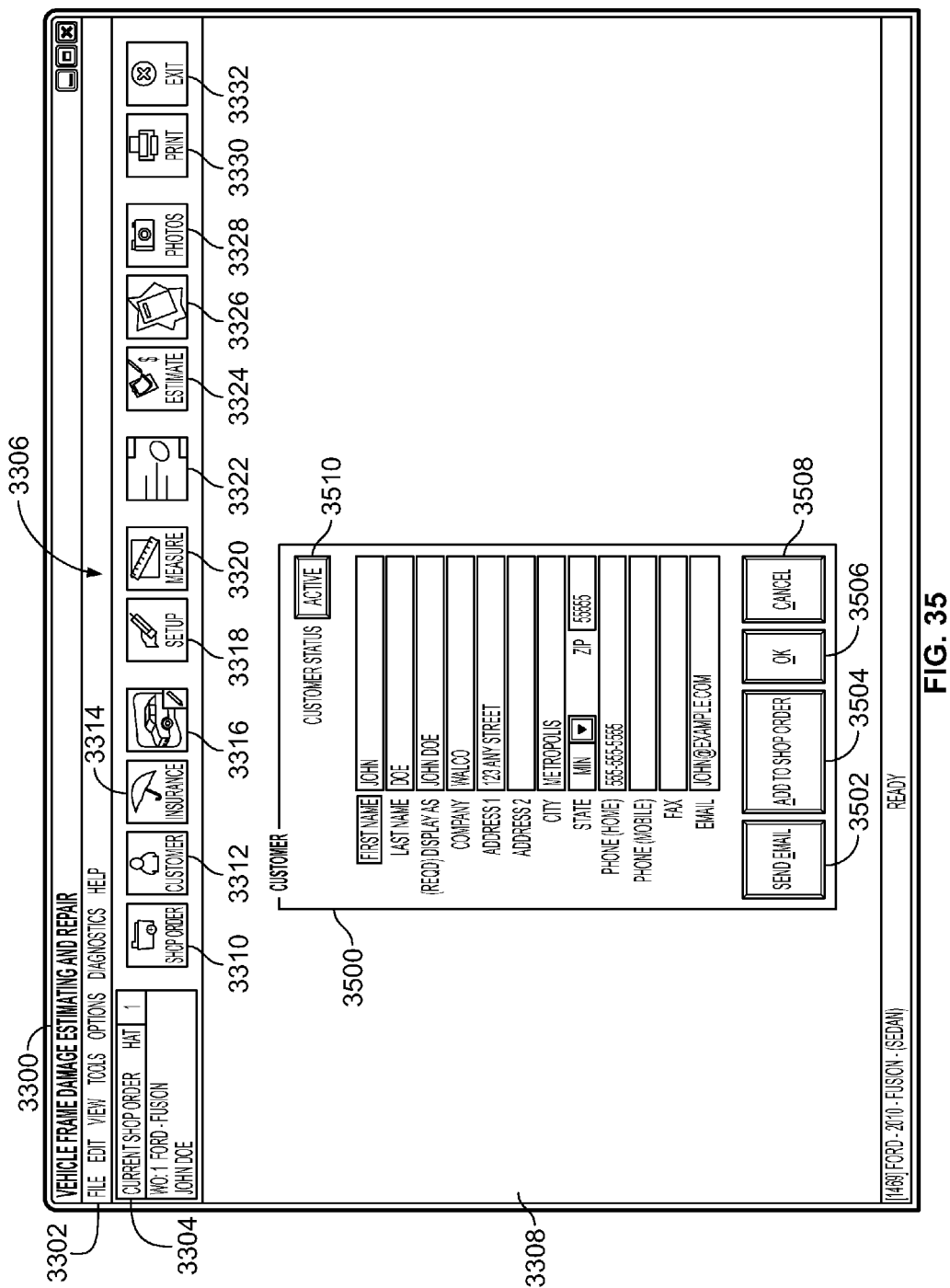
FIG. 35 is a screen shot of the user interface shown in FIG. 33, including an example customer window.

FIG. 35 is a screen shot of the user interface 3300 including an example customer window 3500.

The customer window 3500 is displayed in main window 3308, for example, after the user has selected customer control 3312. The customer window 3500 includes a plurality of customer data fields where information about the customer can be entered, stored, and subsequently displayed. The customer window 3500 also includes a plurality of selectable controls, such as including a send e-mail control 3502, add to shop order control 3504, OK control 3506, and cancel control 3508.

Customer window 3500 is used to store and display information about the customer whose vehicle is being evaluated or repaired. A variety of information fields can be provided, such as first and last name, a name to be displayed, a company name, an address, a telephone number (or multiple telephone numbers), a fax number, and an e-mail address. More or less information can be stored in the customer window, as desired. For example, some embodiments include a notes field for receiving additional notes about the customer or customer's preferences (such as the customer's preferred method of being contacted).

After the customer's information has been entered, the OK button is selected to save the information and close the customer window 3500. The customer's information can later be accessed by again selecting customer control 3312, in which case the customer window 3500 is displayed containing the previously entered and saved customer information. In some embodiments, a list of customers is first displayed and the user is prompted to select the desired customer. In another embodiment, a search window is displayed to permit the user to search for a desired customer, such as by requesting part or all of the customer's name as a search query, and then performing a search through the customer list for any customers that match the search query. Upon selection of the customer, the customer window 3500 is displayed.

Customer window 3500 includes, in some embodiments, a send e-mail control 3502. The send e-mail control allows the user to quickly initiate an e-mail to the customer. For example, upon selection of send e-mail control, an e-mail program is called, such as Microsoft® Outlook®, and a new e-mail template is opened. The addressee is automatically addressed to the customer based on the e-mail entered into the customer's e-mail address field of customer window 3500. The text of the e-mail is then be entered by the user and sent. If desired, an attachment can be included with the e-mail, such as a copy of a report generated by the software application (such as discussed in more detail herein), an image of the vehicle, or other attachments.

An add to shop order control 3504 is included, in some embodiments, to associate the customer with a shop order. In some embodiments, the customer data is associated with the currently active shop order, upon selection of the add to shop order control 3504. In another embodiment, a list of active shop orders is displayed and the user is prompted to select the appropriate shop order.

When the customer window 3500 is displayed, the cancel control 3508 can be selected. Upon selection, the customer window 3500 is closed and any changes that have been made to the customer information, if any, are discarded and not saved.

Figure 36:
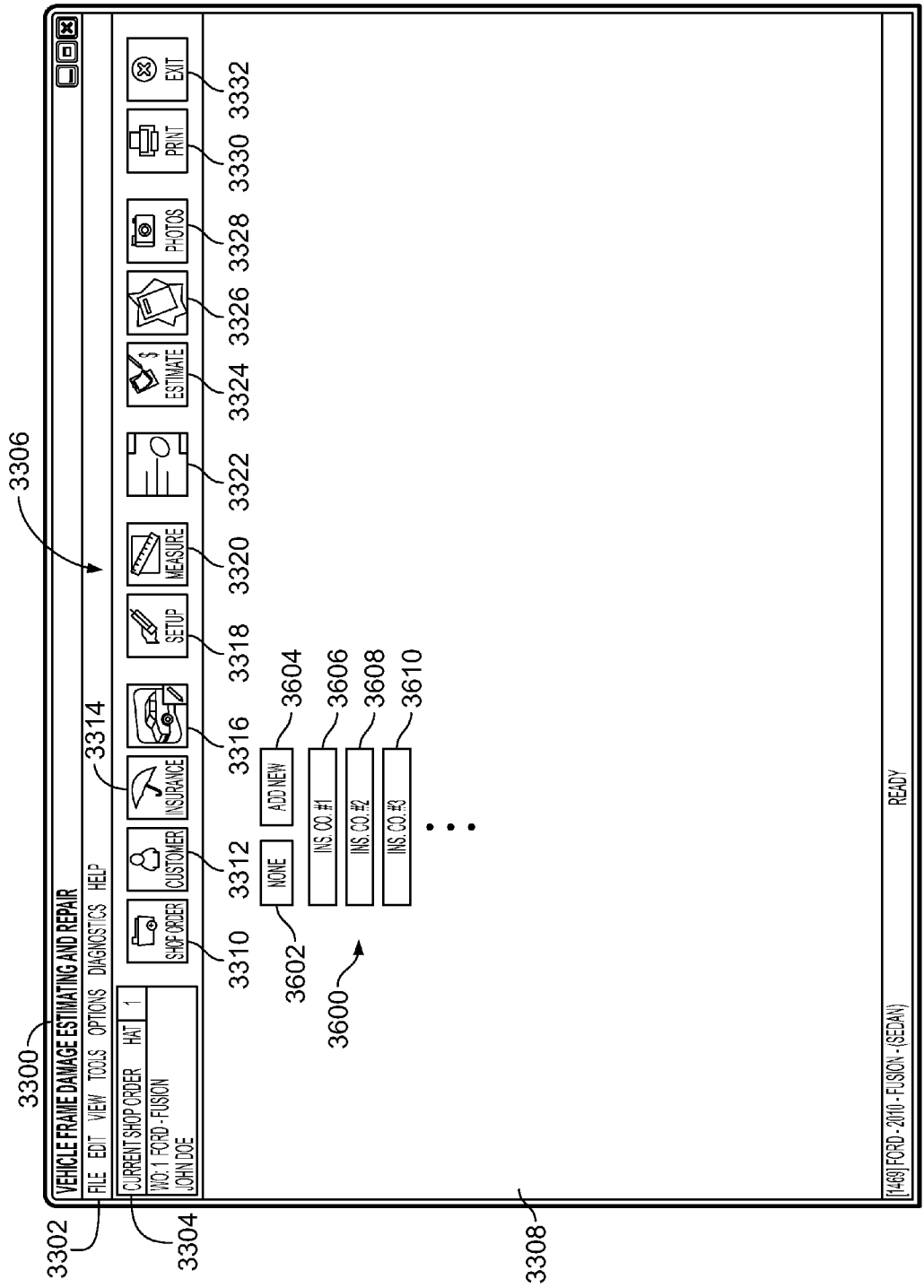
FIG. 36 is a screen shot of the user interface shown in FIG. 33, including an example insurance company selection menu.

FIG. 36 is a screen shot of the user interface 3300 including an example insurance company selection menu 3600.

Insurance companies are often involved in the repair of vehicles. As a result, user interface 3300 includes an insurance company selection menu 3600 that is displayed upon selection of the insurance company control 3314. In this example, insurance company selection menu 3600 includes a none option 3602, add new option 3604, and a plurality of insurance company selection controls 3606, 3608, 3610, etc.

If the customer does not have insurance on the vehicle, or prefers not to involve the insurance company in the evaluation or repair, the none option 3602 can be selected to indicate that an insurance company will not be involved.

If the customer's insurance company is not already included in insurance company selection menu 3600, add new option 3604 can be selected. Upon selection, an insurance company information window is displayed that includes a plurality of fields for entering the insurance company's information, such as the name of the company, address, telephone number, e-mail address, and web site for the company. In some embodiments, data fields are also provided for receiving information about the insurance agent, such as the agent's name, contact information, etc. In some embodiments, a send e-mail control is provided in the insurance company information window, which operates similar to the send e-mail control 3502 described with reference to FIG. 35. The e-mail can be used to communicate with the insurance company or agent, such as to request authorization to proceed with a repair.

Insurance company menu 3600 maintains a list of commonly used insurance companies, such as insurance company 1 (control 3606), insurance company 2 (control 3608), and insurance company 3 (control 3610). If the customer's vehicle is insured by one of the listed insurance companies, the control (3606, 3608, 3610) associated with that insurance company is selected from the list. In some embodiments, upon selection of the insurance company, an insurance details window is displayed to obtain additional information about the insurance, such as a policy number, claim number, agent, agent contact information, etc. Once all of the insurance company information has been entered, the information is saved.

Figure 37:
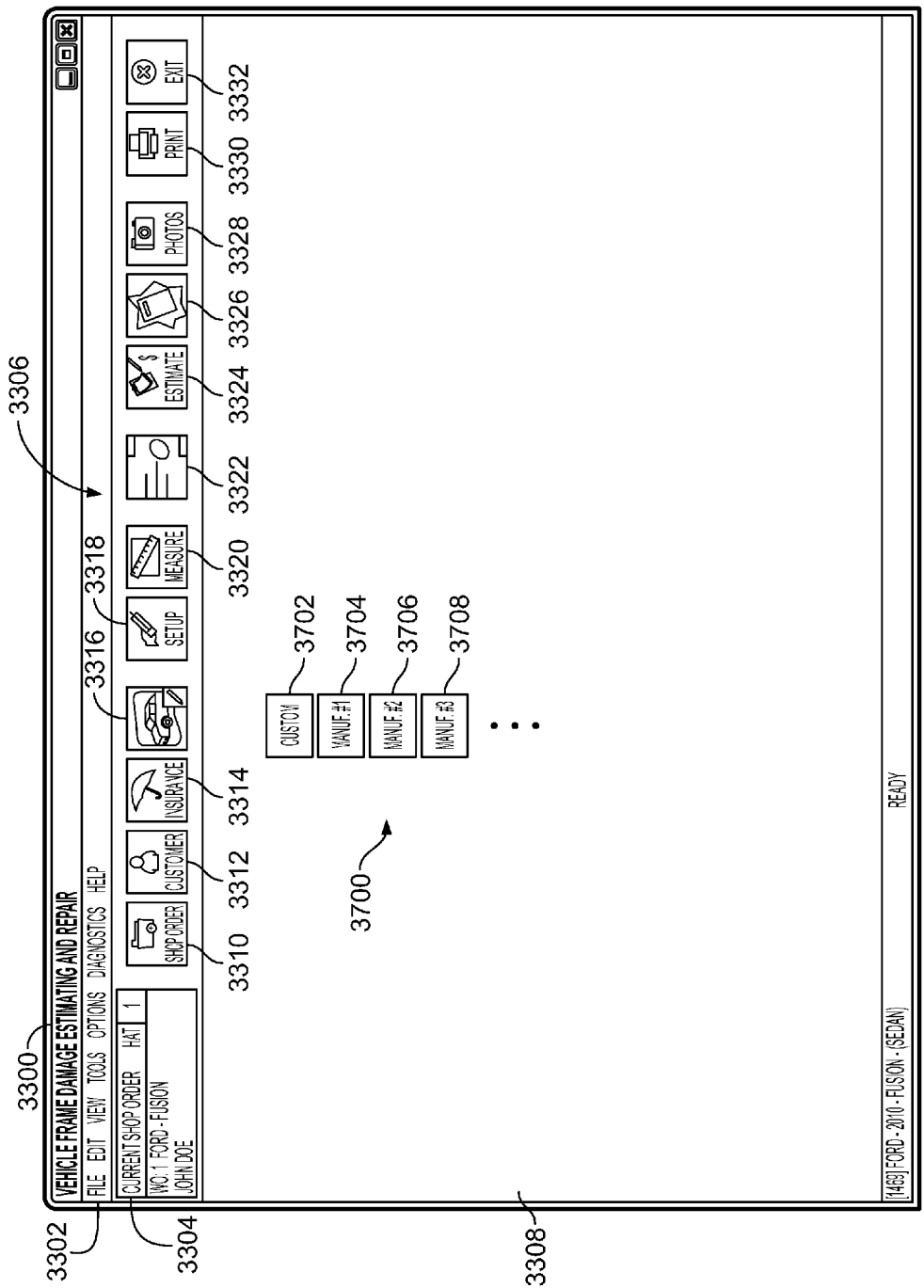
FIG. 37 is a screen shot of the user interface shown in FIG. 33, including an example vehicle menu.

FIG. 37 is a screen shot of the user interface 3300 including an example vehicle menu 3700.

Vehicle menu 3700 is displayed upon selection of the vehicle control 3316. The vehicle menu 3700 prompts the user to identify the particular vehicle that is to be evaluated or repaired. In this example, vehicle menu 3700 begins by prompting the user to select the vehicle manufacturer's name. Vehicle menu 3700 includes custom option 3702 that can be selected if the vehicle is a custom made vehicle, or a vehicle manufactured by a manufacturer that is not included in vehicle menu 3700. Otherwise, the manufacturer is selected from the list, such as manufacturer 1 (option 3704), manufacturer 2 (option 3706), manufacturer 3 (option 3708), etc.

After selection of the manufacturer, additional information about the vehicle is requested by additional menus or prompts. For example, the list of models manufactured by the selected manufacturer are displayed. The user selects the model from the list. In some embodiments, a list of model years is displayed, and the user is prompted to select the model year. In some embodiments, a list of styles of the selected model are displayed, and the user is prompted to select a particular style (e.g., number of doors, two or four wheel drive, sport or touring, etc.). After the vehicle has been identified, the vehicle information is saved.

Figure 38:
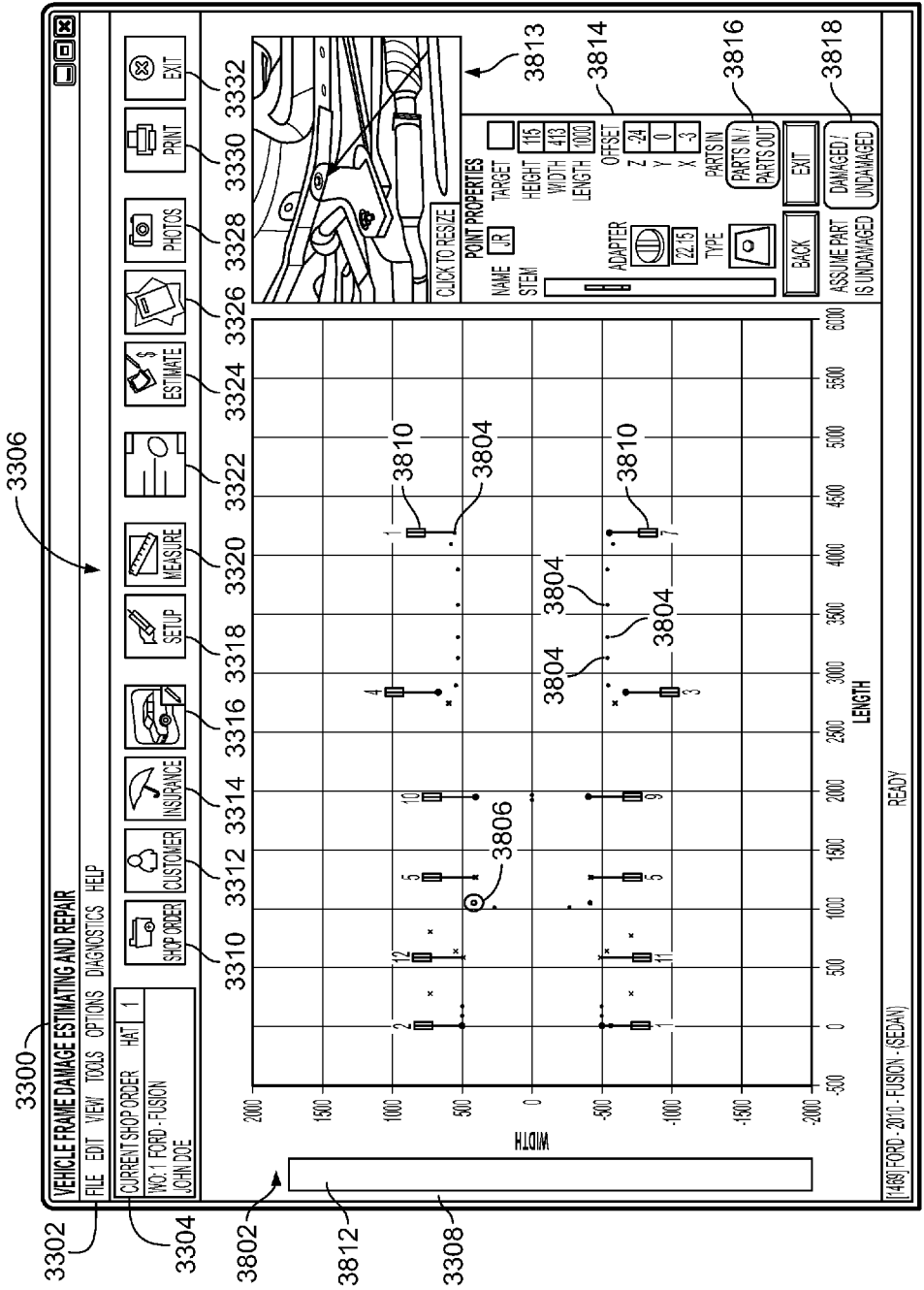
FIG. 38 is a screen shot of the user interface shown in FIG. 33, including an example setup window.

FIG. 38 is a screen shot of the user interface 3300 including an example setup window 3802. The setup window 3802 graphically depicts the setup of portions of the laser measurement system in user interface 3300, and assists the operator in properly setting up or troubleshooting the system. In this example, setup window 3802 graphically depicts vehicle points 3804, a currently selected vehicle point 3806, targets 3810, target storage region 3812, point properties window 3814, parts in/out control 3816, and damage assumption control 3818.

In some embodiments, the software application accesses a vehicle-specific data file, such as obtained from a database of vehicle-specific data as discussed herein. The vehicle data file provides information about various points of the vehicle that can be used for measurement. In this example, at least some of these vehicle points are displayed in setup window 3802 as vehicle points 3804. In this example, setup window 3802 illustrates the vehicle points from a top view. Other views are provided in other embodiments, such as bottom or side views. Other details of a vehicle are shown in some embodiments, such as an outline of the vehicle, or outline of vehicle parts, etc.

Before targets have been connected to the vehicle points, a target storage region 3812 includes graphical representations of targets. When a target is displayed within target storage region 3812, it indicates that the respective target is currently not connected to the vehicle, or that a laser beam has not yet been detected by the target. In another possible embodiment, the depiction of a target within target storage region 3812 indicates that the target is currently stored within cart 108.

After a target is removed from cart 108 and the target is properly connected to the vehicle frame, setup window 3802 updates to graphically depict the location of the target 3810. The location of the target assembly is determined as discussed herein, which permits the software application to determine which vehicle point 3804 the target is connected to. The target 3810 is then depicted as being connected to that vehicle point 3804. When no targets 3810 are depicted in target storage region 3812, as shown in FIG. 38, it indicates that all of the targets are currently in use.

In another possible embodiment, target locations can be manually entered by selecting a target 3810 and identifying a vehicle point 3804 where the target has been connected, such as by clicking on the vehicle point 3804, or by typing in an identifier of the target and/or vehicle point. For example, in this example each target is identified with an ID number from 1 to 12.

When a vehicle point 3804 is selected, such as selected vehicle point 3806, additional information about that point is displayed. In this example, a graphical depiction 3813 of the vehicle point is illustrated in setup window 3802. In some embodiments, the graphical depiction 3813 is a photograph of a portion of the same make and model of vehicle showing the location of the selected point on an actual vehicle. An arrow or other graphical element can be used to specifically identify the location, in some embodiments. Examples of vehicle points include bolts, holes, or other parts or features of the vehicle that are originally positioned at known locations.

Some embodiments include a point properties window that provides additional information about a selected point 3806. In this example, the point properties window includes an identifier (e.g., JR), number of a target currently connected to the point (none, in this example), the position of the point (e.g., height, width, and length), a recommended stem size, a recommended adapter type and size, a parts in/out control, and a damage assumption control 3818.

The damage assumption control 3818 can be selected to identify whether a part should be assumed to be damaged or not damaged. It is helpful for the system to know if there are parts of the vehicle frame that do not appear to be damaged. These parts can, for example, be initially used as the reference locations for measurements to other locations. However, even if a part is initially assumed to be undamaged, calculations can be made in some embodiments to confirm whether any damage has been sustained to these locations, if desired.

Figure 39:
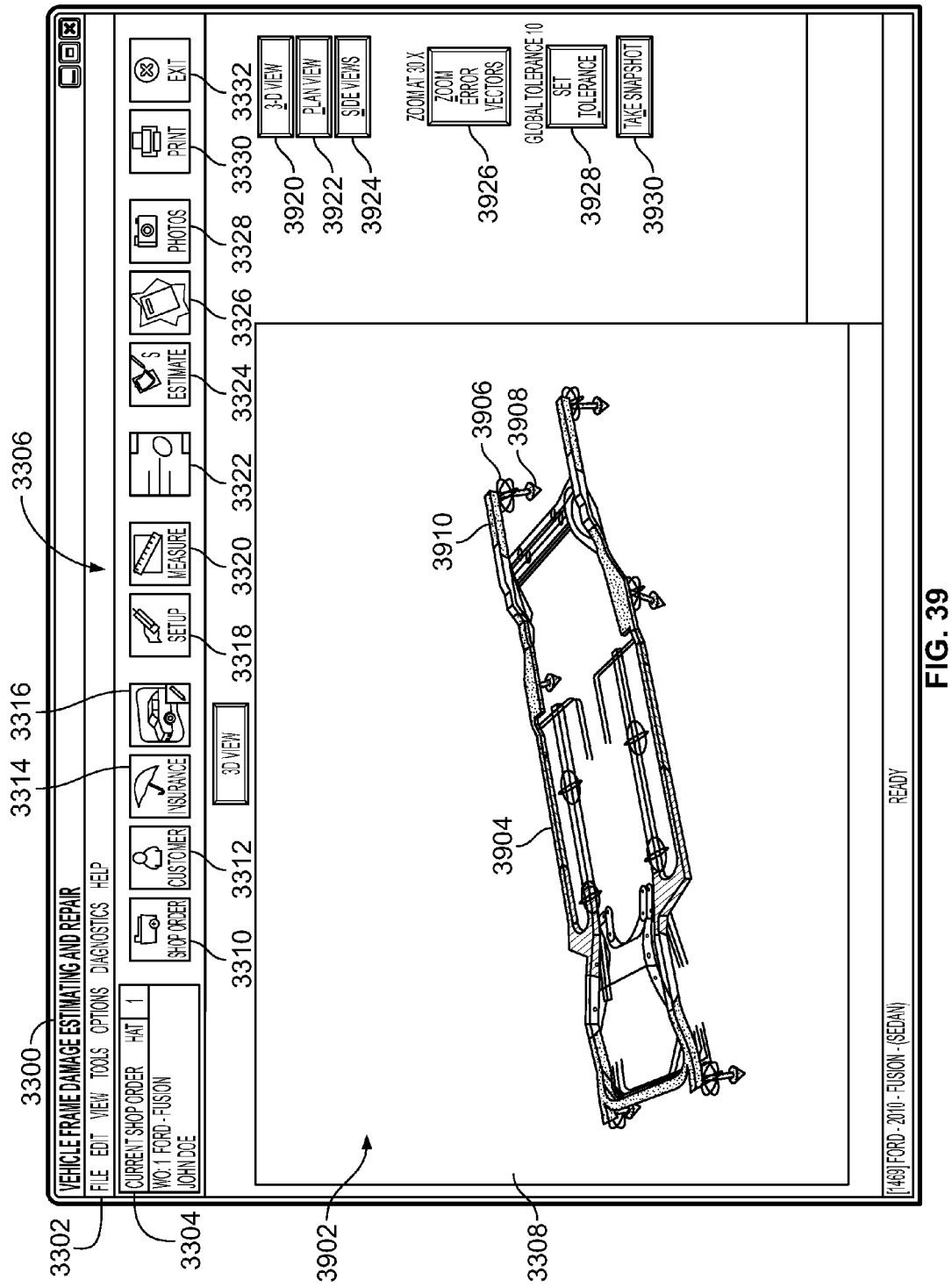
FIG. 39 is a screen shot of the user interface shown in FIG. 33, including an example measurement window.

FIG. 39 is a screen shot of the user interface 3300 including an example measurement window 3902.

Figure 40:
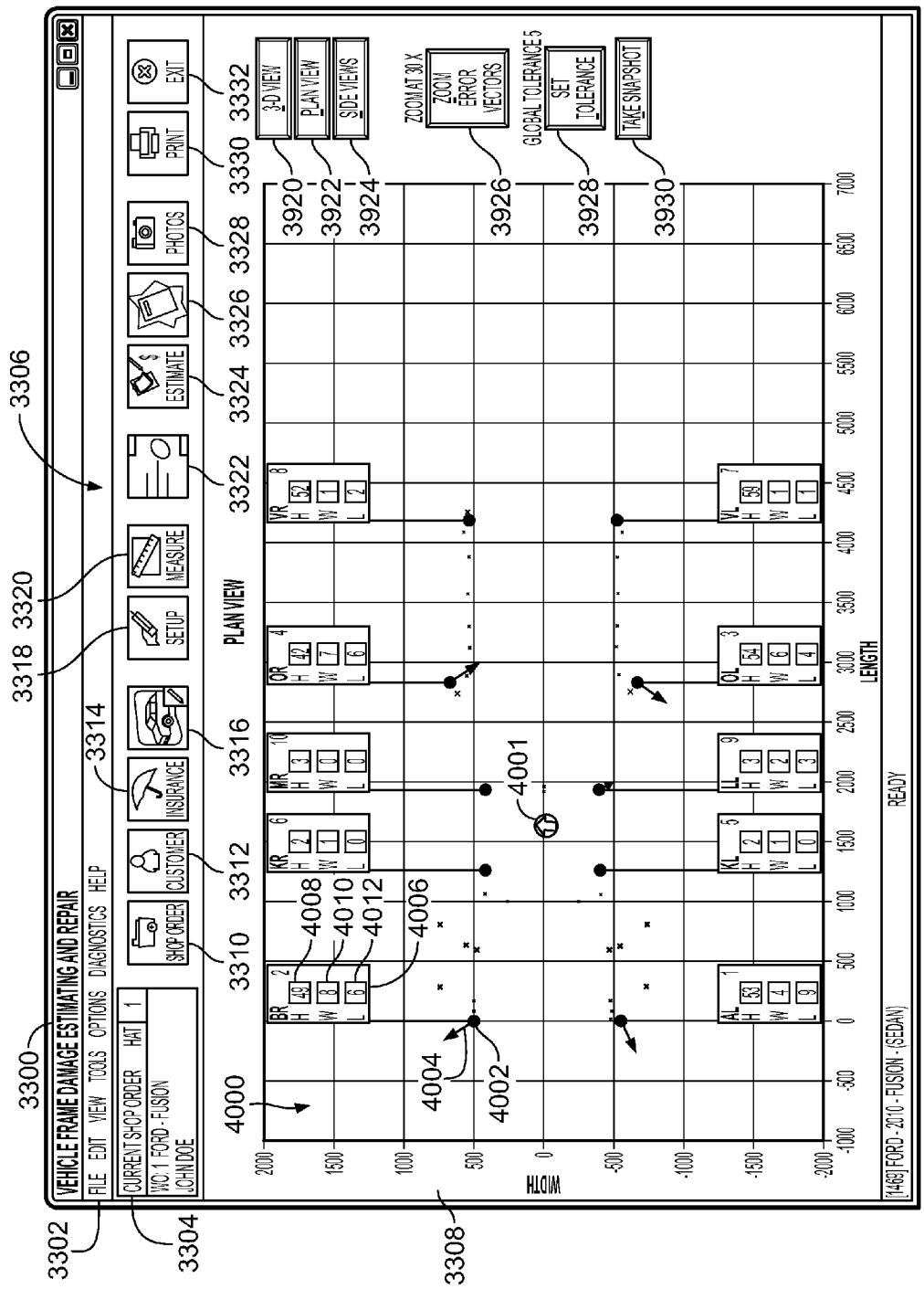
FIG. 40 is a screen shot of the user interface shown in FIG. 33, including an example plan view measurement window.
Figure 41:
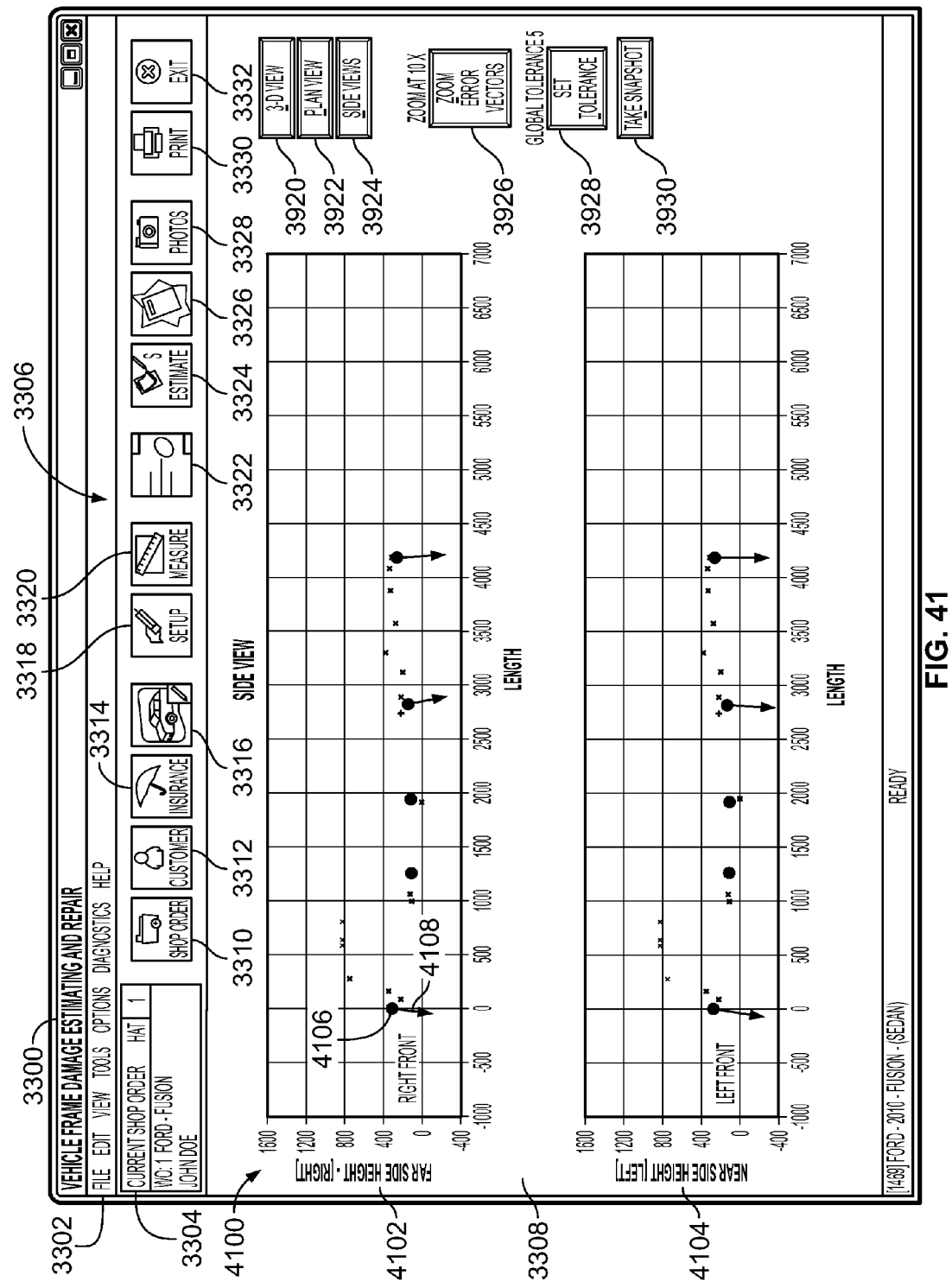
FIG. 41 is a screen shot of the user interface shown in FIG. 33, including an example side view measurement window.

Measurement window 3902 is displayed, for example the measure control 3320 has been selected from toolbar 3306. In some embodiments, the measurement window 3902 includes several views, which can be selected using 3D view control 3920, plan view control 3922, and side view control 3924. FIG. 39 depicts the 3D view associated with 3D view control 3920. Additional views are shown in FIGS. 40 and 41.

When in the 3D view, the measurement window 3902 depicts a graphical representation 3904 of the vehicle, or a portion of the vehicle. In this example, the vehicle's frame is shown. When in the 3D view, inputs can be provided into the measurement window 3902 to manipulate the graphical representation 3904, such as to rotate, pan, and zoom the graphical representation to the desired position. For example, the graphical representation can be rotated to a top view, a side view, a bottom view, or any desired perspective view. Inputs include, for example, input from a mouse, keyboard, or other input device. As one example, clicking within measurement window 3902 and then moving the mouse right or left causes the graphical representation 3904 to rotate about a vertical axis parallel to the display. Up or down movement causes the graphical representation 3904 to rotate about a horizontal axis parallel to the display. Zooming in or out is accomplished using a scroll wheel, such as by holding down a function key (e.g., CTRL) while rotating the scroll wheel. Other inputs can be used in other embodiments to control the display of graphical representation 3904 in measurement window 3902.

In some embodiments, the graphical representation 3904 of the vehicle frame is a graphical representation 3904 of a frame (or other portion of a vehicle) according to the manufacturer's original specifications, such as shown in FIG. 39.

In another possible embodiment, the graphical representation 3904 depicts the actual measured positions of the vehicle points including any detected damage. To do so, the system determines the actual locations of vehicle points and compares these locations to the manufacturer's original specifications. Those points that are not located at or within a determined range of tolerances from the original specifications are determined to be damaged. Accordingly, the graphical representation 3904 is adjusted from the original specification to actual location. The portions of the frame between the point and adjacent points are graphically depicted as being bent or otherwise displaced in some embodiments.

In the example shown in FIG. 39, the portion of the vehicle is depicted according to the manufacturer's original specifications. The actual locations of frame points are depicted with graphical elements 3906. If an actual location of a vehicle point is different from the original location of the point, the graphical element 3906 is graphically depicted as being spaced from the associated vehicle point. This shows the operator that the vehicle is damaged at that point, and illustrates the extent of the damage.

Some embodiments include an error indicator 3908. The error indicator is a graphical element that graphically depicts a vector showing both the extent of the damage (i.e., the relative amount of displacement) as well as the direction of the displacement. In one example embodiment, the error indicator points in the direction that the damaged point is from the original point. In another possible embodiment, indicator 3908 is a correction indicator that points in the opposite direction, to depict the direction that the point would need to be moved in order to correct the damage. If the measured vehicle points are within the tolerance of the original points, no error indicator 3908 is displayed.

Some embodiments graphically illustrate the extent of damage directly on the frame (or other portion of a vehicle) itself. For example, damage indicator 3908 indicates that the associated portion of the vehicle frame has been bent downward. That portion of the frame is graphically depicted with a color, such as red, which indicates that the portion is highly displaced from the original location. A portion that has only a moderate displacement from the original location is displayed in another color, such as yellow, in some embodiments. Portions of the frame that are not damaged, are displayed in a different color, such as green. More or fewer colors are used in other embodiments.

For example, in some embodiments a color (e.g., orange) is used to display a portion of a frame has been so damaged that it should not be repaired, but instead requires replacement. In some embodiments, the color used is a function of the type of material that the portion of the vehicle is made out of. In some embodiments, the color is a function of yield strength of the material for that portion of the vehicle. For example, a high tensile strength material, such as aluminum, may be permanently damaged with a small displacement. The portion of the vehicle can therefore be displayed with a color, such as orange, to indicate that the portion of the vehicle has exceeded the yield strength and should be replaced rather than being repaired.

Various additional tools are provided in some embodiments, such as the exemplary tools that are accessible through controls 3926, 3928, and 3930. Control 3926 is provided to adjust the scaling of the error indicator 3908. For example, in FIG. 39 the error vectors 3908 are depicted at thirty times the actual displacement. The scale can be increased or decreased through control 3926.

Tolerance control 3928 is provided to set or adjust vehicle point tolerances. The tolerances, as discussed above, are used to determine whether a difference between a measured actual vehicle point and a manufacturer's original point location amounts to damage. In some embodiments, the default tolerance value is 3 mm. Other tolerances are used in other embodiments. In some embodiments the original tolerance is received from the manufacturer's vehicle-specific data file.

Snapshot control 3930 is provided to capture a screen shot of measurement window 3902. Upon selection of snapshot control 3930, a digital image of measurement window 3902 is saved for later use. For example, the digital image is stored in the photos section (associated with photos control 3328), and can be later inserted into a report or saved in the repair file.

In some embodiments, the data depicted in measurement window 3900 is real-time, such that measurement window 3900 is updated shortly after data is received from components of the laser measurement system. For example, the measurement window 3900 is displayed while the scanner is scanning the targets. Upon detection of the laser, the target sends information to the scanner, which then relays the information back to the computing device. The computing device processes the data, and displays the information in measurement window 3902 (or one of the other windows described herein, such as the plan view measurement window 4000 or side view measurement window 4100, shown in FIGS. 41 and 42). If a target is moved, such as by bending the corresponding portion of the vehicle's frame, the data is updated shortly thereafter to depict the newly detected position. As a result, the measurement windows can be used to assist a technician in adjusting the vehicle portion back to the original position by providing real-time feedback to the technician as the adjustment is taking place.

FIG. 40 is a screen shot of the user interface 3300 including an example plan view measurement window 4000. The plan view measurement window 4000 provides an alternative view to the 3D measurement window 3902, shown in FIG. 39. The plan view measurement window 4000 is displayed, for example, upon selection of plan view control 3922.

In this example, plan view measurement window 4000 provides a graphical representation of the vehicle from a top (or bottom) view. More specifically, the window illustrates a plurality of vehicle points, including vehicle points 4002 where a target assembly is currently attached. A two-dimensional error indicator 4004 is displayed, in some embodiments, to visually indicate the extend of damage and the direction of the damage. Alternatively, the error indicator 4108 points in a correction direction—the direction that the point needs to move in order to correct the error.

In some embodiments, additional information about the measured error is displayed, such as with an error flag 4006. The error flag 4006 includes a window that displays the error measurements. In this example, the error measurements are displayed in all three directions, including a height error 4008 (49), a width error 4010 (8), and a length error 4012 (6). In some embodiments, the error is displayed in units of millimeters, but other units are used in other embodiments. If desired, the direction of the error can also be indicated, such as using a direction code (e.g., up/down, left/right, front/rear).

In some embodiments, error displays 4008, 4010, and 4012 are color coded to indicate the amount of damage in the respective direction for that vehicle point. The color code can be, for example, a background color, a font color, a border color, a color of an adjacent graphical element, or a color of the vehicle point in plan view measurement window 4000. In some embodiments, the color codes displayed in the error flag 4006 are the same as the color codes displayed on the target itself (e.g., with position indicators 1230, 1232, and 1234 shown in FIG. 12). In some embodiments, the colors indicate whether the associated vehicle point is damaged, and the extent of the damage.

FIG. 41 is a screen shot of the user interface 3300 including an example side view measurement window 4100. The side view measurement window 4100 provides another alternative view to the 3D measurement window 3902 (FIG. 39), and the plan view measurement window 4000 (FIG. 40). The side view measurement window 4100 is displayed, for example, upon selection of side view control 3924.

In this example, side view measurement window 4100 includes a right side view 4102 and a left side view 4104. In some embodiments, both views illustrate the front of the car at the left of the display, and the rear of the car at the right of the display.

The side view measurement window 4100 is similar to the plan view measurement window 4000 (FIG. 40), but permits the user to more easily visualize height dimensions. The side view measurement window 4100 includes a plurality of vehicle points. Point 4106 is a vehicle point that is currently attached to a target. A two-dimensional error indictor 4108 is displayed to show the extent of the error, and the direction of the damage. Alternatively, the error indicator 4108 points in a correction direction—the direction that the point needs to move in order to correct the error.

The error flags shown in FIG. 40 are also be displayed in the side view measurement window 4100, in some embodiments.

Figure 42:
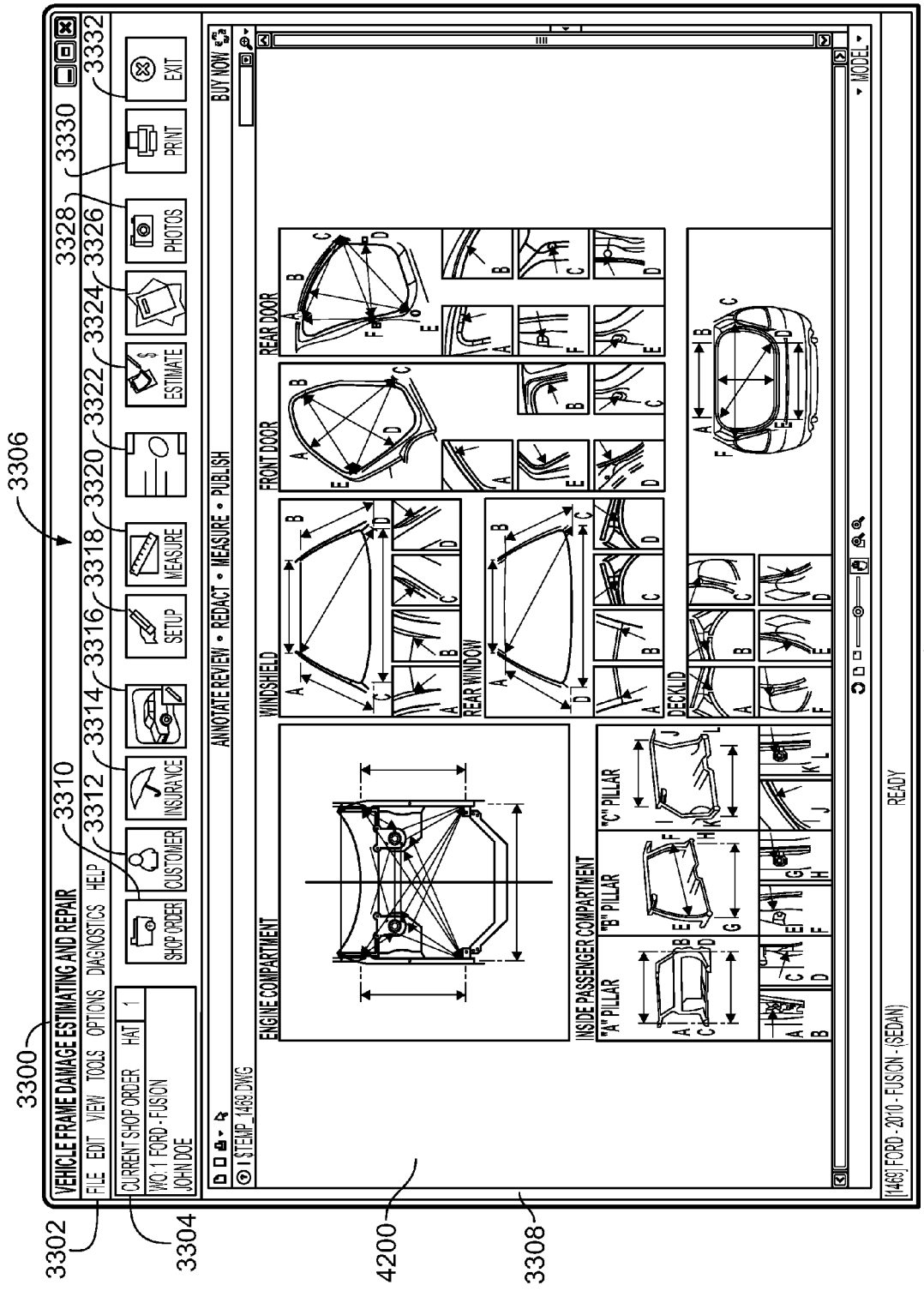
FIG. 42 is a screen shot of the user interface shown in FIG. 33, including an example vehicle dimensions window.

FIG. 42 is a screen shot of the user interface 3300 including an example vehicle dimensions window 4200. The vehicle information window is displayed, for example, upon selection of dimensions control 3322.

Vehicle dimensions window 4200 displays data regarding the particular vehicle that was selected through the vehicle selection process, such as described with reference to FIG. 37. In some embodiments, a vehicle-specific data file (or set of files) is obtained from a database of vehicle-specific data.

Vehicle-specification data is displayed in vehicle dimensions window 4200. In some embodiments, the vehicle specific data includes graphical representations of portions of the vehicle. In some embodiments, the representations of portions of the vehicle also illustrate and specify dimensions of various parts of the vehicle, such as the engine compartment, the windshield, the front door, the rear door, the inside passenger compartment, the deck lid, the frame, etc. Some graphical representations illustrate specific points of the vehicle that are used as endpoints for certain dimensions.

Figure 43:
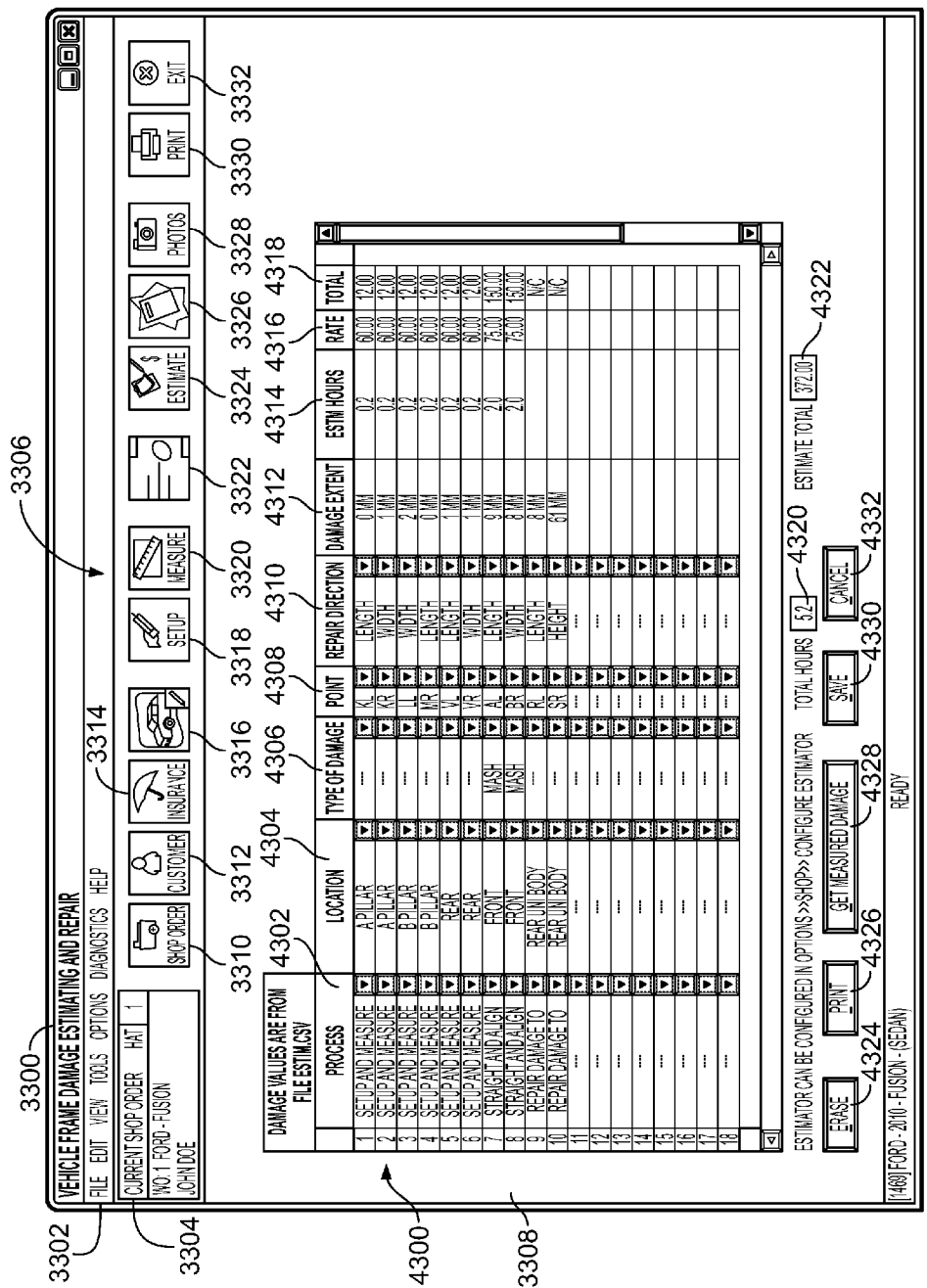
FIG. 43 is a screen shot of the user interface shown in FIG. 33, including an example estimation window.

FIG. 43 is a screen shot of the user interface 3300 including an example estimate window 4300. The estimate window 4300 is displayed, for example, upon selection of the estimate control 3324.

In some embodiments, the estimate window 4300 provides a user interface for generating a list of necessary repairs and an estimate of the cost for the repair shop to complete the repair.

As one example embodiment, the estimate window 4300 includes a spreadsheet template including a plurality of columns and rows. Each row is used to identify one step or repair that needs to be performed. A plurality of columns is included where additional information about the repair can be documented. In this example, the columns include a process column 4302, location column 4304, damage type column 4306, point column 4308, repair direction column 4310, damage extent column 4312, time estimate column 4314, hourly rate column 4316, and cost column 4318.

For each repair to be performed, the information about that step is entered in the respective columns. In some embodiments, certain cells include a drop down menu which, when selected, presents the user with a set of common entries to select from.

The process column 4302 is provided to describe the repair that needs to be performed. In some embodiments, the process column includes, for example, a drop down menu that includes setup and measure, straighten and align, repair damage to, and other common repair processes.

The location column 4304 identifies a general location on the vehicle where the repair is needed. In some embodiments, location column 4304 includes a drop down menu that includes, for example, A pillar, B pillar, rear, front, rear uni body, etc.

The damage type column 4306 identifies a type of damage that has occurred. In some embodiments, the damage type column 4306 includes a drop down menu including, for example, mash, banana, diamond, side sway, sag, widening, etc.

The point column 4308 identifies a particular point where damage was located. In this example, points are identified by unique codes associated with the points. A drop down menu is provided, in some embodiments, which lists the points for the vehicle.

The damage extent column 4312 is provided to identify the extent of the damage. In some embodiments, the extent is the distance between the actual measured location of the vehicle point and the original location of the point. In this example, the extent is measured in millimeters. In some embodiments a color, such as a background color, in the cell is color coded to visually indicate how much damage was measured. For example, green indicates a small adjustment is needed, yellow indicates a moderate adjustment, and red indicates a large adjustment. Other embodiments utilize other color coding schemes.

The time estimate column 4314, hourly rate column 4316, and cost column 4318 identify the amount of time that the repair is estimated to take, the hourly rate for the repair, and the resulting cost for the repair.

In some embodiments, the estimate is manually completed by an operator. In another embodiment, a preliminary estimate is automatically generated. To do so, damaged parts of the vehicle are determined by identifying points that are not located within the defined tolerances of the original point locations. Those points are then listed in the estimate, along with the extent of the damage to be repaired for each point, and a description of the action needed to return the point to the original location. Standard costs are input according to a price list for each action. The preliminary estimate is then reviewed by the technician, or other user, to confirm its accuracy and completeness, and any necessary adjustments are made.

In another possible embodiment, the repair is manually entered, but the damage extent column is automatically generated upon selection of the get measured data control 4328.

Once the estimate has been completed, the total hours required to complete the repair is listed in total time field 4320, which is a sum of the time estimates in column 4314. Similarly, the total estimated cost is displayed in total cost field 4322.

Additional tools are provided by controls 4324, 4326, 4328, 4330, and 4334. Control 4324 is provided to erase the estimate, such as to start over. Print control 4326 is provided to print the estimate either to a printer or to a file. Get measured damage control 4328 automatically populates the estimate with the damage measurements for each point. Save control 4330 saves the estimate in memory. Cancel control 4332 closes estimate window 4300.

Figure 44:
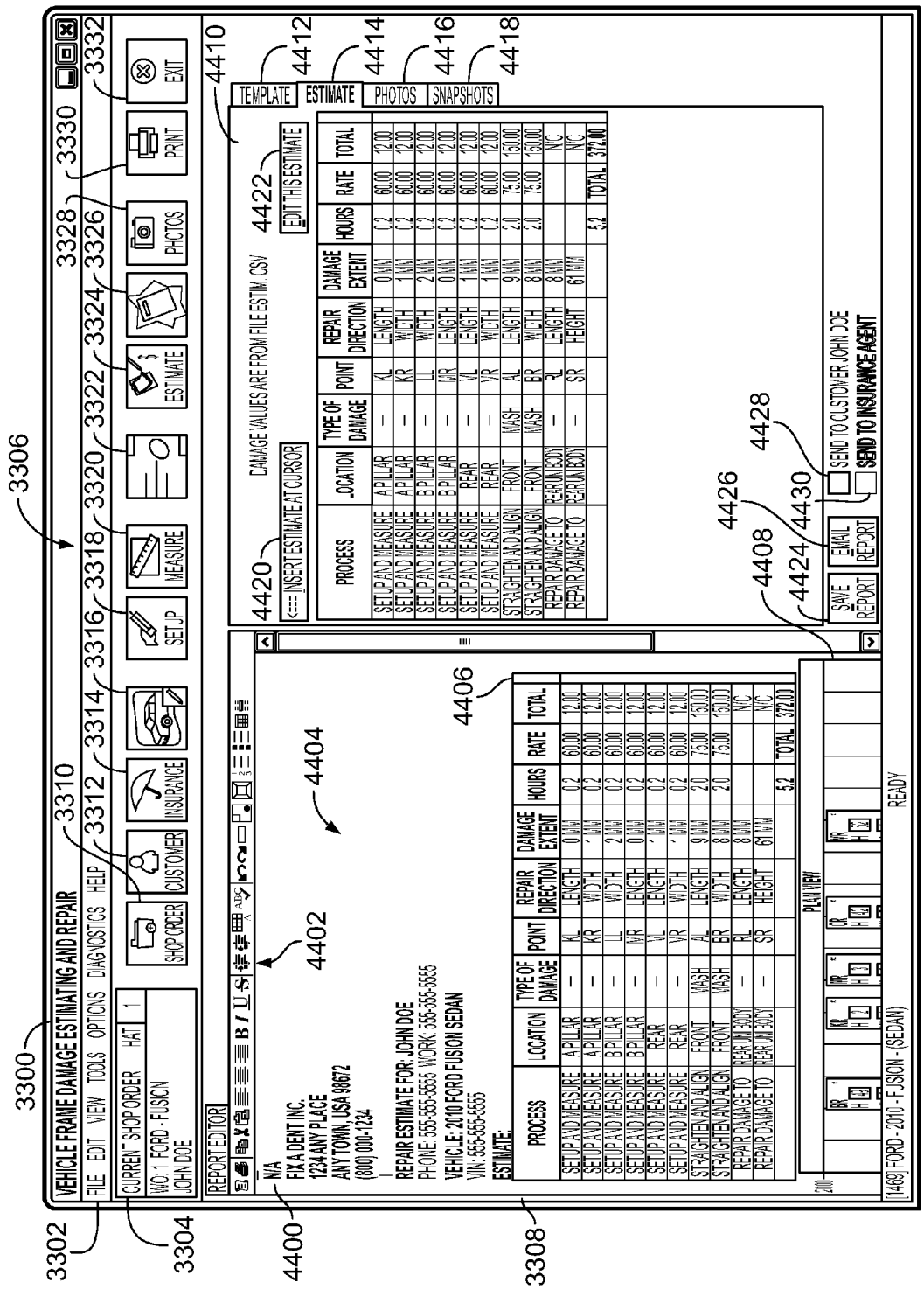
FIG. 44 is a screen shot of the user interface shown in FIG. 33, including an example report window.

FIG. 44 is a screen shot of the user interface 3300 including an example report window 4400. The report window 4400 is displayed, for example, upon selection of the reports control 3326.

In some embodiments, report window 4400 generates a report summarizing damage identified, repairs to be performed, estimated costs, or other information. In this example, report window 4400 includes a report editor including a toolbar 4402, header information 4404, and content such as estimate display 4406, and plan view measurement display 4408.

The toolbar 4402 includes a variety of tools useful in preparing the report, such as font tools, text alignment tools, and other editing tools.

Header information 4404 includes, for example, the name and address of the repair shop, the name and contact information for the vehicle owner, vehicle information, or any other desired information.

Content is then included in the report, as desired. The content can include, for example, the estimate display 4406 generated in estimate window 4300 (FIG. 43), plan view measurement display 4408, or any other displays or information discussed herein. Some embodiments include standard templates, available through tab 4412, that provide pre-formatted report templates. Estimate tab 4414 displays the estimate generated in estimate window 4300 (FIG. 43) and includes an insert control 4420 to insert the estimate as estimate display 4406. To return to estimate window 4300, the edit estimate control 4422 is provided.

Photos tab 4416 is provided to review photographs that are associated with the current shop order. Upon selection of photos tab 4416, thumbnail images are displayed to the user. An insert control is provided to insert photos into the report. Similarly, a snapshots tab 4418 is provided to permit review and entry of snapshots into the report.

Save report control 4424 is included in some embodiments. Upon selection, the report is saved in its current form.

E-mail control 4426 is included in some embodiments. Upon selection, an e-mail window is opened. If the send to customer control 4428 is selected, the e-mail is automatically addressed to the customer's e-mail address. If the send to insurance agent control 4430 is selected, the e-mail is automatically addressed to the insurance agent's address. The report is included with the e-mail, such as in the body of the message, or as an attachment. For example, the report is saved as a PDF file (or other file format), and then attached to the message. If desired, the operator can add a personal message to the recipient prior to sending the message.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A scanner device of a vehicle laser measurement system, the scanner device comprising:
    at least one rotating support;
    a motor arranged and configured to rotate the at least one rotating support;
  a laser device coupled to the at least one rotating support; and
    an optics assembly coupled to the at least one rotating support and positioned to receive a laser beam from the laser device, the optics assembly including at least two axially aligned rhombic prisms arranged and configured to split a laser beam from the laser device into at least two laser beams.

2. The scanner device of claim 1, wherein one of the at least two rhombic prisms comprises two or more parts.

3. The seamier device of claim 1, wherein the laser device generates a green laser beam.

4. The scanner device of claim 1, wherein the laser device generates an ultraviolet laser beam.

5. The scanner device of claim 1, further comprising a processor and a communication device, wherein the communication device is operable to directly and wirelessly communicate digital data with a target device.

6. The scanner device of claim 5, wherein the processor is operable to process data received directly from the target device.

7. A scanner device of a vehicle laser measurement system, the scanner device comprising:
    at least one rotating support;
    a motor arranged and configured to rotate the at least one rotating support;
    a laser device coupled to the at least one rotating support and operable to generate a laser beam in a first direction; and
    an optics assembly coupled to the at least one rotating support and positioned to receive a laser beam from the laser device, the optics assembly including:
        a first rhombic prism having:
            a first surface at a first end of the first rhombic prism, the first surface being mirrored to completely internally reflect the laser beam; and
            a second surface at a second opposing end of the first rhombic prism; and
        a second rhombic prism axially aligned with the first rhombic prism, the second rhombic prism including:
            a first surface at a first end of the second rhombic prism and abutting the second surface of the first rhombic prism, wherein at least one of the first surface of the second rhombic prism and the second surface of the first rhombic prism form a beam splitter to split the laser beam into a first laser beam and a second laser beam, wherein the first laser beam is directed out from the optics assembly in a second direction substantially parallel to the first direction; and
            a second surface at a second opposing end of the second rhombic prism, the second surface being mirrored to completely reflect the laser beam, wherein the second laser beam is directed out from the optics assembly in a third direction substantially parallel to the second direction.

* * * * *